US012088982B2

(12) United States Patent
Lee et al.

(10) Patent No.: US 12,088,982 B2
(45) **Date of Patent: *Sep. 10, 2024**

(54) DISPLAY APPARATUS

(71) Applicant: LG Display Co., Ltd., Seoul (KR)

(72) Inventors: DongGeun Lee, Paju-si (KR); KyuSung Han, Goyang-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/240,323

(22) Filed: Aug. 30, 2023

(65) Prior Publication Data

US 2023/0412954 A1 Dec. 21, 2023

Related U.S. Application Data

(63) Continuation of application No. 17/943,153, filed on Sep. 12, 2022, now Pat. No. 11,785,368, which is a continuation of application No. 17/232,538, filed on Apr. 16, 2021, now Pat. No. 11,477,554, which is a continuation of application No. 17/012,874, filed on Sep. 4, 2020, now Pat. No. 11,012,769, which is a (Continued)

(30) Foreign Application Priority Data

Dec. 29, 2017 (KR) ........................ 10-2017-0184470

(51) Int. Cl.

| | |
|---|---|
| ***H04R 1/02*** | (2006.01) |
| ***H04R 7/04*** | (2006.01) |
| ***H04R 9/02*** | (2006.01) |
| ***H04R 9/06*** | (2006.01) |
| ***H04R 17/00*** | (2006.01) |

(52) U.S. Cl.
CPC ............. *H04R 1/028* (2013.01); *H04R 7/045* (2013.01); *H04R 9/025* (2013.01); *H04R 9/06* (2013.01); *H04R 17/00* (2013.01); *H04R 2499/15* (2013.01)

(58) Field of Classification Search
CPC .......... H04R 1/028; H04R 7/045; H04R 9/06; H04R 9/025; H04R 17/00; H04R 2499/15
USPC .......................................................... 381/333
See application file for complete search history.

(56) References Cited

U.S. PATENT DOCUMENTS

| | | | |
|---|---|---|---|
| 8,180,074 | B2 | 5/2012 | Ko et al. |
| 10,728,641 | B2 | 7/2020 | Lee et al. |

(Continued)

FOREIGN PATENT DOCUMENTS

| | | | |
|---|---|---|---|
| CN | 1633825 | A | 6/2005 |
| CN | 1678945 | A | 10/2005 |

(Continued)

OTHER PUBLICATIONS

Extended European Search Report dated Sep. 24, 2020, issued in corresponding European Patent Application No. 20179768.5.

(Continued)

*Primary Examiner* — Sean H Nguyen
(74) *Attorney, Agent, or Firm* — Morgan, Lewis & Bockius LLP

(57) ABSTRACT

A display apparatus may include a display panel including a display area configured to display an image, and a non-display area, an optical module on a rear surface of the display panel, at least one first sound generator on a rear surface of the optical module, and at least one second sound generator in the non-display area and between the display panel and the optical module.

22 Claims, 24 Drawing Sheets

Related U.S. Application Data continuation of application No. 16/881,965, filed on May 22, 2020, now Pat. No. 11,012,768, which is a continuation of application No. 16/118,855, filed on Aug. 31, 2018, now Pat. No. 10,728,641.

(56) References Cited

U.S. PATENT DOCUMENTS

| | | | |
|---|---|---|---|
| 11,012,768 | B2 | 5/2021 | Lee et al. |
| 11,012,769 | B2 | 5/2021 | Lee et al. |
| 11,019,425 | B2 | 5/2021 | Choi et al. |
| 11,477,554 | B2 | 10/2022 | Lee et al. |
| 2003/0059069 | A1 | 3/2003 | Bank et al. |
| 2005/0105747 | A1 | 5/2005 | Miyata et al. |
| 2005/0168111 | A1 | 8/2005 | Bank et al. |
| 2006/0227981 | A1 | 10/2006 | Miyata |
| 2007/0202917 | A1 | 8/2007 | Phelps et al. |
| 2007/0206822 | A1 | 9/2007 | Whitwell et al. |
| 2009/0034758 | A1 | 2/2009 | Ko et al. |
| 2013/0044065 | A1 | 2/2013 | Lee et al. |
| 2014/0241558 | A1 | 8/2014 | Yliaho et al. |
| 2014/0334078 | A1 | 11/2014 | Lee et al. |
| 2015/0010187 | A1 | 1/2015 | Lee et al. |
| 2015/0185963 | A1 | 7/2015 | Lee et al. |
| 2015/0341714 | A1 | 11/2015 | Ahn et al. |
| 2016/0192511 | A1 | 6/2016 | Won et al. |
| 2017/0070811 | A1 | 3/2017 | Mihelich et al. |
| 2017/0127166 | A1 | 5/2017 | Noma |
| 2017/0280234 | A1 | 9/2017 | Choi et al. |
| 2017/0287990 | A1 | 10/2017 | Choi et al. |
| 2018/0288202 | A1 | 10/2018 | Park et al. |
| 2019/0037165 | A1 | 1/2019 | Lee et al. |
| 2020/0068308 | A1 | 2/2020 | Hosoi et al. |

FOREIGN PATENT DOCUMENTS

| | | | |
|---|---|---|---|
| CN | 1900748 | A | 1/2007 |
| CN | 1930910 | A | 3/2007 |
| CN | 101031163 | A | 9/2007 |
| CN | 102957792 | A | 3/2013 |
| CN | 104282232 | A | 1/2015 |
| CN | 105096778 | A | 11/2015 |
| CN | 106200071 | A | 12/2016 |
| CN | 106406432 | A | 2/2017 |
| CN | 107241675 | A | 10/2017 |
| CN | 107295447 | A | 10/2017 |
| CN | 206805054 | U | 12/2017 |
| EP | 1 827 057 | A2 | 8/2007 |
| EP | 2 947 857 | A2 | 11/2015 |
| EP | 3435682 | A1 | 1/2019 |
| JP | 2006-084502 | A | 3/2006 |
| KR | 10-2008-0063700 | A | 7/2008 |
| KR | 10-2014-0076492 | A | 6/2014 |
| KR | 10-2017-0135673 | A | 12/2017 |
| WO | 2009/017280 | A1 | 2/2009 |

OTHER PUBLICATIONS

First Notification of Office Action dated Sep. 3, 2020, issued in corresponding Chinese Patent Application No. 201811080405.5.

Office Action dated Mar. 24, 2023, issued in corresponding Korean Patent Application No. 10-2017-0184470.

Chinese Office Action dated Jun. 6, 2022, issued in corresponding Chinese Divisional Patent Application No. 202110080163.5.

DISPLAY APPARATUS

CROSS-REFERENCE TO RELATED APPLICATION(S)

This application is a continuation of U.S. patent application Ser. No. 17/943,153, filed on Sep. 12, 2022, which is a continuation of U.S. patent application Ser. No. 17/232,538, filed on Apr. 16, 2021, now U.S. Pat. No. 11,477,554, issued on Oct. 18, 2022, which is a continuation of U.S. patent application Ser. No. 17/012,874, filed on Sep. 4, 2020, now U.S. Pat. No. 11,012,769, issued on May 18, 2021, which is a continuation of U.S. patent application Ser. No. 16/881,965, filed on May 22, 2020, now U.S. Pat. No. 11,012,768, issued on May 18, 2021, which is a continuation of U.S. patent application Ser. No. 16/118,855, filed on Aug. 31, 2018, now U.S. Pat. No. 10,728,641, issued on Jul. 28, 2020, which claims the benefit of and priority to Korean Patent Application No. 10-2017-0184470, filed on Dec. 29, 2017, the entirety of each of which is hereby incorporated by reference.

BACKGROUND

1. Technical Field

The present disclosure relates to a display apparatus, and more particularly, to a display apparatus that vibrates a display panel to generate sound.

2. Discussion of the Related Art

With the advancement of an information-oriented society, various requirements for the display field of expressing information in accordance with an electrical information signal are increasing. Thus, research is being conducted on various display apparatuses that are thin, light, and have low power consumption. For example, display apparatuses include a liquid crystal display (LCD) apparatus, a field emission display (FED) apparatus, an organic light-emitting display apparatus, etc.

Among the above display apparatus, the LCD apparatus may include an array substrate including a thin film transistor (TFT), an upper substrate including a color filter and/or a black matrix, and a liquid crystal layer between the array substrate and the upper substrate. An alignment state of the liquid crystal layer is controlled based on an electric field applied between two electrodes in a pixel region, whereby light transmittance is adjusted based on the alignment state of the liquid crystal layer, thereby displaying an image.

The organic light-emitting display apparatus, which is a self-light-emitting display apparatus, may have advantages, such as fast response speed, high light-emitting efficiency, high luminance, and a wide viewing angle in comparison with other display apparatuses. Thus, organic light-emitting display apparatuses are attracting much attention.

A display apparatus may display an image, and an additional speaker for supplying sound generally may have to be provided. If the speaker is provided in the display apparatus, the sound generated in the speaker advances toward a lower or rear portion of the display panel, instead of toward a front portion of the display panel. Thus, the sound does not advance toward the front portion of the display panel, i.e., toward a user who watches the image displayed on the display panel, which may be disruptive to a user's immersion experience.

In addition, when the sound generated in the speaker advances toward the lower or rear portion of the display panel, sound quality is deteriorated due to interference with sound reflected on the wall or floor. Furthermore, when the speaker is included in a set apparatus, such as a television (TV), the speaker occupies a space, which may impose a restriction on design and a spatial disposition of the set apparatus is limited.

SUMMARY

Accordingly, the present disclosure is directed to a display apparatus that substantially obviates one or more of the issues due to limitations and disadvantages of the related art.

An aspect of the present disclosure is to provide a display apparatus comprising sound generators that may improve sound quality.

Another aspect of the present disclosure is to provide a display apparatus that may improve sound quality and improve a viewer's immersion experience.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts as embodied and broadly described, there is provided a display apparatus, including: a display panel including: a display area configured to display an image, and a non-display area, an optical module on a rear surface of the display panel, at least one first sound generator on a rear surface of the optical module, and at least one second sound generator in the non-display area and between the display panel and the optical module.

In another aspect, there is provided a display apparatus, including: a display panel including: a display area configured to display an image, and a non-display area, a light guide member on a rear surface of the display panel, at least one first sound generator on a rear surface of the light guide member, a supporting member configured to support the display panel, and at least one second sound generator in the non-display area and between the display panel and the light guide member.

In another aspect, there is provided a display apparatus, including: a display panel including: a display area configured to display an image, and a non-display area, a sheet portion on a rear surface of the display panel, a light guide member spaced apart from the sheet portion, a supporting member configured to support the display panel, at least one first sound generator between the light guide member and the supporting member, and at least one second sound generator between the display panel and the light guide member.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with embodiments of the disclosure. It is to be understood that both the foregoing general description and the following detailed description of the present disclosure are examples and explanatory, and are intended to provide further explanation of the disclosure as claimed.

BRIEF DESCRIPTION OF THE DRAWINGS

The accompanying drawings, that may be included to provide a further understanding of the disclosure and are incorporated in and constitute a part of this specification, illustrate embodiments of the disclosure and together with the description serve to explain various principles of the disclosure.

Figure 1A:
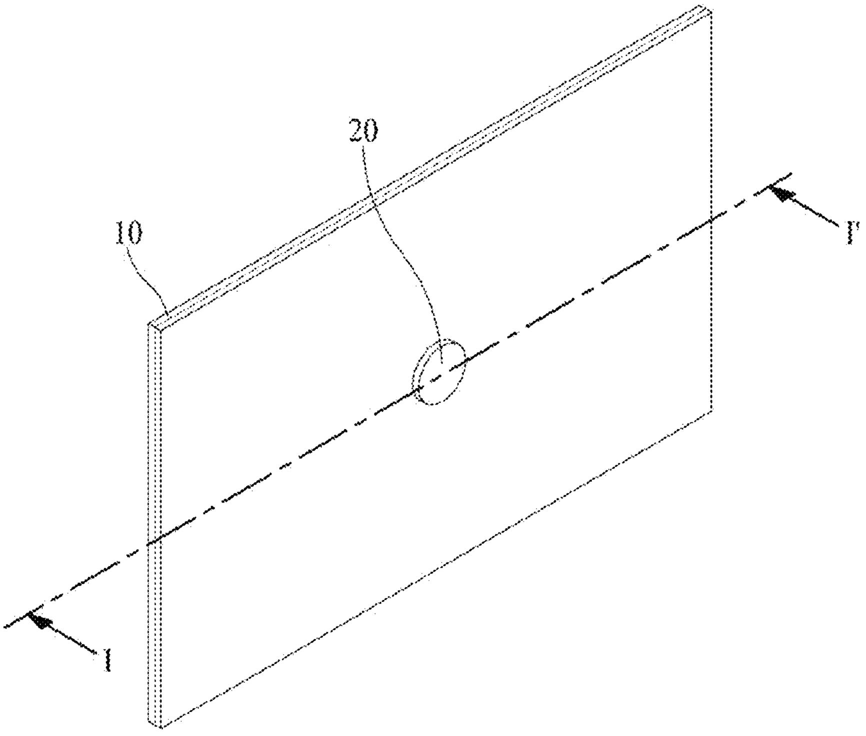
FIGS. 1A and 1B illustrate a display apparatus according to an example embodiment of the present disclosure.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference will now be made in detail to embodiments of the present disclosure, examples of which may be illustrated in the accompanying drawings. In the following description, when a detailed description of well-known functions or configurations related to this document is determined to unnecessarily cloud a gist of the inventive concept, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a particular order. Like reference numerals designate like elements throughout. Names of the respective elements used in the following explanations are selected only for convenience of writing the specification and may be thus different from those used in actual products.

Advantages and features of the present disclosure, and implementation methods thereof will be clarified through following example embodiments described with reference to the accompanying drawings. The present disclosure may, however, be embodied in different forms and should not be construed as limited to the example embodiments set forth herein. Rather, these example embodiments are provided so that this disclosure may be sufficiently thorough and complete to assist to those skilled in the art to fully understand the scope of the present disclosure. Further, the present disclosure is only defined by scopes of claims.

A shape, a size, a ratio, an angle, and a number disclosed in the drawings for describing embodiments of the present disclosure are merely an example. Thus, the present disclosure is not limited to the illustrated details. In the following description, when the detailed description of the relevant known function or configuration is determined to unnecessarily obscure the important point of the present disclosure, the detailed description of such known function or configuration may be omitted. When "comprise," "have," and "include" described in the present disclosure are used, another part may be added unless a more limiting term, such as "only," is used. The terms of a singular form may include plural forms unless referred to the contrary.

In construing an element, the element is construed as including an error or tolerance range even where no explicit description of such an error or tolerance range. In describing a position relationship, for example, when the position relationship is described as "on," "over," "under," or "next," one or more parts may be disposed between the two parts unless a more limiting term, such as "just" or "direct(ly)," is used. In describing a time relationship, for example, when the temporal order is described as, for example, "after," "subsequent," "next," or "before," a case that is not continuous may be included unless a more limiting term, such as "just," "immediate(ly)," or "direct(ly)," is used.

It will be understood that, although the terms "first," "second," etc. may be used herein to describe various elements, these elements should not be limited by these terms they are not used to define a particular order. These terms are only used to distinguish one element from another. For example, a first element could be termed a second element, and, similarly, a second element could be termed a first element, without departing from the scope of the present disclosure.

In describing elements of the present disclosure, the terms “first,” “second,” “A,” “B,” “(a),” and “(b)” may be used. These terms are merely for differentiating one element from another element, and the essence, number, order or sequence of a corresponding component should not be limited by the terms. Also, when an element or layer is described as being “connected,” “coupled,” or “adhered” to another element or layer, the element or layer can be not only directly connected or adhered to that other element or layer, but may also be indirectly connected or adhered to the other element or layer with one or more intervening elements or layers “disposed” or provided between elements or layers, unless otherwise specified.

The term “at least one” should be understood as including any and all combinations of one or more of the associated listed items. For example, the meaning of “at least one of a first item, a second item, and a third item” denotes the combination of all items proposed from two or more of the first item, the second item, and the third item, as well as the first item, the second item, or the third item.

In the description of embodiments, when a structure is described as being positioned “on or above” or “under or below” another structure, this description should be construed as including a case in which the structures contact each other, as well as a case in which a third structure is disposed therebetween. The size and thickness of each element shown in the drawings are given merely for the convenience of description, and embodiments of the present disclosure are not limited thereto.

Features of various embodiments of the present disclosure may be partially or overall coupled to or combined with each other, and may be variously inter-operated with each other and driven technically as those skilled in the art can sufficiently understand. Embodiments of the present disclosure may be carried out independently from each other, or may be carried out together in co-dependent relationship.

In the present disclosure, examples of a display apparatus is used to encompass a display apparatus such as an organic light-emitting display module (OLED module) or a liquid crystal module (LCM), that may include a display panel and a driving unit for driving the display panel. The display apparatus is used to further encompass a set device (or a set apparatus) or a set electronic apparatus, as a finished product, such as a notebook computer or a laptop computer, a television set, a computer monitor, an equipment apparatus (e.g., display equipment in an automotive apparatus or another type of vehicle apparatus) or a mobile electronic apparatus that is a complete product or a final product (for example, a smartphone or an electronic pad, etc.) that may include the LCM or the OLED module. Therefore, in the present disclosure, the display apparatus is used display apparatus itself, such as the LCM or the OLED module, and also a set apparatus which is a final consumer apparatus or an application product including the LCM or the OLED module.

In some example embodiments, the LCM or the OLED module including a display panel and a driving unit thereof may be referred to as a display apparatus, and the electronic apparatus as a final product including the LCM or the OLED module may be referred to as a set apparatus. For example, the display apparatus may include a display panel, such as an LCD or an OLED, and a source printed circuit board (PCB) as a controller for driving the same, the set apparatus may further include a set PCB that is a set controller set to be electrically connected to the source PCB and to control the overall operations of the set apparatus.

A display panel applied to an embodiment may use all types of display panels, such as a liquid crystal display panel, an organic light-emitting diode (OLED) display panel, and an electroluminescent display panel, but is not limited to these specific types. For example, the display panel of the present disclosure may be any panel capable of being vibrated by a sound generation device according to embodiments of the present disclosure to output a sound. A shape or a size of a display panel applied to a display apparatus according to embodiments of the present disclosure is not limited.

For example, if a display panel is a liquid crystal display panel, the display panel may include a plurality of gate lines, a plurality of data lines, and a plurality of pixels respectively provided in a plurality of pixel areas of the gate lines and the data lines. Also, the display panel may include an array substrate including a thin film transistor (TFT), which is a switching element for adjusting a light transmittance of each of the plurality of pixels, an upper substrate including a color filter and/or a black matrix, and a liquid crystal layer between the array substrate and the upper substrate.

In addition, if a display panel is an organic light-emitting display panel, the display panel may include a plurality of gate lines, a plurality of data lines, and a plurality of pixels respectively provided in a plurality of pixel areas of the gate lines and the data lines. The display panel may include an array substrate including a TFT, which is an element for selectively applying a voltage to each of the pixels, an organic light-emitting device layer on the array substrate, and an encapsulation substrate disposed on the array substrate to cover the organic light-emitting device layer. The encapsulation substrate may protect the TFT and the organic light-emitting device layer from an external impact, and may prevent moisture or oxygen from permeating into the organic light-emitting device layer. A layer provided on the array substrate may include an inorganic light-emitting layer (for example, a nano-sized material layer or the like). The display panel may further include a backing such as a metal plate attached on the rear surface of the display panel, but the backing is not limited to the metal plate, and another structure may be included.

In the present disclosure, the display panel including a sound generator may be implemented at a user interface module in a vehicle, such as the central control panel area in an automobile. For example, such a display panel may be configured between two front seat occupants, such that sounds due to a vibration of the display panel propagate towards the interior of the vehicle. As such, the audio experience within a vehicle can be improved as compared to having speakers at the interior sides or edges of the vehicle.

Studies for configuring a sound generator in a display apparatus without configuring a separate speaker in the display apparatus are ongoing. This will be described with reference to FIGS. 1 and 2.

Figure 1B:
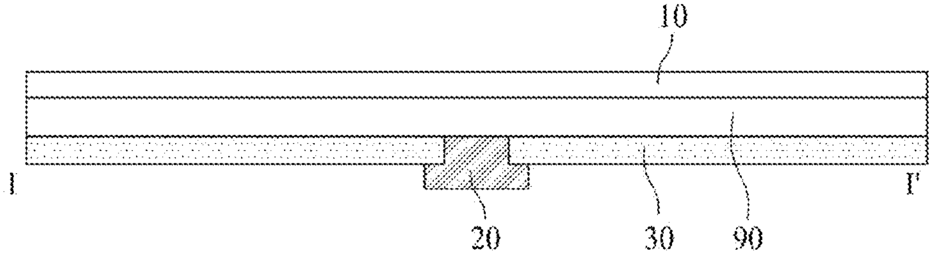

FIGS. 1A and 1B illustrate a display apparatus according to an example embodiment of the present disclosure.

FIG. 1A illustrates a rear surface of the display apparatus, and the display apparatus may include a display panel 10 for displaying an image and a sound generator 20 for generating sound by vibrating the display panel 10. If the display panel 10 is a liquid crystal display panel, the display panel 10 may display an image by using light irradiated from a backlight.

To realize a sound in the liquid crystal display panel that is the display panel 10, the inventors of this disclosure have recognized that the sound may be generated by vibrating the liquid crystal display panel. Therefore, the inventors of the present disclosure have conducted experiments in which the sound generator is provided between the display panel and the backlight. In this case, the inventors of the present disclosure have recognized a problem that an image cannot be displayed on the display panel because the backlight is at least partially covered by the sound generator. Therefore, a method for configuring a sound generator on a rear surface of the backlight without configuring the sound generator to adjoin the display panel may have been studied. This will be described with reference to FIG. 1B.

FIG. 1B is a cross-sectional view taken along line I-I' of FIG. 1A. With reference to FIG. 1B, the display apparatus may include a sound generator 20, a backlight module 90, and a supporting member 30. The sound generator 20 may be on a rear surface of the backlight module 90, and may include a coil-type sound generator for generating a sound by means of a current applied to a coil. The inventors of the present disclosure have recognized a problem that a high sound is not generated by the coil-type sound generator 20. This will be described with reference to FIG. 2.

Figure 2:
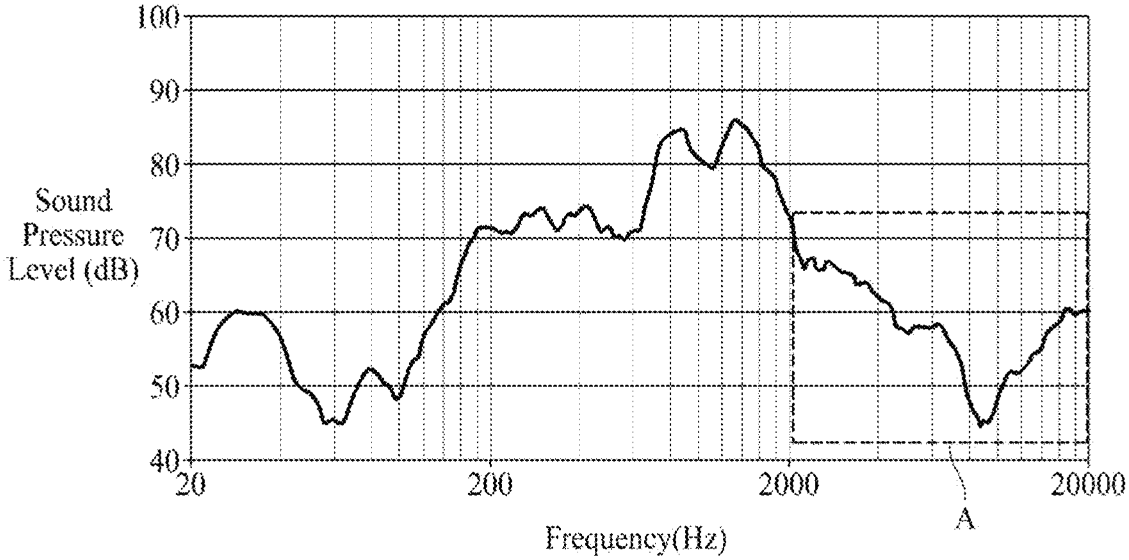
FIG. 2 illustrates a sound output characteristic according to an example embodiment of the present disclosure.

FIG. 2 illustrates a sound output characteristic according to an example embodiment of the present disclosure.

FIG. 2 illustrates a sound output characteristic of FIG. 1. In FIG. 2, a horizontal axis (x-axis) denotes a frequency in hertz (Hz), and a vertical axis (y-axis) denotes a sound pressure level in decibels (dB).

With reference to FIG. 2, it is noted that a sound pressure level is reduced at a range of 2 kHz or more corresponding to a frequency range of a high-pitched sound range. A vibration of a frequency of a high-pitched sound range or less may be transferred to the display panel 10 through an air layer between the display panel 10 and the backlight module 90. However, the vibration is not transferred to the display panel 10 by the air layer at a range of 2 kHz or more corresponding to a portion marked with "A" of FIG. 2, whereby loss of the sound pressure level is generated. If loss of the sound pressure level is generated at the range of 2 kHz or more corresponding to the frequency of a high-pitched sound range, a user may feel that the sound seems to be interrupted or blocked, whereby a problem occurs in that it may be difficult to provide a clear sound quality.

Therefore, the inventors of the present disclosure have conducted experiments being capable of generating a high-pitched sound range. The inventors have recognized that the sound of a high-pitched sound range cannot be generated even when an additional sound generator is configured on the rear surface of the backlight module. Through the various experiments, the inventors have recognized piezoceramics for generating a high-pitched sound. Because the piezoceramics have a fast response speed of several milliseconds (msec), the piezoceramics have an advantage in that a frequency range of vibration is wide. In this case, the piezoceramics may be a piezoelectric element or a piezoelectric sound generator, and may be, but is not limited to, an element having deformation or deformation force if a voltage is applied thereto, for example, piezoelectric effect.

In this respect, the inventors of the present disclosure have conducted several experiments for a piezoelectric type sound generator provided in the display apparatus. The inventors have recognized that it is difficult to generate a high-pitched sound due to several layers constituting the backlight module even though the piezoelectric type sound generator is between the display panel and the backlight module. The inventors have recognized that the sound generator, which should vibrate the display panel to generate high-pitched sound, should be in the display panel. The inventors have recognized, through the experiments, that a sound difference is generated between the display panel and the outside of the display panel, and the sound generator may be outside the display panel. Therefore, the inventors have recognized that the sound generator should be outside the display panel, and not in the area of the display panel, to generate high-pitched sound. Furthermore, it has been found that the sound generator should not be in an area that is formed by several layers. In this respect, the inventors of the present disclosure have invented a new type of display apparatus that may include a sound generator in an area that does not affect an image of the display panel, to generate sound. This new type of display apparatus will be described as follows.

FIGS. 3A to 3E illustrate a display apparatus according to another example embodiment of the present disclosure.

Figure 3A:
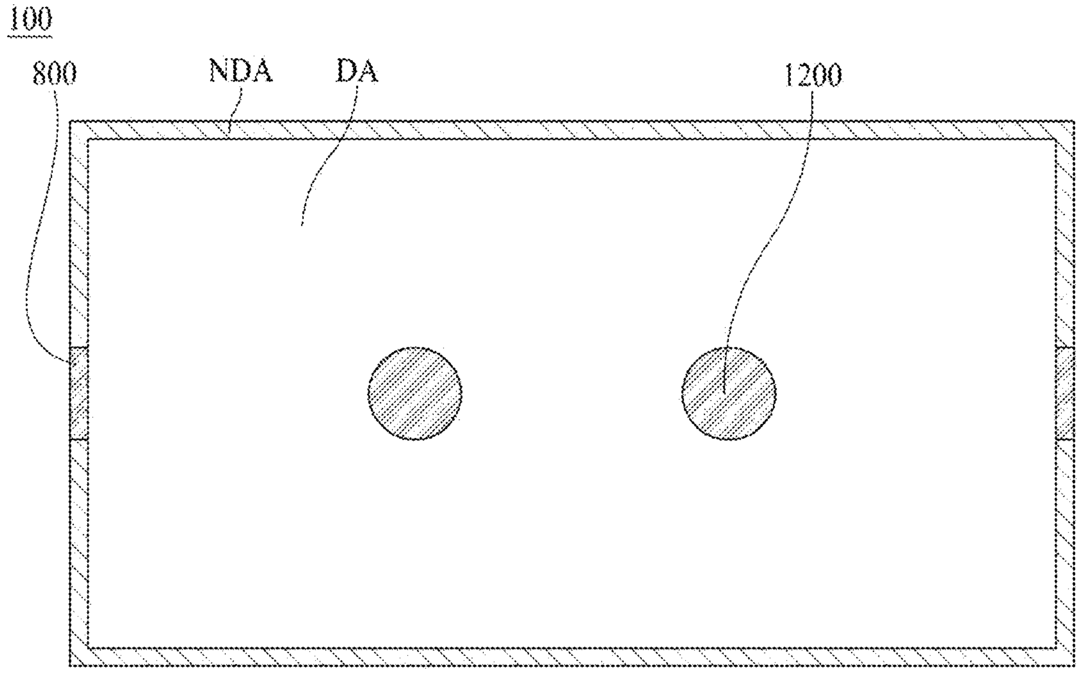
FIGS. 3A to 3E illustrate a display apparatus according to another example embodiment of the present disclosure.

FIG. 3A is a back view of the display apparatus. With reference to FIG. 3A, the display apparatus may include a display panel 100 for displaying an image. The display panel 100 may include a non-display area NDA and a display area DA. The non-display area NDA may be an area in which an image is not displayed, and may be referred to as a "bezel" area. The display area DA may be an area where an image is displayed.

The display panel may include a first substrate, a second substrate, and a liquid crystal layer. The first substrate may include a pixel electrode or common electrode for controlling alignment of liquid crystals of the liquid crystal layer, and may include a thin film transistor (TFT) connected with the pixel electrode. The second substrate may include a color filter layer for realizing one or more colors.

The display panel may control light transmittance of the liquid crystal layer by driving the liquid crystal layer in accordance with an electric field formed by data and common voltages applied per pixel, thereby displaying an image. The liquid crystal layer may be driven by various driving modes, such as a twisted nematic (TN) mode, a vertical alignment (VA) mode, an in-plane switching (IPS) mode, a fringe field switching (FFS) mode, etc.

For example, the first substrate may be a thin film transistor substrate, and may include a plurality of pixels that may be defined by a plurality of gate and data lines crossing each other. Each pixel may include a thin film transistor connected to the gate and data lines, a pixel electrode connected to the thin film transistor, and a common electrode adjoining the pixel electrode, to which a common voltage may be supplied. The common electrode may be on the second substrate in accordance with a driving mode of the liquid crystal layer. A driving circuit portion for driving the display panel and a pad portion connected with the driving circuit portion may be at one side of the first substrate. The second substrate may be a color filter array substrate, and may include a color filter layer. If the display panel is realized in a color filter on TFT (COT) mode or a TFT on color filter (TOC) mode, then the color filter layer may be formed on the first substrate.

An optical module may be below the display panel, and may irradiate light to the display panel. The display apparatus may display an image on the display panel by controlling transmittance of light emitted from the optical module of the display panel.

The display apparatus may be a display module that may include a display panel and a driving circuit portion for driving the display panel. For example, the driving circuit portion may include an integrated circuit (IC) chip and a flexible printed circuit board (FPCB). The driving circuit portion, such as a driving IC for applying a voltage, may be built in the FPCB. Alternatively, the driving circuit portion may be realized in a chip on film (COF) mode.

The gate and data lines of the display panel may be connected to the flexible circuit board. If an electrical signal is applied from the flexible circuit board, the electrical signal may be transferred to a source electrode and a drain electrode of the thin film transistor. The flexible circuit board may receive an image signal from the outside of the display panel, and may apply a driving signal to each of the gate and data lines of the display panel.

The flexible circuit board may generate gate and data signals for driving the display panel, and a plurality of timing signals for applying the gate and data signals at a proper timing, and may apply the gate and data signals to the gate and data lines of the display panel. An amplifier may be included in the flexible circuit board.

A polarizing member may be on the upper surfaces of the first and second substrates. A cover window may be on the display module. The cover window may be attached to an entire surface of the display module or to an entire surface of the polarizing member.

As described with reference to FIGS. 1 and 2, the sound generator may be in the non-display area NDA to generate a high-pitched sound. The non-display area NDA may be a bezel area. A display apparatus, which may widen a size of a display area where an image may be displayed by narrowing the bezel area, may have been developed. For example, the non-display area NDA may be a very narrow area having a width of about 5 mm or less and a thickness of about 1.8 mm or less. The width and thickness are not limited to these examples, and may be varied depending on design of the display apparatus.

If the coil-type sound generator is in the non-display area, the coil-type sound generator may have a width of about 20 mm, and there may be a spatial restriction in arranging the coil-type sound generator in the non-display area. If the coil-type sound generator is in the non-display area, because the thickness of the non-display area becomes thicker, the bezel area may be increased, whereby a problem occurs in that the thickness of the display apparatus becomes thicker.

In this respect, the inventors of the present disclosure have conducted several experiments for the sound generator that may be in the non-display area, while not increasing the bezel area, and may generate a high-pitched sound. The inventors have recognized, through the several experiments, that the piezoelectric type sound generator may be in the non-display area to generate a high-pitched sound. The inventors have recognized that difficulty in generating a high-pitched sound due to several layers may be solved because the non-display area is an area that is not formed by several layers. This will be described as follows.

With reference to FIG. 3A, at least one first sound generator 1200, which may be at least one coil type sound generator, is in the display area DA, and a second sound generator 800, which may be at least one piezoelectric type sound generator, may be in the non-display area NDA. The first sound generator 1200 may include two or more sound generators, but the number of sound generators is not limited to this number. The second sound generator 800 may be provided as one or as a plurality.

The second sound generator 800 may not affect an image of the display panel to generate a high-pitched sound, and may be in the non-display area NDA corresponding to the outside of the display panel. Because the at least one second sound generator 800 is able to be thin, it may be advantageous in that the second sound generator 800 may not increase the width of the non-display area NDA.

The second sound generator 800 may generate sound by using the non-display area NDA or the bezel area as a vibration plate. Therefore, because the second sound generator 800 may be anywhere in the display area NDA, a degree of freedom for arrangement of the second sound generator 800 may be improved. Further, because the second sound generator 800 is not in the display area having an optical module, etc., a sound path may not be blocked by the optical module, whereby sound quality may be improved. Because the second sound generator 800 may be thin, it may be advantageous in that a small sized speaker may be realized in the display apparatus.

The non-display area NDA may include four peripheries, or four sides, surrounding the display area. For example, at least one piezoelectric sound generator 800 may be on at least one of the four peripheries, or four sides, of the non-display area. The first sound generator 1200 may be in the display area DA, and the second sound generator 800 may be in a position corresponding to the first sound generator 1200. The first sound generator 1200 and the second generator 800 may be asymmetrically diposed. For example, the first sound generator 1200 may be at the center of the display area DA, and the second sound generator 800 may be in any one of the four peripheries, or four sides, of the non-display area, but not at the center. This will be described in detail with reference to FIGS. 3B to 3E.

Figure 3B:
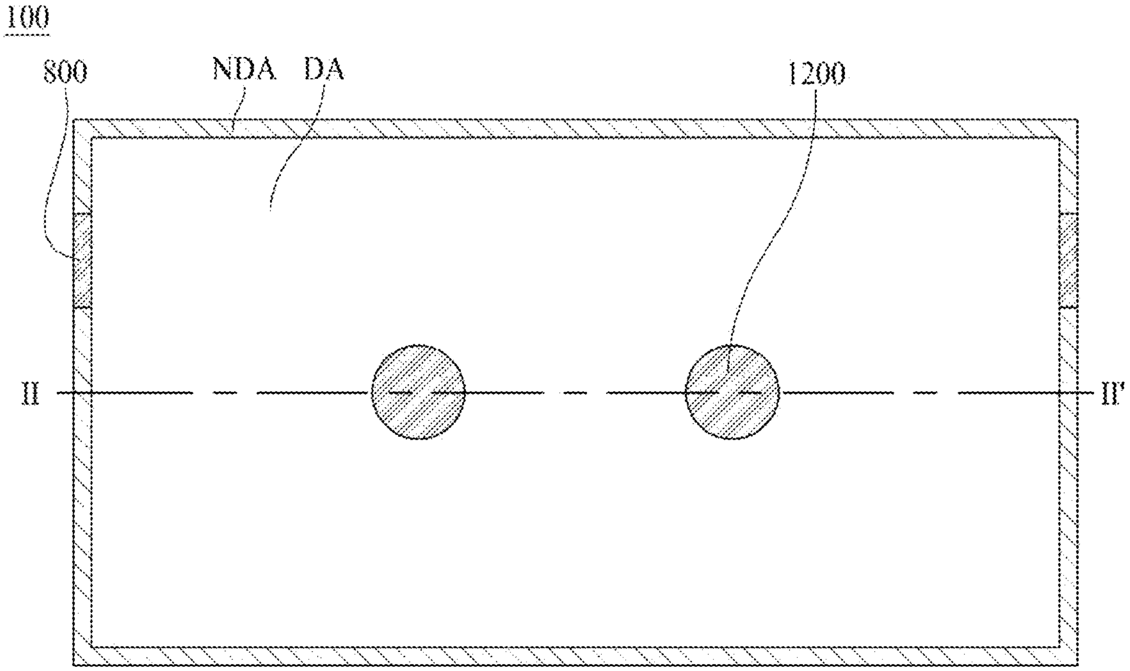

With reference to FIG. 3B, the second sound generator 800 may be within the non-display area NDA, but above the horizontal symmetry line. For example, first sound generator 1200 and the second sound generator 800 may be asymmetrically disposed. If the at least one second sound generator 800 is inclined toward any one periphery of the non-display area NDA, it may be advantageous in that a high-pitched sound may be further improved.

Figure 3C:
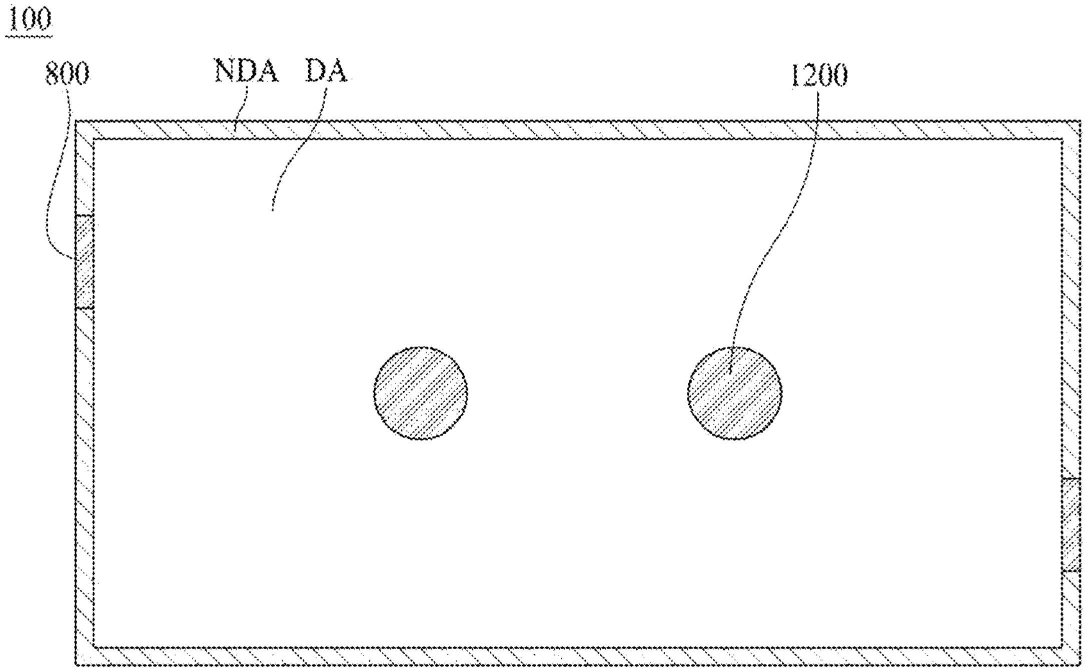

With reference to FIG. 3C, the second sound generator 800 may be at different positions of the non-display area NDA, without being at the same or symmetrical position of the non-display area NDA. Therefore, the second sound generator 800 may be arranged diagonally offset to each other, e.g., in the upper and lower side of the non-display area NDA, the edge or periphery of the non-display area NDA, or in the left and right side of the non-display area NDA with respect to the display panel 100. For example, the second sound generators may be in the non-display area NDA in the left upper side and the right lower side of the non-display area NDA.

Figure 3D:
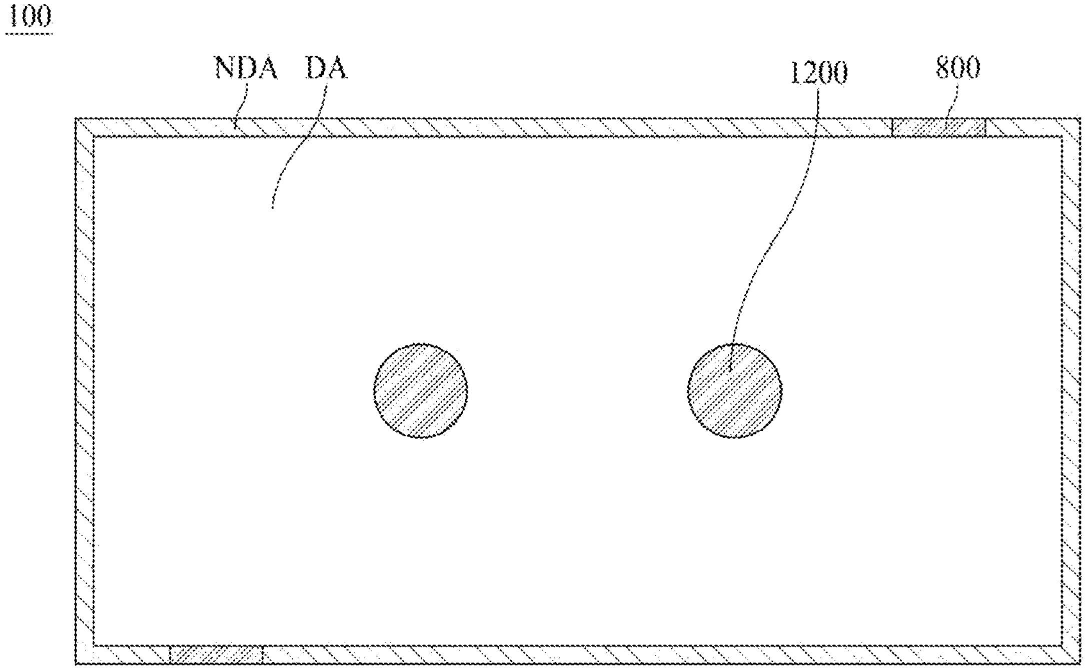
Figure 3E:
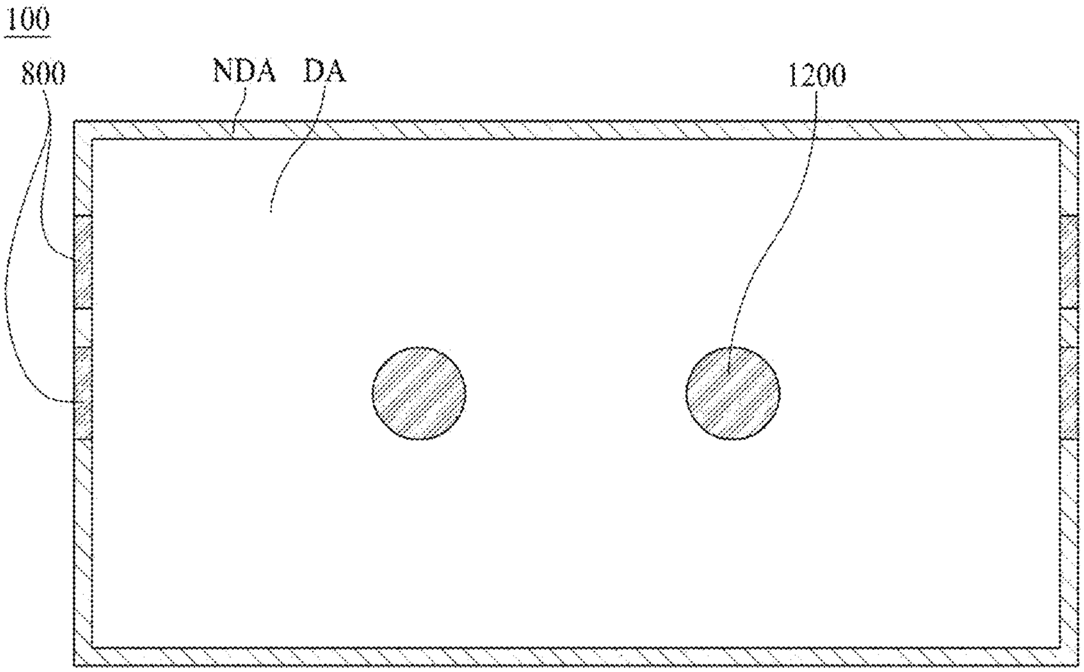

With reference to FIG. 3D, the at least one second sound generator 800 may be at upper and lower sides of the non-display area NDA. If the second sound generator 800 is at upper and lower sides of the non-display area NDA, the second sound generator 800 may be at the same position or different positions.

Therefore, because the first sound generator 1200 and the second sound generator 800 of the present disclosure may generate sound in a front direction of the display panel 100 by vibrating the display panel 100, a user's immersion experience may be improved. As the second sound generator 800 may be in the non-display area, the distance between the second sound generators 800 in the non-display area may be increased, whereby a stereo effect of the sound may be improved.

The first sound generator 1200, which may be at least one coil-type sound generator, and the second sound generator 800, which may be at least one piezoelectric sound generator, may be referred to as an actuator, an exciter, or a transducer.

Figure 4:
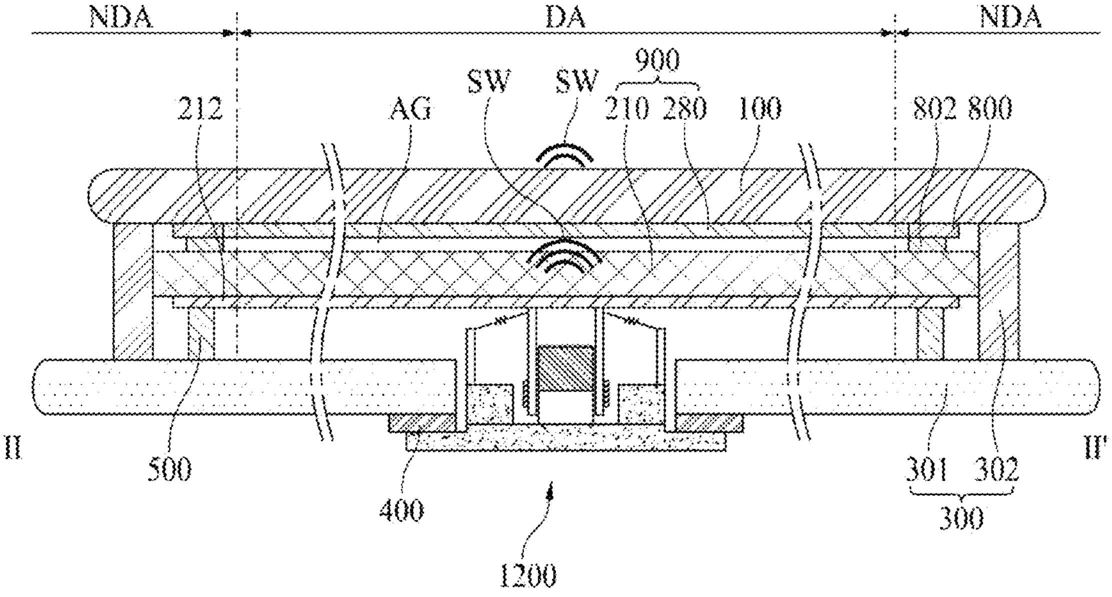
FIG. 4 is a cross-sectional view taken along line II-IF of FIG. 3B.

FIG. 4 is a cross-sectional view taken along line II-IF of FIG. 3B.

With reference to FIG. 4, the first sound generator 1200, which may be at least one coil-type sound generator, may be between a supporting member 300 and a light guide member 210. The second sound generator 800, which may be at least one piezoelectric sound generator, may be between the display panel 100 and the light guide member 210. The display apparatus according to an example embodiment of the present disclosure may have an edge type backlight structure, but embodiments are not limited thereto. An optical module 900 may include a white lamp panel including a self-light-emitting device layer that does not require a separate light source.

The supporting member 300 may support one or more of a rear surface and a side surface of the display panel 100. The supporting member 300 may include a rear cover 301 for supporting the rear surface of the display panel 100, and a side supporting member 302 for supporting the side surface of the display panel 100. The rear cover 301 may be a back cover, and the side supporting member 302 may be a middle cabinet. The rear cover 301 and the side supporting member 302 are not limited by the terms.

The rear cover 301 may cover the entire rear surface of the optical module 900. The rear cover 301 may have a plate shape, and may be formed of, e.g., a glass material, a metal material, or a plastic material. A periphery or sharp corner portion of the rear cover 301 may have a slope shape or curved shape, e.g., by a trimming or chamfering process or corner rounding process. As an example, the rear cover 301 of a glass material may include any one or more of: a sapphire glass, GORILLA® glass, or a laminated glass of the sapphire glass and the GORILLA® glass. As an example, the rear cover 301 of a metal material may be formed of any one or more of: aluminum (Al), an Al alloy, a magnesium (Mg) alloy, and an alloy of iron (Fe) and nickel (Ni). As another example, the rear cover 301 may have a stacked structure of a metal plate and a glass plate relatively thinner than the metal plate, facing the rear surface of the optical module 900. The rear surface of the display apparatus may be used as a mirror surface, e.g., by the metal plate.

The side supporting member 302 may surround the side of the optical module 900, and may reduce or prevent side light leakage of the display apparatus. For example, the side supporting member 302 may be between a rear periphery, other than one side periphery, on a rear surface of the display panel 100 and a periphery of a front surface of the supporting member 300. Thus, the side supporting member 302 may seal a portion between the display panel 100 and the supporting member 300, whereby light irradiated from the optical module 900 to the display panel 100 may be reduced or prevented from being leaked out through the side of the display apparatus. The side supporting member 302 may be a foam pad, a foam tape, and/or an adhesive resin, but embodiments are not limited thereto. For example, the side supporting member 302 may include an acrylic based material or urethane based material, and may include an urethane based material relatively flexible than the acrylic based material to minimize transfer of vibration of the display panel 100 to the rear cover 301. The side supporting member 302 may improve an appearance design of the display apparatus by sealing the portion between the display panel 100 exposed to the outside of the display apparatus and the supporting member 300. The side supporting member 302 may be omitted in accordance with a connection structure between the display panel 100, the optical module 900, and the rear cover 301.

The supporting member 300 may be a plate-shaped member formed over the rear surface of the display panel 100 or the entire display panel 100. A connection member 500 may be between the optical module 900 and the rear cover 301 to have a particular thickness (or height).

The supporting member 300 may be referred to by other terms, such as a cover bottom, a plate bottom, a back cover, a base frame, a metal frame, a metal chassis, a chassis base, and an m-chassis. Therefore, the supporting member 300 may include all types of frames or plate-shaped structures on the rear surface of the display apparatus.

A securing member 400 for securing the first sound generator 1200 and the supporting member 300 to each other may be included. The securing member 400 will be described later with reference to FIGS. 9 to 12. The first sound generator 1200 will be described with reference to FIGS. 6 and 7. The first sound generator of FIG. 7 is shown in the example of FIG. 4, but embodiments are not limited thereto. For example, the first sound generator of FIG. 6 may be applied.

In the display apparatus according to an embodiment of the present disclosure, the display panel 100 according to one embodiment may include a first substrate and a second substrate, which may be attached to each other, with the liquid crystal layer therebetween. The first substrate may be a thin film transistor array substrate, and may include a pixel array including a plurality of pixels formed per pixel area that may be defined by a plurality of gate and data lines. Each of the plurality of pixels may include a thin film transistor connected to the gate and data lines, a pixel electrode connected to the thin film transistor, and a common electrode adjoining the pixel electrode, to which a common voltage may be supplied.

The second substrate may be a color filter array substrate, and may include a black matrix having an open area overlapping each pixel area on the first substrate, and a color filter in the open area. The second substrate may be attached to the first substrate by a sealant, with the liquid crystal layer therebetween.

The liquid crystal layer is formed between the first substrate and the second substrate, and may include liquid crystals of which liquid crystal molecules may be varied in their alignment direction in accordance with an electric field formed by a data voltage applied to the pixel electrode provided in each pixel and a common voltage applied to the common electrode. Therefore, the display panel 100 may display an image using light, which may transmit the liquid crystal layer, by driving the liquid crystal layer in accordance with the electric field formed per pixel by the data and common voltages applied to each pixel.

The display panel 100 may include a first polarizing member and/or a second polarizing member. The first polarizing member may be attached to the rear surface of the first substrate, and may polarize light, which may be irradiated from the optical module 900 to the first substrate, toward a first polarizing axis. The second polarizing member may be attached to the front surface of the second substrate, and may polarize light, which may be emitted to the outside by transmitting the second substrate, toward a second polarizing axis different from the first polarizing axis.

The optical module 900 may be on the rear surface of the display panel 100. The optical module 900 may include a sheet portion 280 and/or a light guide member 210. The light guide member 210 may include, for example, a light-transmissive plastic or glass material. For example, the light guide member 210 may be, but embodiments are not limited to, a sapphire glass or GORILLA® glass, and may be a glass that may be capable using as an optical guide. The light guide member 210 may further include a plurality of optical patterns. As an example, if the light guide member 210 is formed of a light-transmissive plastic material, the plurality of optical patterns may be provided on the rear surface of the light guide member 210, e.g., in the form of an engraved or embossed pattern.

As another example, if the light guide member 210 is formed of a glass material, the plurality of optical patterns may be provided inside the light guide member 210. For example, each of the plurality of optical patterns may be provided inside the light guide member 210 adjacent to the rear surface of the light guide member 210, e.g., by a laser patterning process. Each of the plurality of optical patterns may increase light-emission efficiency of light emitted in a front direction of the light guide member 210, e.g., by scattering and refracting light incident through a light incident surface.

A light source module for irradiating light to a light incident surface in the light guide member 210 may be provided. The light source module may include a plurality of light-emitting diodes packaged in a printed circuit board for a light source and may irradiate light to the light incident surface of the light guide member 210.

Each of the plurality of light-emitting diodes may be mounted in the printed circuit board for a light source to be spaced apart from another light-emitting diode. Each of the plurality of light-emitting diodes may be spaced apart from the light incident surface of the light guide member 210 as much as an optical gap, and may have a pitch (or interval or distance) along a length direction of the light incident surface in the light guide member 210. The pitch (or interval or distance) of the plurality of light-emitting diodes and the optical gap may be set to be in a range such that a hot spot caused by a dark portion and a bright portion may not be generated in the light incident portion of the light guide member that may include a light incident surface. The printed circuit board for a light source may be a flexible printed circuit film.

A reflective plate 212 may be on the rear surface of the light guide member 210. The reflective plate 212 may reduce, minimize, or prevent light leakage on the rear surface of the light guide member 210, e.g., by totally reflecting light incident through the rear surface of the light guide member 210 toward the inside of the light guide member 210.

The sheet portion 280 may be on the rear surface of the display panel 100. The sheet portion 280 may be configured such that a polarizing member and an optical sheet portion may be integrated with each other. The optical sheet portion may be a complex optical sheet having a function for diffusing incident light and a function for condensing the diffused light. The complex optical sheet may be attached to the rear surface of the display panel 100. The complex optical sheet may be placed or supported on the front surface of the light guide member 210 such that the complex optical sheet may be in surface contact with the front surface of the light guide member 210 without an additional connection member.

As another example, the complex optical sheet may be attached to the rear surface of the display panel 100 through the connection member. For example, the complex optical sheet may be attached to the rear surface of the display panel 100 by a lamination process through the connection member. If the optical sheet portion 280 includes one complex optical sheet, a plurality of condensing patterns, which may include a prism or a lenticular pattern, may additionally be on the front surface or the rear surface of the light guide member 210.

The connection member may be a transparent connection member. For example, the connection member may be, but embodiments are not limited to, an optical adhesive or optical adhesive film. For example, the connection member may be, but embodiments are not limited to, one or more of: an optically clear adhesive (OCA), an optically clear resin (OCR), a double-sided tape, and a single-sided tape.

The optical sheet portion 280 may include first to third optical sheets. The first optical sheet may be a first diffusion sheet having an optical scattering layer or optical scattering particles. The first optical sheet may be on the front surface of the light guide member 210, and may emit light by primarily scattering or diffusing light incident from the light guide member 210.

The second optical sheet may be a first diffusion sheet having an optical scattering layer or optical scattering particles. The second optical sheet may be attached to the front surface of the first optical sheet, and may emit light by secondarily scattering or diffusing light incident from the first optical sheet.

The third optical sheet may be a prism sheet having a plurality of prism patterns. The third optical sheet may be attached to the front surface of the second optical sheet, and may emit light by condensing light incident from the second optical sheet through the plurality of prism patterns.

The second optical sheet may be replaced by a lower prism sheet. The lower prism sheet may include a plurality of lower prism patterns extending longitudinally along a horizontal axis, and may adjoin one another along a vertical axis. In one example, the third optical sheet may be an upper prism sheet. The upper prism sheet may include a plurality of upper prism patterns extending longitudinally along a vertical axis, and may adjoin one another along a horizontal axis. Therefore, the lower prism pattern and the upper prism pattern may cross each other.

As an example, the third optical sheet may be attached to the rear surface of the display panel 100 through the connection member. The second optical sheet may be attached to the rear surface of the third optical sheet through a first sheet connection member. The first optical sheet may be attached to the entire rear surface of the second optical sheet through a second sheet connection member. Each of the first and second sheet bonding members may be, but embodiments are not limited to, an optical adhesive or optical adhesive film. For example, each of the first and second sheet connection members may be one or more of: an optically clear adhesive (OCA), an optically clear resin (OCR), a porous OCA, or a porous OCR. Each of the first and second sheet connection members may be, but embodiments are not limited to, a porous OCA and/or a porous OCR, so that total reflection of light may occur in a boundary portion between the optical sheets.

Therefore, as the polarizing member and the optical sheet portion may be integrated with each other, the number of layers between the first sound generator 1200 and the display panel 100 may be reduced. Thus, any vibration of the first sound generator 1200 may be better transferred to the display panel 100 without being absorbed by many layers.

The light guide member 210 and the sheet portion 280 may be spaced apart from each other. In this case, the inventors of the present disclosure have recognized, through several tests, that difficulty in the process of attaching the light guide member 210 to the sheet portion 280 may be reduced or an increase of the manufacturing cost may be reduced or prevented. Therefore, when the light guide member 210 and the sheet portion 280 are spaced apart from each other, an air gap AG may be formed between the sheet portion 280 and the light guide member 210. Therefore, if the first sound generator 1200 is driven, the light guide member 210 may be vibrated, and this vibration may be transferred from the air gap AG to the display panel to output sound. As described with reference to FIG. 2, the inventors have recognized that loss of a sound pressure level of a high-pitched sound in the first sound generator 1200 may be generated by the air gap AG. For example, a frequency of a high-pitched sound may be 2 kHz or more. The air gap AG may be an air layer, but embodiments are not limited thereto.

The second sound generator 800 may better reduce or prevent any loss of a sound pressure level of a high-pitched sound, and may further improve a high-pitched sound. The second sound generator 800 may be in the non-display area NDA, and may be between the display panel 100 and the light guide member 210. Therefore, the second sound generator 800 may transfer a frequency of a high-pitched sound or more to the display panel 100. An adhesive member may be additionally provided between the second sound generator 800 and the display panel 100, and the second sound generator 800 may be attached to the display panel 100. The adhesive member may be, but embodiments are not limited to, a double-sided tape, a natural hardening adhesive, a single-sided tape, an adhesive, and/or a bond. For example, the adhesive member may be a thermal hardening adhesive or an photo-hardening adhesive. Because a property of the second sound generator 800 may be deteriorated by heat during a hardening process of the adhesive member, the adhesive member may be a double-sided tape or a natural hardening adhesive. Therefore, the sheet portion and the light guide member may be spaced apart from each other, and a problem of difficulty in process or an increase of the manufacturing cost may be solved. When the second sound generator 800 is provided, a sound of a high-pitched sound range may be improved. Because the second sound generator 800 is in the non-display area, the bezel area may not be increased, and a sound pressure level in a frequency domain of a high-pitched sound range may be improved. The light guide member and the sheet portion may not be spaced apart from each other, although embodiments are not limited to this configuration. This will be described later with reference to FIG. 18.

A gap may be between the second sound generator 800 and the light guide member 210. Because light leakage may occur due to the gap, a first pad 802 may reduce or prevent light leakage from occurring. The first pad 802 may include, but embodiments are not limited to, a double-sided tape, a single-sided tape, an adhesive, and/or a bond. For example, the first pad 802 may be, but embodiments are not limited to, a urethane based material. As another example, the first pad 802 may be a foam pad or an elastic resin. The first pad 802 may be realized as a material having elasticity that may be compressed to some extent, and may be formed of, but is not limited to, a polyurethane, polyolefin, and/or polyethylene material.

A line for supplying a signal to the second sound generator 800 may be disposed along a sidewall outside the light guide member 210. Alternatively, the line may be on a rear surface of the rear cover 301, which may be a supporting member.

The first sound generator 1200 may output a sound by using the light guide member as a vibration plate. The second sound generator 800 may output a sound by using the non-display area of the display panel 100 as a vibration plate. Therefore, the display panel 100 may be vibrated by driving of the first sound generator 1200, and the non-display area may be vibrated by driving of the second sound generator 800. Thus, the display apparatus, which may output the sound SW to a front direction of the display panel 100, may improve the sound pressure level in the frequency domain of the high-pitched sound range, and may have improved sound output characteristic of a low-pitched sound range to a high-pitched sound range.

Figure 5A:
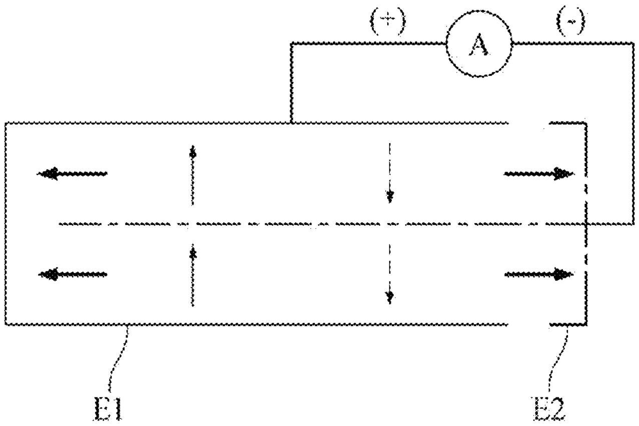
FIGS. 5A and 5B illustrate a method for generating sound of a display apparatus according to an example embodiment of the present disclosure.
Figure 5B:
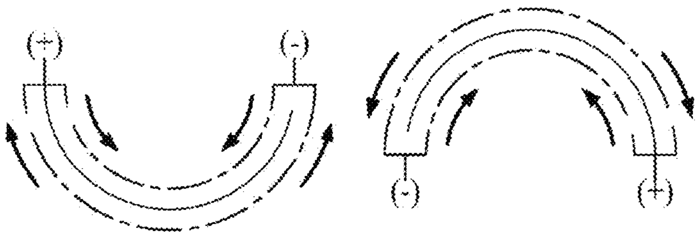

FIGS. 5A and 5B illustrate a method for generating a sound of a piezoelectric sound generator according to an example embodiment of the present disclosure.

A "piezoelectric element" means an element in which a potential difference may be generated by an electric polarizability occurring due to an external force applied thereto, whereas deformation or deformation force may be generated if a voltage is applied thereto, for example, an element having a piezoelectric effect. The piezoelectric element may be realized, for example, as crystal, tourmaline, Rochelle salt (potassium sodium tartrate tetrahydrate), barium titanate ($BaTiO_3$), ammonium dihydrogen phosphate (or monoammonium phosphate) ($NH_4H_2PO_4$), piezoceramics, etc.

The second sound generator may include a piezoelectric material layer having a piezoelectric effect, a first electrode on a front surface of the piezoelectric material layer, and a second electrode on a rear surface of the piezoelectric material layer. When the second sound generator includes a piezoelectric material layer, the second sound generator may be referred to as a piezoelectric element. The piezoelectric material layer may include a piezoelectric material that may generate vibration by means of an electric field. The first electrode and the second electrode may overlap each other by interposing the piezoelectric material layer therebetween. The first electrode and the second electrode may be formed of an opaque metal material having a relatively low resistance and excellent dissipation property, and but embodiments are not limited thereto. For example, the first electrode and the second electrode may be formed of a transparent conductive material or a conductive polymer material.

The piezoelectric material layer may be formed by sintering a material having a piezoelectric effect. The piezoelectric material layer may be characterized in that a potential difference may be generated by dielectric polarization based on a relative position change of positive (+) ions and negative (−) ions, while acting a pressure or torsion on a crystalline structure by means of an external force. Thus, vibration may be generated by an electric field according to a voltage which may be applied. For example, the piezoelectric material layer may have a hexahedral structure of a square or rectangular shape.

The piezoelectric material layer may include one or more of: a piezoelectric material of a polymer, a piezoelectric material of a thin film, a piezoelectric material of a complex material, and a piezoelectric material of single crystalline ceramic or polycrystalline ceramic. For example, the piezoelectric material layer may include an insulating elastic material such as silicon, acryl, and/or urethane. The piezoelectric material of a polymer may include one or more of: polyvinylidene difluoride (PVDF), polyvinylidene fluoride-co-trifluoroethylene (P(VDF-TrFe)), or P(VDFTeFE). The piezoelectric material of a polymer may be realized through a piezoelectric polymer material, such as PVDF or PZT (e.g., a generic term of solid solution of lead zirconate ($PbZrO_3$) and lead titanate ($PbTiO_3$)), and PVDF may include polyvinylidene fluoride trifluoroethylene (PVDF-TrFE), and may be characterized in that it may be easy to be manufactured in the form of a flexible film.

The piezoelectric material of a thin film may include one or more of: zinc oxide (ZnO), cadmium sulfide (CdS), and aluminum nitride (AlN), for example. The piezoelectric material of a complex material may include one or more of: lead zirconate titanate (PZT)-PVDF, PZT-Silicon Rubber, PZT-Epoxy, PZT-foam polymer, and PZT-foam urethane, for example. The piezoelectric material of single crystalline ceramic may include one or more of: alpha-aluminum phosphate ($\alpha$-$AlPO_4$), alpha-silicon dioxide ($\alpha$-$SiO_2$), lithium niobate ($LiNbO_3$), terbium molydbate ($Tb_2(MoO_4)_3$), lithium borate (or lithium tetraborate) ($Li_2B_4O_7$), and ZnO, for example. The piezoelectric material of polycrystalline ceramic material may include one or more of: a PZT based material, a PT based material, a PZT-Complex Perovskite based ceramic material, and a $BaTiO_3$ material.

Therefore, the piezoelectric element may have a structure such that a piezoelectric element provided with an electrode is attached to both surfaces of a metal vibration plate or polymer by an adhesive. When an alternating current voltage is applied to both surfaces of the piezoelectric element, shape deformation of the piezoelectric element may be generated and transferred to the vibration plate, and a sound may be generated.

A piezoelectric speaker based on the piezoelectric element may be categorized into a film type piezoelectric speaker and a laminated type piezoelectric speaker. The film type piezoelectric speaker is based on the principle that electrodes may be formed at lower and upper portions using a piezoelectric film material and voltages may be applied to generate sound.

The laminated type piezoelectric speaker may include several layers, including a piezoelectric element between the two electrodes. The laminated type piezoelectric speaker may apply an alternating current voltage between the two electrodes, and may generate a sound by means of bending in an up-and-down direction based on the alternating current voltage. The piezoelectric element may use, but is not limited to, the aforementioned materials. The second sound generator configured using the laminated type piezoelectric speaker will be described as an example, and may be applied to the film type piezoelectric speaker similarly as described with reference to the laminated type piezoelectric speaker. This second sound generator will be described with reference to FIGS. 5A and 5B.

FIG. 5A illustrates a side structure of a sound generator. With reference to FIG. 5A, a positive (+) voltage and a negative (−) voltage may be respectively applied to a first electrode E1 and a second electrode E2. If a voltage in an opposite direction of a polarization direction (solid line) is applied (electric field direction is shown as a dotted line), a stress may be generated by the piezoelectric effect, and deformation contracted or expanded in a displacement direction (thick solid line) may be generated. Therefore, as shown in FIG. 5B, the piezoelectric type sound generator may generate deformation due to an alternating current voltage, and may be switched or bent in an up-and-down action mode in a displacement direction (thick solid line). Vibration may be generated by the up-and-down action mode, and sound may be generated by the vibration.

Figure 6:
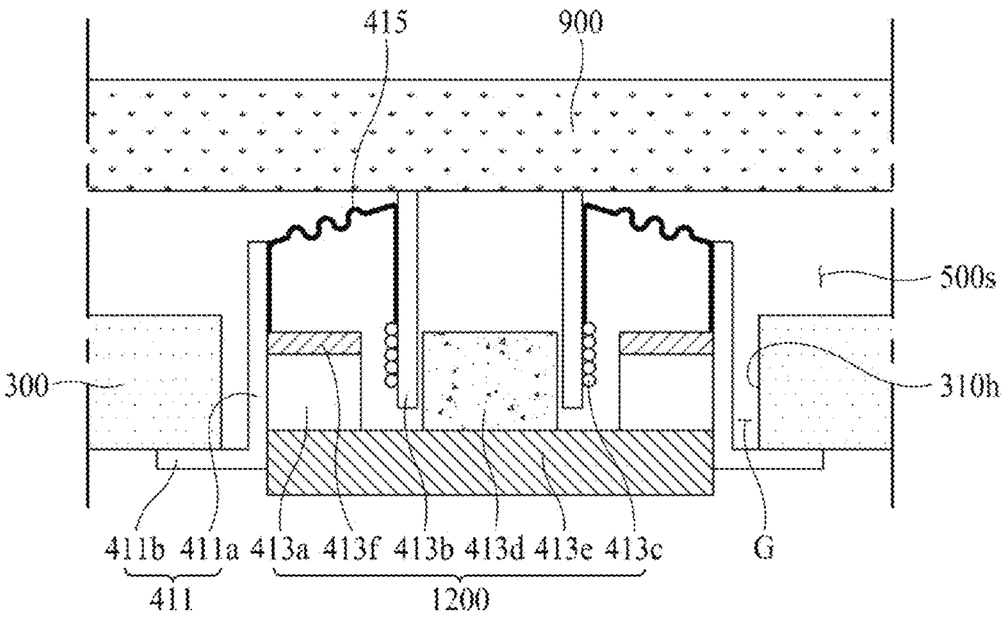
FIG. 6 illustrates a sound generator according to an example embodiment of the present disclosure.
Figure 7:
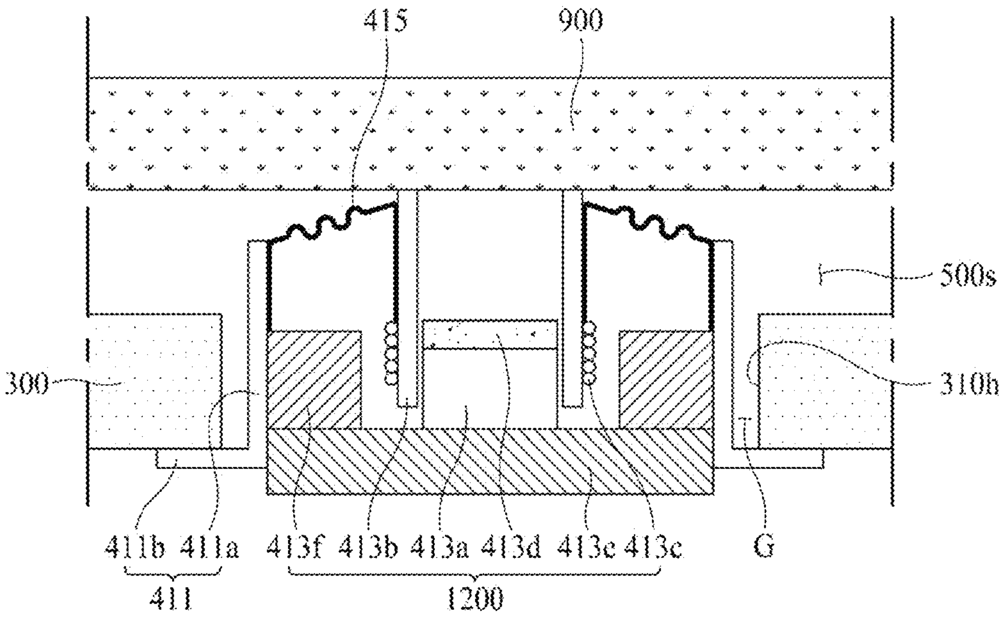
FIG. 7 illustrates a sound generator according to another example embodiment of the present disclosure.

FIG. 6 illustrates a sound generator according to an example embodiment of the present disclosure.

With reference to FIG. 6, the sound generator according to an example embodiment of the present disclosure may include a first sound generator 1200, which may be at least one coil-type sound generator, fixed to the supporting member 300, which may vibrate the display panel 100 through the optical module 900. The optical module 900 of the examples of FIGS. 6 and 7 may be the light guide member and the sheet portion described with reference to the example of FIG. 4, or may be a light guide member and an optical sheet portion described in the example of FIG. 18.

The first sound generator 1200, which may be at least one coil-type sound generator, may be configured to vibrate the optical module 900 in accordance with a current applied based on Fleming's Left-Hand Rule for Motors, and may be referred to as a "vibration generating module" or a "sound-generating module." The first sound generator 1200, which may be at least one coil-type sound generator, may be on the rear surface of the optical module 900. For example, the first sound generator 1200 may be at or near the center of the rear surface of the optical module 900 or at or near the center of the screen of the display panel 100. The first sound generator 1200, which may be at least one coil-type sound generator, may be in first and second areas of the display panel 100. The first area may be a left area of the optical module 900 or the display panel 100, and the second area may be a left area of the optical module 900 or the display panel 100. The first area may be a left area of the optical module 900 or the display area, and the second area may be a right area of the optical module 900 or the display area. It should be appreciated that "left" and "right" as used herein are interchangeable, as would be understood to one of ordinary skill in the art. The terms are used herein for convenience of explanation.

The supporting member 300 may be on the rear surface of the display panel 100 or on the rear surface of the optical module 900. A module frame 411 may support the first sound generator 1200, which may be at least one coil-type sound generator. The module frame 411 may be fixed to the supporting member 300 to be partially accommodated or inserted in a supporting hole 310*h* in the supporting member 300. For example, the module frame 411 may include a frame body 411*a* and a supporting bracket 411*b*.

An upper portion of the frame body 411*a* may partially be accommodated or inserted in the supporting hole 310*h* in the supporting member 300 based on a thickness direction of the display panel 100. Thus, the frame body 411*a* may be in a space 500*s* between the optical module 900 and the supporting member 300. A particular gap G may be provided between the frame body 411*a* and the supporting hole 310*h* of the supporting member 300. The gap G may serve as a vent hole for active air circulation within the space 500*s* during vibration of the optical module 900. The gap G may also serve as a passage through which a noise component, which may be generated during driving of the first sound generator 1200 that may be at least one coil-type sound generator, in addition to a sound pressure level according to vibration of the optical module 900, may be discharged. The supporting bracket 411*b* may be at each of one side and the other side of the frame body 411*a*, which may be in parallel with each other, and may be fixed to the rear surface of the supporting member 300.

The first sound generator 1200, which may be at least one coil-type sound generator, may be in the module frame 411 to vibrate the optical module 900. For example, at least one coil-type sound generator 1200 may include a magnet 413*a*, a bobbin 413*b* around a center pole 413*d*, and a coil 413*c* around the bobbin 413*b*. The first sound generator 1200, which may be at least one coil-type sound generator, may be expressed as a dynamic type or external type sound generator provided with the magnet 413*a* at the outer side of the coil 413*c*.

The magnet 413*a* may be a permanent magnet. For example, a sintering magnet, which may include a material such as barium ferrite, may be used as the magnet 413*a*. A material of the magnet 413*a* may include one or more of: ferric oxide ($Fe_2O_3$), barium carbonate (or witherite) ($BaCO_3$), a neodymium (Nd) magnet, strontium ferrite ($Fe_{12}O_{19}Sr$), e.g., with an improved magnet component, an alloy cast magnet including aluminum (Al), nickel (Ni), and cobalt (Co), and the like. As another example, the neodymium magnet may be neodymium-iron-boron (Nd—Fe—B). However, embodiments are not limited these examples. The magnet 413*a* may have a ring shape, although embodiments are not limited thereto.

The bobbin 413*b* may be accommodated or inserted into the magnet 413*a*. For example, the bobbin 413*b* may be received or inserted into the magnet 413*a*, whereby an outer circumference of the bobbin 413*b* may be surrounded by the magnet 413*a*. For example, the bobbin 413*b* may be a structure including a material by processing pulp or paper, aluminum (Al), magnesium (Mg), and/or alloy of Al and Mg, a synthetic resin, such as polypropylene, or a polyamide based fiber. Embodiments are not limited to these examples.

The bobbin 413*b* may be configured in, but is not limited to, a circular shape or an oval shape. An oval shape may include an elliptical shape, an egg-shape, a rectangular shape with rounded corners, or other non-circular curved shape having a width different than its height. If the bobbin 413*b* is configured in an oval shape, a sound of a high-pitched sound range, higher than that of the circular shape, may be improved, and heat generated by vibration of the bobbin 413*b* may be reduced. Thus, a heat dissipation property may be improved.

The coil 413*c* may be wound to surround the lower outer circumference of the bobbin 413*b*, and may be supplied with a current for generating a sound from the outside. The coil 413*c* may be lifted with the bobbin 413*b*. In this case, the coil 413*c* may be referred to as a "voice coil." If a current is applied to the coil 413*c*, the bobbin 413*b* may be fully guided by the center pole 413*d* and then moved in accordance with Fleming's Left-Hand Rule for Motors based on an applied magnetic field formed around the coil 413*c* and an external magnetic field formed around the magnet 413*a*. Because a front surface (or front end) of the bobbin 413*b* may be in contact with the rear surface of the optical module 900, the bobbin 413*b* may vibrate the rear surface of the optical module 900 in accordance with an applied current state or non-applied current state, and a sound wave may be generated by vibration of the display panel 100 interworking or linked with vibration of the optical module 900.

The bobbin 413*b* may include a buffering pad. The buffering pad may be on the front surface of the bobbin 413*b*, and may transfer an ascension (or vibration) of the bobbin 413*b* to the rear surface of the optical module 900. For example, the buffering pad may be a plate-shaped member having a ring shape attached to the front surface of the bobbin 413*b*, or may be a plate-shaped member covering the front surface of the bobbin 413*b*.

The center pole 413*d* may be accommodated or inserted into the bobbin 413*b*, and may guide ascension of the bobbin 413*b*. For example, the center pole 413*d* may be accommodated or inserted into the bobbin 413*b* having a cylindrical shape, whereby the outer circumference of the center pole 413*d* may be surrounded by the bobbin 413*b*. In this case, the center pole 413*d* may be referred to as an "ascending guider" or "pole pieces."

The sound generator 1200, which may be the coil-type sound generator, may further include a first plate 413*e* and a second plate 413*f* The first plate 413*e* may be fixedly accommodated or inserted into a hollow portion provided in the module frame 411, and may support each of the rear surface of the magnet 413*a* and the rear surface of the center pole 413*d*. The second plate 413*f* may be on the front surface of the center pole 413*d*.

Each of the first plate 413*e* and the second plate 413*f* may include a material having magnetic component, such as iron (Fe). Iron may allow a magnetic component to be well-transferred to the magnet 413*a*. The first plate 413*e* and the second plate 413*f* may be referred to as another term, such as a yoke, etc.

The center pole 413*d* and the first plate 413*e* may be formed in a single body. For example, the center pole 413*d* may vertically protrude from the front surface of the first plate 413*e* to have a shape capable of being inserted into the bobbin 413*b*, and then may be accommodated or inserted into the bobbin 413*b*.

A damper 415 may be between the module frame 411 and the sound generator 1200, which may be the coil-type sound generator. For example, the damper 415 may be between a body protrusion of the frame body 411*a* constituting the module frame 411 and the bobbin 413*b* constituting the sound generator 1200, which may be the coil-type sound generator. The damper 415 may be referred to as another term, such as a spider, a suspension, an edge, etc.

One end of the damper 415 may be connected with an inner sidewall of the body protrusion, and the other end of the damper 415 may be connected with an upper outer side of the bobbin 413*b*. The damper 415 may have a corrugated structure between one end and the other end, and may control vibration of the bobbin 413*b* while being contracted and relaxed in accordance with up-and-down movement of the bobbin 413*b*. Therefore, the damper 415 may be connected between the bobbin 413*b* and the module frame 411 to limit a vibration distance of the bobbin 413*b* through a restoring force. For example, if the bobbin 413*b* is vibrated at a particular distance or more, or vibrated at a particular distance or less, the bobbin 413*b* may be restored to its original position by the restoring force of the damper 415.

The first sound generator 1200, which may be the coil-type sound generator, may include two or more sound generators spaced apart from each other and in parallel, a pair of sound generators, or an oval type sound generator. Each of the two or more sound generators, each of the pair of sound generators or the oval type sound generator may include the module frame 411 and the damper 415.

FIG. 7 illustrates a sound generator according to another example embodiment of the present disclosure.

With reference to FIG. 7, the first sound generator 1200, which may be a coil-type sound generator may have an internal magnetic type in which the magnet 413*a* may be at an inner side of the coil 413*c*. Because the sound generator shown in FIG. 7 is similar to the sound generator described above with reference to the FIG. 6 example, a duplicate description will be omitted or only briefly made.

The first sound generator 1200 may include a magnet 411*a* provided at the center of the first plate 413*e*, a center pole 413*d* on a front surface of the magnet 411*a*, a bobbin 413*b* surrounding an outer side of the magnet 411*a* and an outer side of the center pole 413*d*, a coil 413*c* wound to surround a lower outer circumference of the bobbin 413*b*, and a second plate 413*f* protruding toward a periphery of a front surface of the first plate 413*e*, surrounding the coil 413*c*. The first plate 413*e* and the second plate 413*f* may be formed in a single body having a "U" shape. The first and second plates 413*e* and 413*f* may be referred to as another term, such as a yoke, etc. The first sound generator 1200, which may be the internal magnetic type, may have an advantage in that it may have a small leakage magnetic flux and a small size.

The display apparatus according to an example embodiment of the present disclosure may include a sound generator 1200 of an external magnetic type or an internal magnetic type. Hereinafter, the sound generator 1200 of an internal magnetic type will be described as an example.

The sound generator 1200 of the display apparatus according to an example embodiment of the present disclosure is not limited to the structure shown in the examples of FIG. 6 or FIG. 7, and may include another type sound generator that is capable of generating a sound by vibrating the display panel 100 in forward and rear directions in accordance with an applied current.

Figure 8A:
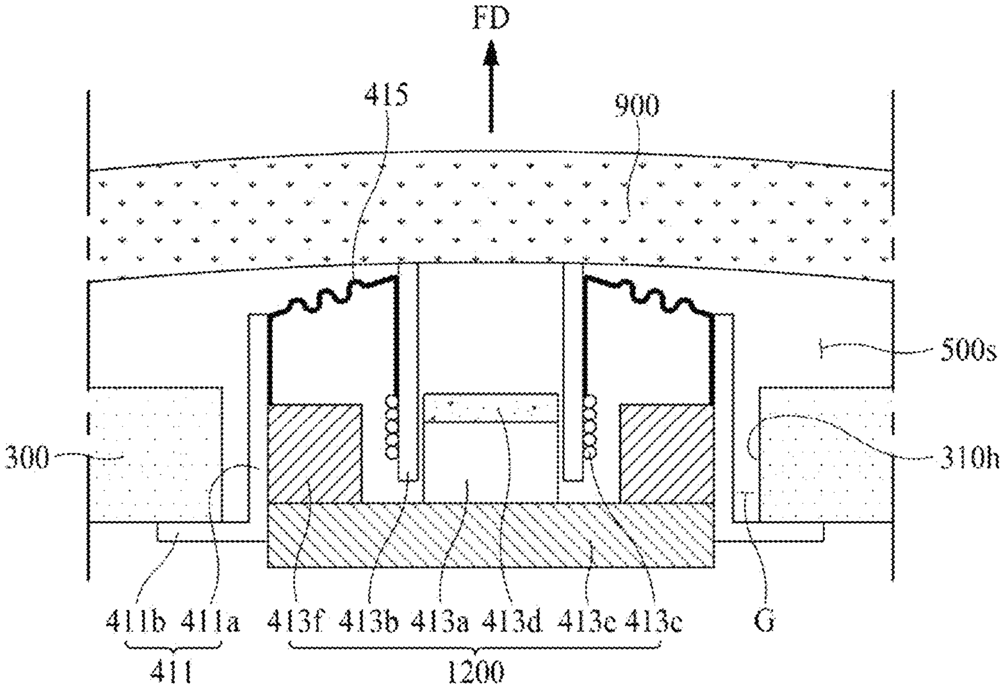
FIGS. 8A and 8B illustrate a method for generating sound of a display apparatus according to another example embodiment of the present disclosure.
Figure 8B:
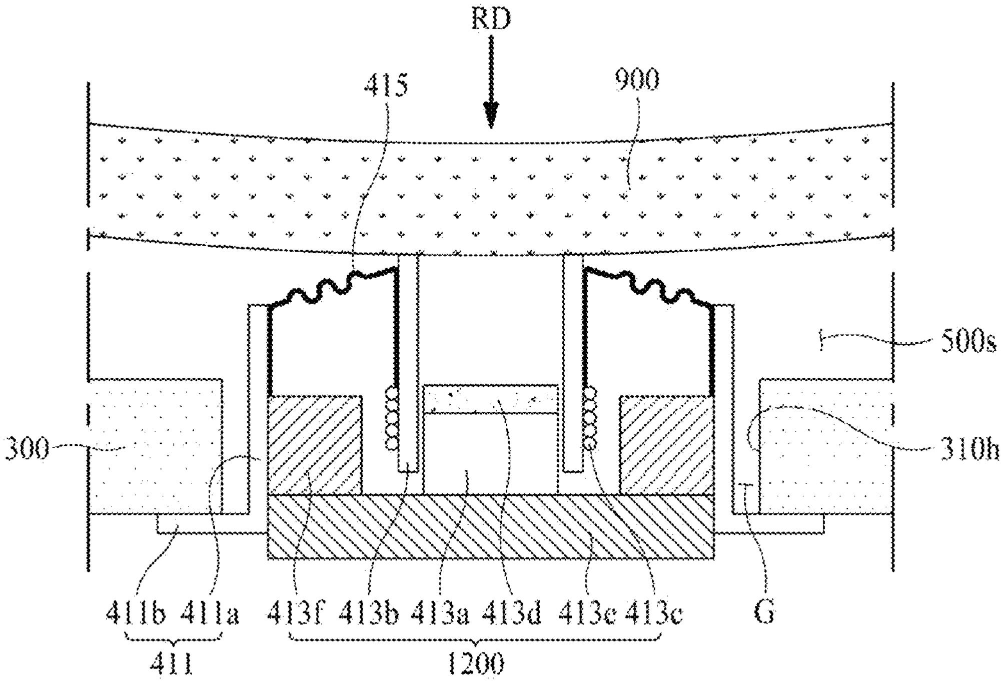

FIGS. 8A and 8B illustrate a method for generating a sound of a display apparatus according to another example embodiment of the present disclosure.

In the first sound generator 1200, the center pole 413*d* on the first plate 413*e* for supporting the magnet 413*a* may become a north pole (N-pole) and the second plate 413*f* connected with the front surface of the magnet 413*a* may become a south pole (S-pole), and an external magnetic field may be formed between the center pole 413*d* and the second plate 413*f*. In this state, if the current for generating a sound may be applied to the coil 413*c*, an applied magnetic field may be formed around the coil 413*c*, and a force for moving the bobbin 413*b* to a forward direction (FD) of the display panel by means of the applied magnetic field and the external magnetic field may be generated, as shown as an arrow in FIG. 8A. Therefore, as the bobbin 413*b* moves to the forward direction FD of the display panel, the optical module 900, which may be in contact with the bobbin 413*b*, may be vibrated in the forward direction FD, and the display panel 100 may be vibrated. The sound wave generated by vibration of the display panel 100 may be output to the forward direction FD of the display panel 100. The optical module 900 may be the light guide member and the sheet portion described with reference to the FIG. 4 example, or may be the light guide member and the optical sheet portion described with reference to the FIG. 18 example.

If the current applied to the coil 413*c* is stopped or a current of an opposite direction is applied to the coil 413*c* in a state that the bobbin 413*b* is moved to the forward direction FD, a force for moving the bobbin 413*b* to a rear direction (RD) of the display panel 100 by means of an applied magnetic field and an external magnetic field may be generated, as shown by an arrow in FIG. 8B. Therefore, as the bobbin 413*b* moves to the rear direction RD of the display panel 100, the optical module 900, which may be in contact with the bobbin 413*b*, may be vibrated in the rear direction RD, and the display panel 100 may be vibrated. The sound wave generated by vibration of the display panel 100 may be output to the forward direction FD of the display panel 100. Therefore, the display apparatus may vibrate the display panel 100 in forward and rear directions FD and RD in accordance with a direction and size of a current applied to the coil 413*c*, thereby outputting the sound in the forward direction FD of the display panel 100.

FIGS. 9 to 12 illustrate a connection structure of a sound generator and a supporting member of a display apparatus according to another example embodiment of the present disclosure.

In FIGS. 9 to 12, the optical module 900 may be the light guide member and the sheet portion described with reference to the FIG. 4 example above, or may be the light guide member and the optical sheet portion described with reference to the FIG. 18 example below.

Figure 9:
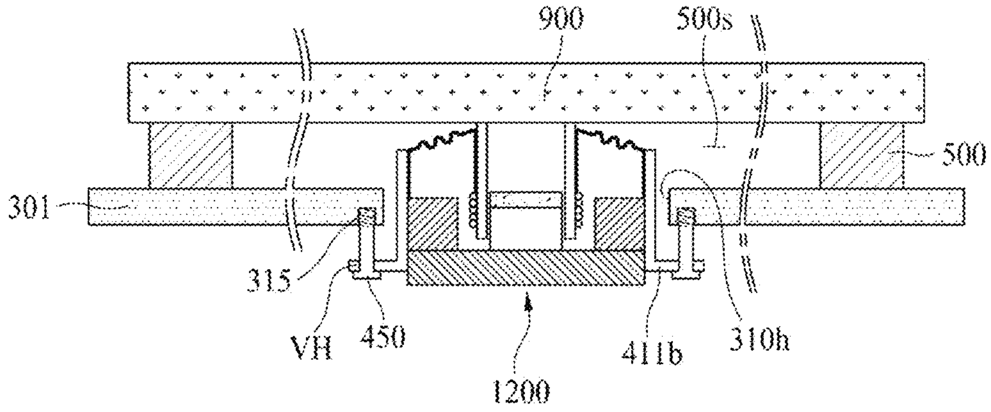
FIGS. 9 to 12 illustrate a connection structure of a sound generator and a supporting member of a display apparatus according to another example embodiment of the present disclosure.

With reference to FIG. 9, the first sound generator 1200 may be fixed to the rear cover 301 such that it may be accommodated or inserted into the supporting hole 310*h* in the rear cover 301 that may be a supporting member. For example, a portion of the first sound generator 1200, other than the supporting bracket 411*b*, may be accommodated or inserted into the supporting hole 310*h* of the rear cover 301, and may be connected to the rear surface of the optical module 900. The supporting bracket 411*b* of the first sound generator 1200 may be fixed to the rear surface of the rear cover 301 corresponding to the periphery of the supporting hole 310*h*.

The display apparatus may further include a fastening member 450 for connecting between the first sound generator 1200 and the rear cover 301. The fastening member 450 may fix the first sound generator 1200 to the rear cover 301 by securing the supporting bracket 411*b* of the first sound generator 1200 to the rear surface of the rear cover 301. The fastening member 450 may include a head portion, and a fastening portion connected to the head portion to have a screw thread. For example, the fastening member 450 may include a bolt, a screw, etc.

The supporting bracket 411*b* of the first sound generator 1200 may include a through hole VH through which the fastening portion of the fastening member 450 may pass. The rear cover 301 may include a screw hole 315 overlapping the through hole VH, and into which the fastening portion of the fastening member 450 may be fastened. Therefore, the fastening member 450 may be fastened into the screw hole 315 of the rear cover 301 through the through hole VH of the supporting bracket 411*b* to fix the supporting bracket 411*b* to the rear surface of the rear cover 301, thereby securing the first sound generator 1200 to the rear cover 301.

The first sound generator 1200 may be partially accommodated or inserted into the supporting hole 310*h* of the rear cover 301, and may be connected to the rear surface of the optical module 900, and a distance between the optical module 900 and the rear cover 301 may be reduced. Therefore, the thickness of the display apparatus may reduce. For example, the first sound generator 1200 may be between the rear cover 301 and the rear surface of the optical module 900. For example, the distance between the optical module 900 and the rear cover 301 may be increased as much as the thickness (or height) of the first sound generator 1200. Alternatively, because the first sound generator 1200 may partially pass through the rear cover 301, the distance between the optical module 900 and the rear cover 301 may be reduced.

A connection member 500 may be between the optical module 900 and the rear cover 301, and may have a particular thickness (or height). The connection member 500 may have a sealing structure, e.g., of a four-sided sealing type or a closed loop type. The coupling member 500 may be between a periphery of a rear surface of the optical module 900 and a periphery of a front surface of the rear cover 301, and may connect the rear cover 301 to the rear surface of the optical module 900. Thus, the space 500*s* may be provided between the rear surface of the optical module 900 and the rear cover 301. The space 500*s* may be used as an accommodating space in which the first sound generator 1200 received in the supporting hole 310*h* of the rear cover 301 may be partially arranged, and a panel vibration space for vibration of the display panel 100 according to driving of the first sound generator 1200.

The connection member 500 may be, but is not limited to, a double-sided tape, a single-sided tape, an adhesive, and/or a bond. For example, the double-sided tape may be, but is not limited to, an acrylic based tape. As another example, the double-sided tape may be a urethane based foam pad or an elastic resin. The connection member 500 may include a material having elasticity that may be compressed to some extent, and may be formed of, but is not limited to, a polyurethane, a polyolefin, and/or a polyethylene material.

Figure 10:
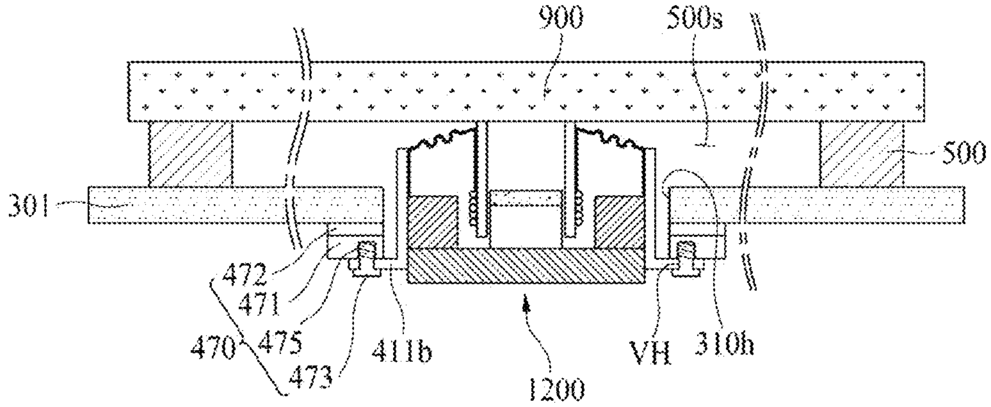

The display apparatus may further include a module securing member 470 for securing the sound generator 1200 to the rear surface of the supporting member 300, as shown in the example of FIG. 10. The module securing member 470 may include a securing frame 471 attached to the rear surface of the supporting member 300, a securing member 472, and a fastener 473 for securing the first sound generator 1200 to the securing frame 471.

The securing frame 471 may be between the supporting bracket 411*b* of the first sound generator 1200 and the rear surface of the rear cover 301 constituting the supporting member to support the first sound generator 1200. The securing frame 471 may be attached to the rear cover 301 by the securing member 472. For example, the securing frame 471 may have a ring shape, e.g., formed of rubber, plastic, and/or a metal material. The securing frame 471 may be referred to as a "washer." The securing member 472 may be, but is not limited to, a foam pad, a resin, a double-sided tape, a single-sided tape, an adhesive, and/or a bond.

The fastener 473 may fix the first sound generator 1200 to the rear surface of the rear cover 301 by securing the supporting bracket 411*b* of the first sound generator 1200 to the securing frame 471. The fastener 473 may include a head portion, and a fastening portion connected to the head portion to have a screw thread. For example, the fastener 473 may include a bolt, a screw, etc.

The supporting bracket 411*b* of the first sound generator 1200 may include a through hole VH through which the fastening portion of the fastener 473 may pass. The securing frame 471 may include a screw hole 475 overlapping the through hole VH, and into which the fastening portion of the fastener 473 may be fastened. Therefore, the fastener 473 may be fastened into the screw hole 475 of the securing frame 471 through the through hole VH of the supporting bracket 411*b* to fix the supporting bracket 411*b* to the rear surface of the securing frame 471, thereby securing the first sound generator 1200 to the rear surface of the rear cover 301 through the securing frame 471.

The first sound generator 1200 may be partially received or inserted into the supporting hole 310*h* of the rear cover 301, and the distance between the optical module 900 and the rear cover 301 may be reduced. Therefore, the thickness of the display apparatus may be reduced. Vibration of the first sound generator 1200 may be buffered by the module securing member 470, and vibration transferred from the first sound generator 1200 to the rear cover 301 may be minimized.

The connection member 500 may be between the optical module 900 and the rear cover 301, and may have a particular thickness (or height). The connection member 500 may have a sealing structure, e.g., of a four-sided sealing type or a closed loop type. The connection member 500 may be between a periphery of a rear surface of the optical module 900 and a periphery of a front surface of the rear cover 301 to connect the rear cover 301 to the rear surface of the optical module 900. Thus, the space 500*s* may be provided between the rear surface of the optical module 900 and the rear cover 301. The space 500*s* may be used as an accommodating space in which the first sound generator 1200, received in the supporting hole 310*h* of the rear cover 301, may be partially disposed, and as a panel vibration space for vibration of the display panel 100 according to driving of the first sound generator 1200.

The connection member 500 may be, but is not limited to, a double-sided tape, a single-sided tape, an adhesive, and/or a bond. For example, the double-sided tape may be, but is not limited to, an acrylic based tape. As another example, the double-sided tape may be a urethane based foam pad or an elastic resin. The connection member 500 may include a material having elasticity that may be compressed to some extent, and may be formed of, but is not limited to, a polyurethane, a polyolefin, and/or a polyethylene material.

Figure 11:
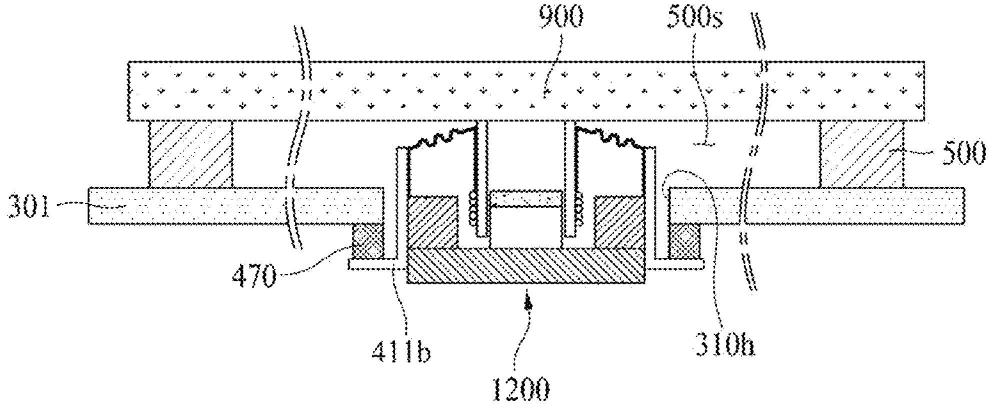

The module securing member 470 may be a double-sided tape, a single-sided tape, an adhesive, and/or a bond, as shown in the example of FIG. 11. For example, the first sound generator 1200 may be fixed to the rear surface of the rear cover 301 by a double-sided tape, a single-sided tape, an adhesive, and/or a bond. As an example, the module securing member 470 formed of a double-sided tape may include an acrylic based material or a urethane based material. For example, the module securing member 470 may include a urethane based material, having a relatively flexible property, to reduce vibration transferred from the first sound generator 1200 to the rear cover 301. For instance, the module securing member 470 may include a foam pad including a urethane based material, and an adhesive layer provided on each of a rear surface of the foam pad and a rear surface of the foam pad.

Vibration of the first sound generator 1200 may be buffered using elasticity of the module securing member 470 formed of, e.g., a double-sided tape, a single-sided tape, an adhesive, and/or a bond. Thus, vibration transferred from the first sound generator 1200 to the rear cover 301 may be reduced.

The connection member 500 may be between the optical module 900 and the rear cover 301, and may have a particular thickness (or height). The coupling member 500 may have a sealing structure, e.g., of a four-sided sealing type or a closed loop type. The connection member 500 may be between a periphery of a rear surface of the optical module 900 and a periphery of a front surface of the rear cover 301, and may connect the rear cover 301 to the rear surface of the optical module 900. Thus, the space 500*s* may be provided between the rear surface of the optical module 900 and the rear cover 301. The space 500*s* may be used as an accommodating space in which the first sound generator 1200 accommodated in the supporting hole 310*h* of the rear cover 301 may be partially disposed, and as a panel vibration space for vibration of the display panel 100 according to driving of the first sound generator 1200. The supporting hole 310*h* may be punctured in a particular area of the rear cover 301 to have, for example, a circular shape or polygonal shape along a thickness direction of the rear cover 301. The connection member 500 may be, but is not limited to, a double-sided tape, a single-sided tape, an adhesive, and/or a bond. If the optical module 900 and the rear cover 301 are fixed to each other by a bond, it may be advantageous in that the optical module may be attached to the rear cover 301 more tightly.

Figure 12:
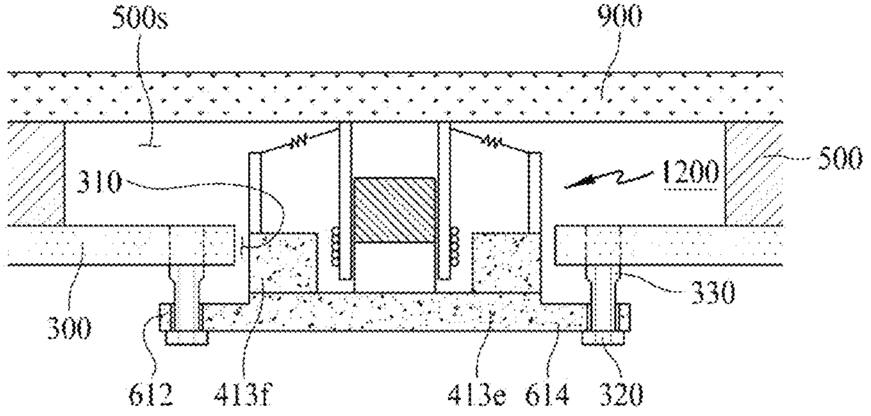

FIG. 12 illustrates a connection structure of a sound generator and a supporting member of a display apparatus according to another example embodiment of the present disclosure. With reference to FIG. 12, an enlarged diameter portion 614 may be formed in a single body with the first plate 413*e* of the first sound generator 1200. An extension portion 612 may be formed at a part of the enlarged diameter portion 614. Instead of a cylindrical shape of the first plate 413*e* shows in the FIG. 12 example, a protrusion having a diameter greater than a diameter of the other portion of the first plate 413*e* may be formed at the lower side of the first plate 413*e*. A protrusion area having an increased diameter may be referred to as the "enlarged diameter" portion 614. The enlarged diameter portion 614 may be formed, for example, in a ring shape. The extension portion 612 for fixation of the first sound generator 1200 may be formed at a part of the enlarged diameter portion 614. The first sound generator 1200 may be accommodated in the supporting hole 310*h* in the supporting member 300.

The extension portion 612 may include a screw 320 and a nut 330. The first sound generator 1200 may be connected to the supporting member 300 by the screw 320 using the nut 330 fixed to the supporting member 300. In one example, the nut 330 may be a self-clinching nut. An example of the self-clinching nut may be a PEM® nut, although embodiments are not limited thereto. If the self-clinching nut may be used, some of a vibration generated in the first sound generator 1200 may be absorbed by the nut 330. Thus, a vibration transferred to the supporting member 300 may be reduced.

The optical module 900 may be attached to the bobbin 413*b* of the first sound generator 1200. The connection member 500 may be between the optical module 900 and the supporting member 300, and may have a particular thickness (or height). The connection member 500 may have a sealing structure, e.g., of a four-sided sealing type or a closed loop type. The connection member 500 may be between a periphery of a rear surface of the optical module 900 and a periphery of a front surface of the rear cover 301, and may connect the supporting member 300 to the rear surface of the optical module 900. Thus, the space 500*s* may be provided between the rear surface of the optical module 900 and the supporting member 300. The space 500*s* may be used as an accommodating space in which the first sound generator 1200 accommodated in the supporting hole 310*h* of the supporting member 300 may be partially disposed, and as a panel vibration space for vibration of the display panel 100 according to driving of the first sound generator 1200. The connection member 500 may be, but is not limited to, a double-sided tape, a single-sided tape, an adhesive, and/or a bond.

In the examples of FIGS. 9 to 12, an adhesive member may be further provided between the optical module 900 and the first sound generator 1200. When the adhesive member is included, in addition to the connection member 500, the first sound generator 1200 and the optical module 900 may be attached to each other more tightly. The adhesive member may be, but is not limited to, a double-sided tape, a single-sided tape, an adhesive, and/or a bond.

One first sound generator is shown in FIGS. 9 to 12 as an example, but two first sound generators may be provided, as shown in the examples of FIGS. 3A and 3B. Two sound generators and a pair of sound generators or an oval type sound generator may be provided, as shown in the examples of FIGS. 20 and 21.

The first sound generator may generate sounds of middle and high-pitched sound ranges, and the second sound generator may also be provided in the non-display area NDA to further generate sound of a high-pitched sound range. For example, the second sound generator 800 may be in the non-display area NDA, and may be attached to a rear surface of a first substrate 110 by an adhesive member 801 (see FIG. 18 and its description below).

Figure 13:
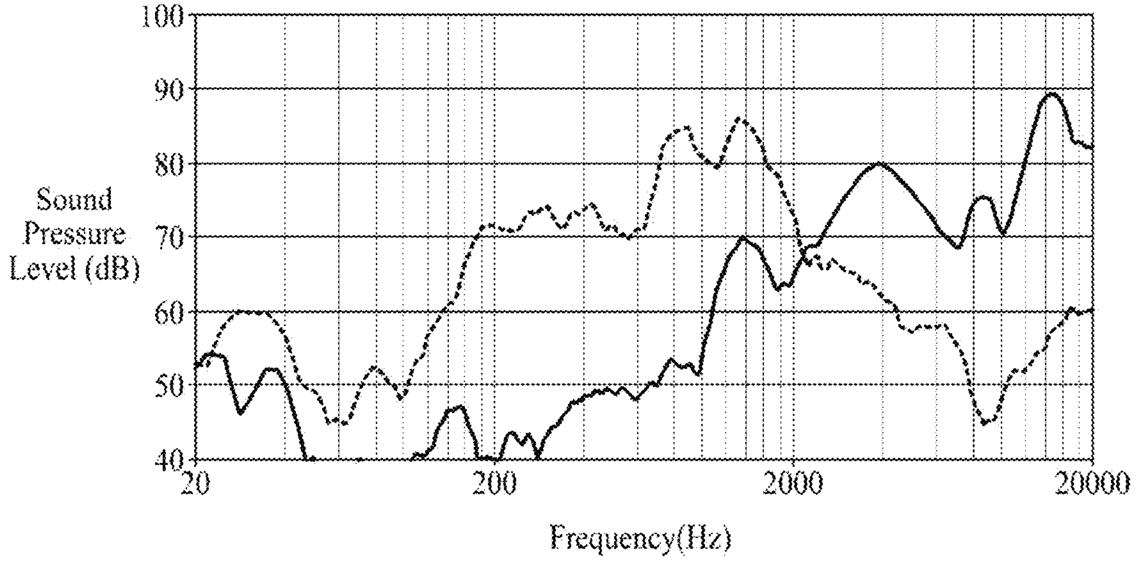
FIG. 13 illustrates a sound output characteristic according to another example embodiment of the present disclosure.

FIG. 13 illustrates a sound output characteristic according to another example embodiment of the present disclosure.

FIG. 13 illustrates a sound output characteristic of a sound output portion that may include first and second sound generators, as shown in the FIG. 3B example. In FIG. 13, a horizontal axis (x-axis) represents a frequency in hertz (Hz), and a vertical axis (y-axis) denotes a sound pressure level in decibels (dB).

The sound output characteristic may be measured by a sound analysis equipment. The sound analysis equipment may include a sound card for receiving a sound from a control PC and for transmitting sound to the control PC, an amplifier for amplifying a signal (sound signal) generated from the sound card and for transmitting the amplified signal (sound signal) to the sound generators 800 and 1200, and a microphone for collecting the sound generated through the sound generators 800 and 1200 in the display panel. The sound collected in the microphone may be input to the control PC through the sound card, and may be identified by a control program. Thus, the sound of the sound generators 800 and 1200 may be analyzed.

In FIG. 13, a dotted line denotes a sound output characteristic of the first sound generator 1200, and a solid line denotes a sound output characteristic of the second sound generator 800. With reference to FIG. 13, because the second sound generator is used in another embodiment of the present disclosure, it may be noted that a sound pressure level may be increased in an area in which a frequency area of a high-pitched sound range is 2 kHz or more. For example, the second sound generator may compensate for loss of a sound pressure level at 2 kHz or more, which may be generated when the first sound generator is provided, and a sound of a high-pitched sound range may be generated. Because a problem of a feeling that a sound seems to be interrupted or blocked may be solved, a clear sound may be provided. Therefore, the first sound generator and the second sound generator may be provided, and the first sound generator may generate sounds of middle and high-pitched sound ranges, and the second sound generator may generate sound of a high-pitched sound range. The second sound generator, which may be a piezoelectric sound generator, may be provided, and a sound in a frequency domain of a high-pitched sound range may be increased. The second sound generator, which may compensate for high sound of the first sound generator, may be provided, and the display apparatus may uniformly generate sound quality in the frequency domain from a low-pitched sound range to a high-pitched sound range. The second sound generator may be in the non-display area, and a stereo effect of the sound may be improved.

The sound pressure level may be varied depending on the size of the second sound generator which may be the piezoelectric sound generator. This will be described with reference to FIG. 14.

Figure 14:
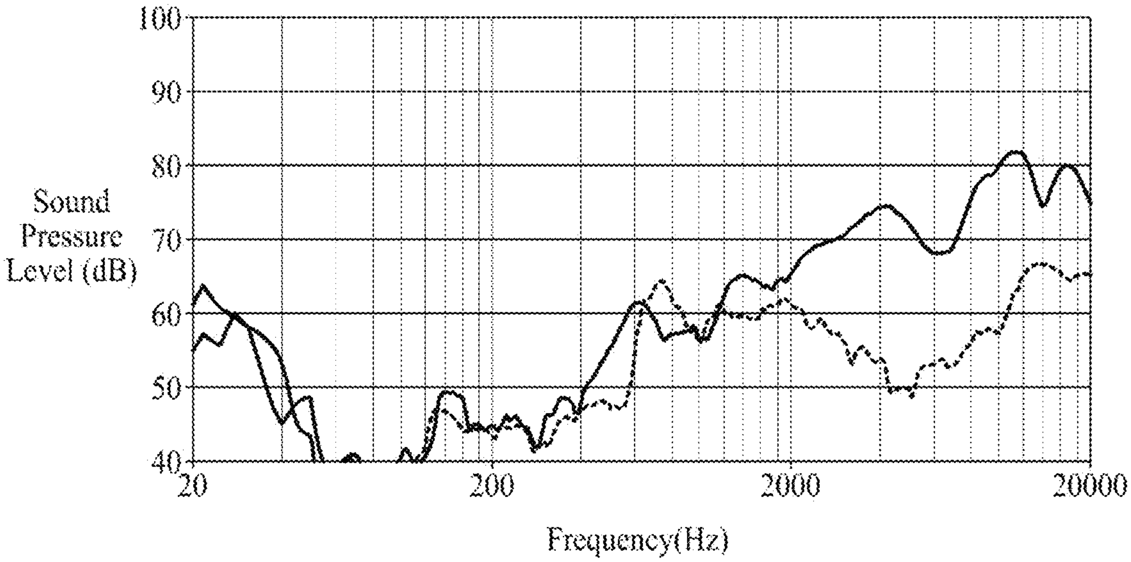
FIG. 14 illustrates a sound output characteristic according to another example embodiment of the present disclosure.

FIG. 14 illustrates a sound output characteristic according to another example embodiment of the present disclosure.

In FIG. 14, a horizontal axis (x-axis) represents a frequency in hertz (Hz), and a vertical axis (y-axis) denotes a sound pressure level in decibels (dB). Because the method for measuring a sound output characteristic is substantially similar to the description in FIG. 13, a detailed description thereof will be omitted.

In FIG. 14, a dotted line denotes a sound output characteristic measured when the second sound generator has a horizontal length of 5 mm, and a solid line denotes a sound output characteristic measured when the second sound generator has a horizontal length of 30 mm. A vertical length of the second sound generator has been measured at 40 mm. Based on the second sound generator, a horizontal length may be a short side and a vertical length may be a long side.

With reference to FIG. 14, it may be noted that the sound pressure level is more improved in the solid line example than the dotted line example. For example, if the horizontal length of the second sound generator is long, it may be noted that the sound pressure level may be increased in the frequency domain of 2 kHz or more. Therefore, as the horizontal length of the second sound generator is long, the sound of the high-pitched range may be more improved. Thus, the display apparatus may uniformly generate sound quality in the frequency domain from a low-pitched sound range to a high-pitched sound range.

Figure 15A:
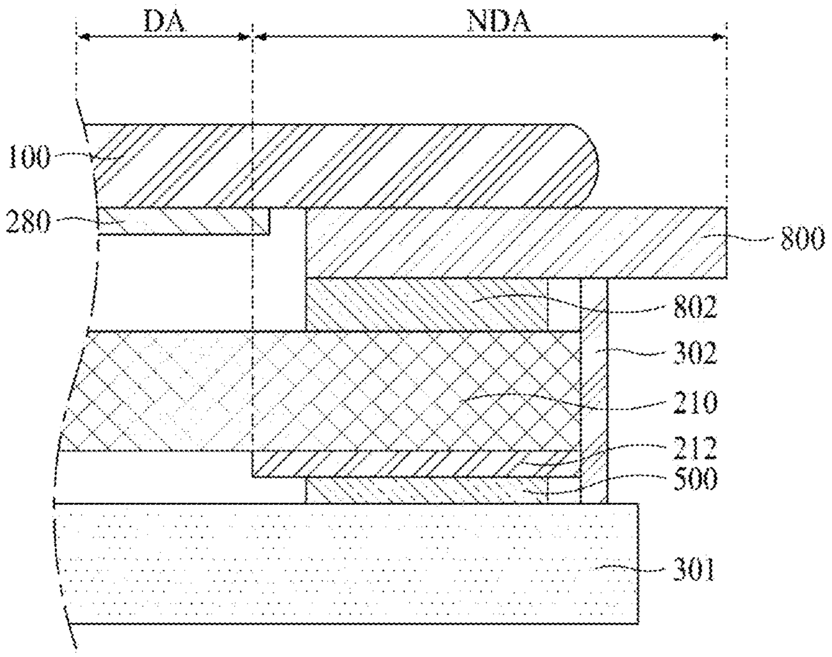
FIGS. 15A and 15B illustrate a display apparatus according to another example embodiment of the present disclosure.
Figure 15B:
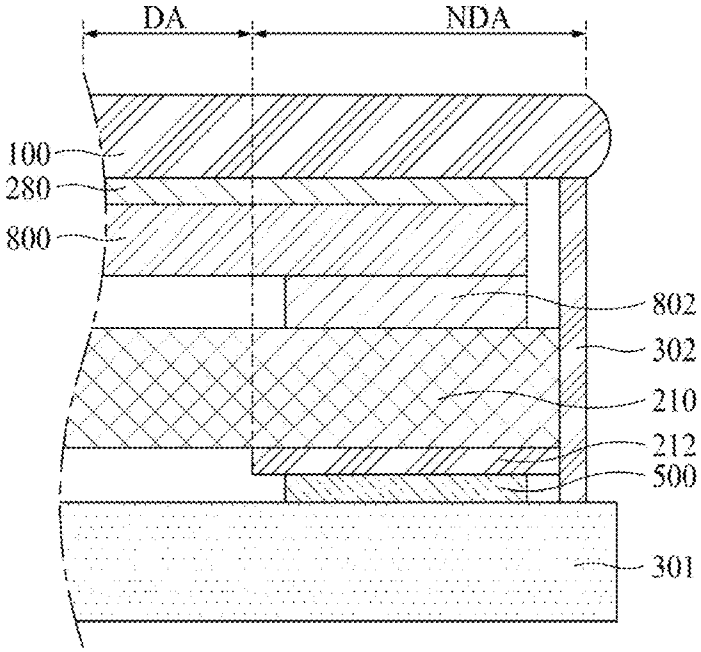

FIGS. 15A and 15B illustrate a display apparatus according to another example embodiment of the present disclosure.

FIGS. 15A and 15B illustrate a position of the second sound generator. In the FIG. 15A example, the second sound generator 800 is protruded or extended toward the non-display area NDA. When the non-display area is small, arrangement of the second sound generator may be difficult. For example, when an area of the black matrix in the second substrate is small, arrangement of the second sound generator may be difficult. As described with reference to FIG. 14, although the horizontal length of the second sound generator should be increased to improve the sound, because the non-display area is small, positioning of the second sound generator may be difficult. Therefore, the second sound generator 800 may be extended to the non-display area. The second sound generator 800 may extend from the side of the display panel. For example, the second sound generator may extend to the outside of the black matrix in the second substrate of the display panel 100. In FIG. 15B, the second sound generator 800 may extend to the display area DA. For example, the second sound generator 800 may be inside the black matrix in the second substrate of the display panel 100.

As shown in the FIG. 15A example, if the second sound generator 800 extends to the non-display area, a pad may avoid or prevent the second sound generator from being exposed. The pad may be the side supporting member 302. The side supporting member 302 may be a middle cabinet. As shown in the FIG. 15B example, if the second sound generator 800 extends to the display area DA, the sheet portion 280 may extend to the display area DA to reduce or prevent light leakage from occurring in the display area DA.

If the second sound generator 800 extends to the non-display area NDA, the inventors recognized that a structure for protecting the second sound generator 800 may be desired. The inventors realized a display apparatus, which includes the structure for protecting the second sound generator 800, through several experiments. This will be described with reference to FIGS. 16A and 16B.

Figure 16A:
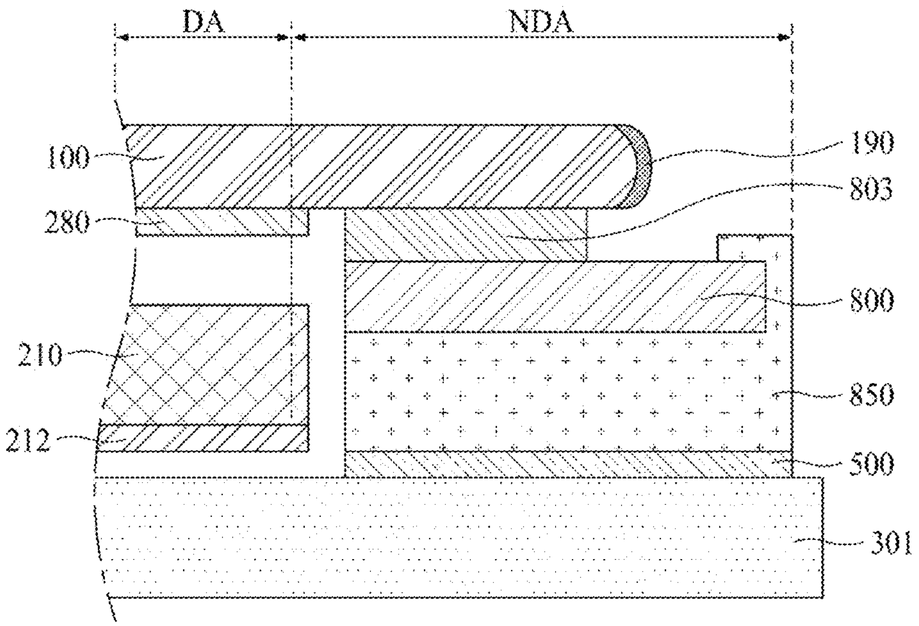
FIGS. 16A and 16B illustrate a display apparatus according to another example embodiment of the present disclosure.
Figure 16B:
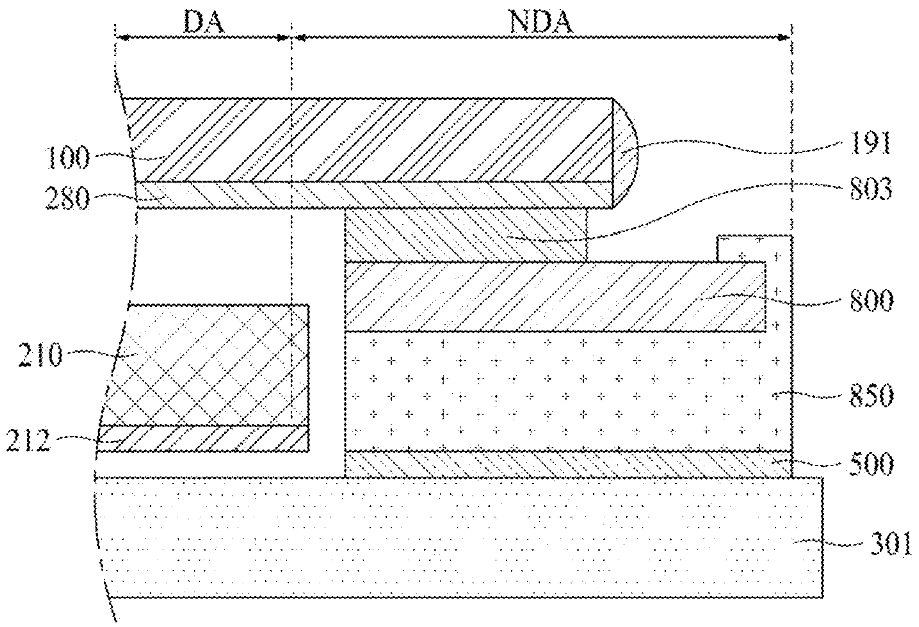

FIGS. 16A and 16B illustrate a display apparatus according to another example embodiment of the present disclosure.

With reference to FIGS. 16A and 16B, a structure 850 may be on the rear surface of the second sound generator 800. The structure 850 may be configured to surround a rear surface and a side surface of the second sound generator 800, and the second sound generator 800 may be avoided or prevented from being exposed, and may be protected from the outside. The structure 850 may be formed of a mold material, and may be formed by a press process, without limitation thereto. If the structure 850 is formed of a mold material, it may be advantageous in being easy to manufacture.

The connection member 500 may be between the structure 850 and the rear cover 301, which may be the supporting member. The connection member 500 may be, but is not limited to, a double-sided tape, a single-sided tape, an adhesive, and/or a bond. For example, the double-sided tape may be, but is not limited to, an acrylic based tape. As another example, the double-sided tape may be a urethane based foam pad or an elastic resin. The connection member 500 may include a material having elasticity that may be compressed to some extent, and may be formed of, but is not limited to, a polyurethane, a polyolefin, and/or a polyethylene material. The rear cover 301 may be thicker than or as thick as the second sound generator 800 and the structure 850 to support the second sound generator 800 and the structure 850.

The light guide member 210 and the reflective plate 212 may be in the display area DA. If the light guide member 210 and the reflective plate 212 are not in the non-display area NDA, a problem may occur in that picture quality of the display panel may be deteriorated, for example, a bright line may occur.

With reference to FIGS. 16A and 16B, the sheet portion 280 may be in the display area DA and the non-display area NDA on the rear surface of the display panel 100, or may extend to the non-display area NDA. With reference to FIG. 16A, the sheet portion 280 may be in the display area DA and the non-display area NDA on the rear surface of the display panel 100. A second pad 803 may be between the display panel 100 and the second sound generator 800. The second pad 803 may be, but is not limited to, a double-sided tape, a single-sided tape, an adhesive, and/or a bond. For example, the second pad 803 may be, but is not limited to, a urethane based material. As another example, the second pad 803 may be a foam pad or an elastic resin. The second pad 803 may include a material having elasticity that may be compressed to some extent, and may be formed of, but is not limited to, a polyurethane, a polyolefin, and/or a polyethylene material.

A sealing member 190 may also be in the display panel 100. The sealing member 190 may cover all of three outer sides and three corners, but not a first outer side of the display panel 100 adjacent to a pad portion. The sealing member 190 may reduce or prevent light leakage from occurring in the side of the display panel 100. The sealing member 190 may be formed, e.g., of a silicon-based or UV-hardening-based sealant (or resin). If the sealing member is formed of a UV-hardening-based sealant, a process tack (e.g., adhesive drying) time may be reduced. The sealing member 190 may have a color, for example, blue, red, cyan, or black, and may be formed of a colored resin or light-shielding resin for preventing side light leakage from occurring. Embodiments are not limited to these examples.

With reference to FIG. 16B, the sheet portion 280 may extende to the non-display area NDA on the rear surface of the display panel 100. The second pad 803 may be between the display panel 100 and the second sound generator 800.

The second pad 803 may be, but is not limited to, a double-sided tape, a single-sided tape, an adhesive, and/or a bond. For example, the second pad 803 may be, but is not limited to, a urethane based material. As another example, the second pad 803 may be a foam pad or an elastic resin. The second pad 803 may include a material having elasticity that may be compressed to some extent, and may be formed of, but is not limited to, a polyurethane, a polyolefin, and/or a polyethylene material.

If the sheet portion 280 extends to the non-display area NDA, a sealing member 191 may include the sheet portion 280. The sealing member 191 may reduce or prevent light leakage from occurring in the side of the display panel 100 and the side of the sheet portion 280. The sealing member 191 may be formed of the same material as that of the aforementioned sealing member 190.

If the second sound generator 800 extends to the non-display area NDA, its horizontal length may be greater than or equal to a width of the non-display area NDA. For example, if the black matrix in the non-display area has a width of 5 mm, the horizontal length of the second sound generator 800 may be greater than or equal to 5 mm. A vertical length of the second sound generator 800 may be within about 40 mm. Therefore, the horizontal length of the second sound generator 800 in a range from 5 mm to 40 mm with respect to a horizontal direction of the non-display area NDA. For example, the horizontal length of the second sound generator 800 may be greater than or equal to the width of the non-display area NDA, or may be greater than or equal to the width of the black matrix. If the horizontal length of the second sound generator 800 is greater than about 40 mm, it may affect external design. The horizontal length of the second sound generator 800 may be configured to be greater than 40 mm without limitation to. Embodiments are not limited to these examples.

The sound output characteristic according to the position of the second sound generator has been measured. This will be described with reference to FIG. 17.

Figure 17:
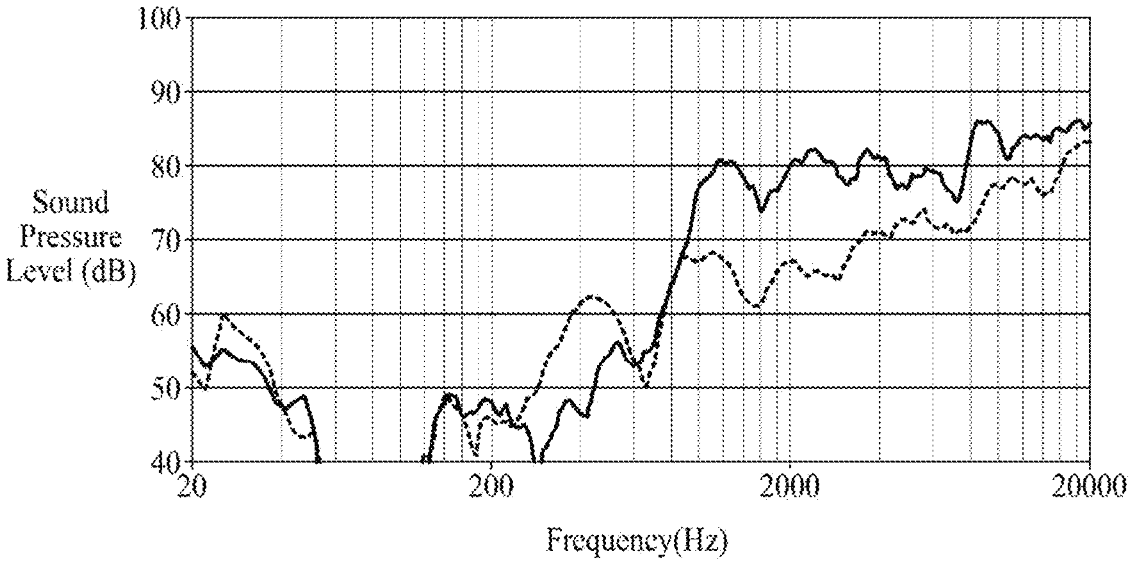
FIG. 17 illustrates a sound output characteristic according to another example embodiment of the present disclosure.

FIG. 17 illustrates a sound output characteristic according to another example embodiment of the present disclosure.

In FIG. 17, a horizontal axis (x-axis) represents a frequency in hertz (Hz), and a vertical axis (y-axis) denotes a sound pressure level in decibels (dB). Because the method for measuring a sound output characteristic is substantially similar to the description in FIG. 13, a detailed description thereof will be omitted.

In FIG. 17, a solid line denotes the sound output characteristic of the FIG. 15A example, and a dotted line denotes the sound output characteristic of the FIG. 15B example. With reference to FIG. 17, the sound pressure level is more improved in the sold line output than in the dotted line output. For example, as shown in FIG. 17, if the second sound generator 800 extends to the non-display area NDA, the sound pressure level may be increased in the frequency domain of 1.5 kHz or more. Therefore, when the second sound generator 800 extends to the non-display area NDA, the sound of the high-pitched range may be improved. Therefore, a display apparatus according to an embodiment may uniformly generate sound quality in the frequency domain from a low-pitched sound range to a high-pitched sound range.

Figure 18:
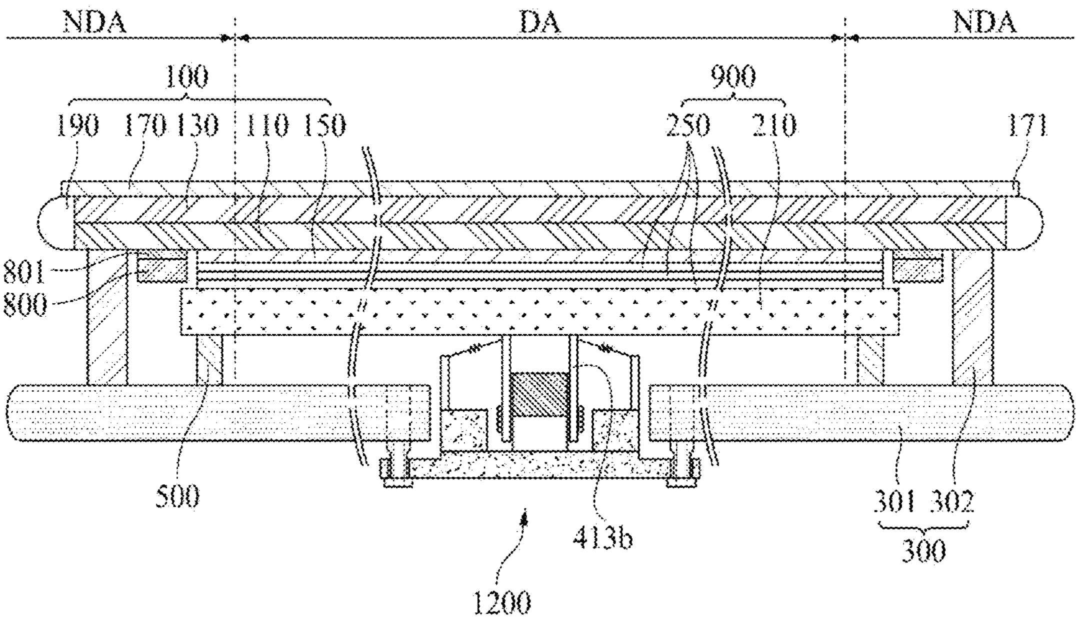
FIG. 18 illustrates a display apparatus according to another example embodiment of the present disclosure.

FIG. 18 illustrates a display apparatus according to another example embodiment of the present disclosure.

With reference to FIG. 18, the display apparatus according to an example embodiment of the present disclosure may include a display panel 100, an optical module 900, a first sound generator 1200, and a second sound generator 800. An example of the supporting member 300 and the first sound generator 1200 is shown in the connection structure described above with reference to FIG. 12. As another example, the connection structure of the supporting member 300 and the first sound generator 1200, described above with reference to FIGS. 9 to 11, may be applied to the connection structure. Although the sound generator of the FIG. 7 example will be described below as the first sound generator 1200, the structure of the sound generator of the FIG. 6 example may also be applied to the first sound generator 1200.

The display panel 100 may include the first substrate 110 and the second substrate 130, which may be bonded to each other by interposing the liquid crystal layer therebetween. The first substrate 110 may be a thin film transistor array substrate, and may include a pixel array having a plurality of pixels formed per pixel area that may be defined by a plurality of gate and data lines. Each of the plurality of pixels may include a thin film transistor connected to the gate and data lines, a pixel electrode connected to the thin film transistor, and a common electrode adjoining the pixel electrode, to which a common voltage may be supplied.

The first substrate 110 may include a pad portion at a first periphery, and a gate driving circuit at a second periphery. The pad portion may supply an externally-supplied signal to the pixel array and the gate driving circuit. For example, the pad portion may include a plurality of data pads connected to the plurality of data lines through a plurality of data link lines, and a plurality of gate pads connected to the gate driving circuit through a gate control signal line.

The gate driving circuit may be in the first periphery of the first substrate 110. The gate driving circuit may be connected with the plurality of gate lines in a one-to-one ratio. For example, the gate driving circuit may be a shift register that may include a transistor, which may be formed by a similar process as that of the thin film transistor provided in the pixel area, or may be formed simultaneously in the same process. The gate driving circuit may be configured in such a manner that it may be built in the display panel in a gate-in-panel (GIP) form. For example, the non-display panel may be an area in which the GIP is formed. The gate driving circuit may be formed in a non-display area of one of a left area and a right area of the display area. For example, the gate driving circuit may be in the non-display area, and may be formed in the first substrate 110 in a chip-on-film (COF) form.

The second substrate 130 may be a color filter array substrate, and may include a black matrix having an open area overlapping each pixel area on the first substrate 110, and a color filter in the open area. The second substrate 130 may be bonded to the first substrate 110, e.g., by a sealant, with the liquid crystal layer therebetween. The liquid crystal layer may be between the first substrate 110 and the second substrate 130, and may include liquid crystals of which liquid crystal molecules may be varied in their alignment direction in accordance with an electric field formed by a data voltage applied to the pixel electrode in each pixel and a common voltage applied to the common electrode.

The display panel 100 according to one embodiment may include a first polarizing member 150 and a second polarizing member 170. The first polarizing member 150 may be attached to the rear surface of the first substrate 110. The first polarizing member 150 may polarize light, which may be irradiated from the optical module 900 to the first substrate 110, toward a first polarizing axis. The second polarizing member 170 may be attached to the front surface of the second substrate 130. The second polarizing member 170 may polarize light, which may be emitted to the outside through the second substrate 130, toward a second polarizing axis different from the first polarizing axis.

The display panel 100 may further include a sealing member 190. The sealing member 190 may cover three outer sides and three corners, but may not cover a first outer side of the display panel 100 adjacent to the pad portion. The sealing member 190 may reduce or prevent light leakage from occurring in the side of the display panel 100. The sealing member 190 may include a silicon-based or UV-hardening-based sealant (or resin). If the sealing member is formed of a UV-hardening-based sealant, a process tack (e.g., drying of the adhesive) time may be reduced. The sealing member 190 may have a color, for example, blue, red, cyan, or black, and may be formed of a colored resin or light-shielding resin for reducing or preventing side light leakage from occurring.

An upper surface of the sealing member 190 may be partially be covered by the first polarizing member 170. For example, the first polarizing member 170 may include an extension portion 171 longitudinally extended from the outer side of the first substrate 130 to partially cover a front surface of the sealing member 190, and partially attached to the front surface of the sealing member 190. Therefore, a bonding surface between the sealing member 190 and the first substrate 130 may be sealed by the extension portion 171 of the first polarizing member 170, and the bonding surface may not be exposed to the front of the display apparatus where a viewer may be located.

The display panel 100 may display an image using light, which may transmit through the liquid crystal layer, by driving the liquid crystal layer in accordance with the electric field formed per pixel by the data and common voltages applied to each pixel. In the display apparatus according to an embodiment of the present disclosure, the optical module 900 may include a light guide member 210 and an optical sheet portion 250.

The light guide member 210 may have a light incident surface and may be on the rear surface of the display panel 100. The light guide member 210 may be connected to the bobbin **413*b* included in the first sound generator 1200. The light guide member 210 may change a progress direction of light incident through the light incident surface to the display panel 100**.

The light guide member 210 may include a light-transmissive plastic or glass material. For example, the light guide member 210 may be, but is not limited to, a sapphire glass or GORILLA® glass, and may be a glass used as a light guide.

The light guide member 210 may further include a plurality of optical patterns. As an example, if the light guide member 210 includes a light-transmissive plastic material, the plurality of optical patterns may be provided on the rear surface of the light guide member 210, e.g., in the form of an engraved or embossed pattern.

As another example, if the light guide member 210 includes a glass material, the plurality of optical patterns may be provided inside the light guide member 210. For example, each of the plurality of optical patterns may be provided inside the light guide member 210 adjacent to the rear surface of the light guide member 210, e.g., by a laser patterning process. Each of the plurality of optical patterns may increase light-emission efficiency of light emitted in a front direction of the light guide member 210, e.g., by scattering and refracting light incident through the light incident surface.

The light guide member 210 may be vibrated in accordance with an ascending of the bobbin **413*b* included in the first sound generator 1200 to vibrate the display panel 100. Therefore, the light guide member 210 may be vibrated by at least one first sound generator 1200, and the display panel 100 may be vibrated by vibration of the light guide member 210**.

A light source module may be provided for irradiating light to the light incident surface provided in the light guide member 210. The light source module may include a plurality of light-emitting diodes, e.g., packaged in a printed circuit board, for a light source and for irradiating light to the light incident surface of the light guide member 210.

Each of the plurality of light-emitting diodes may be packaged in the printed circuit board for a light source to be spaced apart from another light-emitting diode. Each of the plurality of light-emitting diodes may be spaced apart from the light incident surface of the light guide member 210 as much as an optical gap, and may have a particular pitch (or interval) along a length direction of the light incident surface in the light guide member 210. The pitch (or gap) of the plurality of light-emitting diodes and the optical gap may be set in the range such that a hot spot caused by a dark portion and a bright portion is not generated in the light incident portion of the light guide member that may include a light incident surface. The printed circuit board for a light source may be a flexible printed circuit film.

The optical sheet portion 250 may be on the front surface of the light guide member 210 and on the rear surface of the display panel 100. The optical sheet portion 250 may improve a luminance property of light emitted from the light guide member 210, and may transfer vibration of the light guide member 210 to the display panel 100.

The optical sheet portion may be a complex optical sheet having a function for diffusing incident light and a function for condensing the diffused light. The complex optical sheet may be attached to the rear surface of the display panel 100. The complex optical sheet may be placed or supported on the front surface of the light guide member 210 such that the complex optical sheet may be in surface contact with the front surface of the light guide member 210, e.g., without an additional connection member.

As another example, the complex optical sheet may be attached to the rear surface of the display panel 100 through the connection member. For example, the complex optical sheet may be attached to the rear surface of the display panel 100 by a lamination process through the connection member. If the optical sheet portion 250 is formed of one complex optical sheet, a plurality of condensing patterns, which may include a prism or a lenticular pattern, may additionally be on the front surface or the rear surface of the light guide member 210.

The connection member may be a transparent connection member. For example, the connection member may be, but is not limited to, an optical adhesive or optical adhesive film. As an example, the bonding member may be, but is not limited to, an optically clear adhesive (OCA), an optically clear resin (OCR), a double-sided tape, and/or a single-sided tape.

The optical sheet portion 250 may include first to third optical sheets. The first optical sheet may be a first diffusion sheet having an optical scattering layer or optical scattering particles, and may be on the front surface of the light guide member 210. The first optical sheet emit light by primarily scattering or diffusing light incident from the light guide member 210.

The second optical sheet may be a first diffusion sheet having an optical scattering layer or optical scattering particles, and may be attached to the front surface of the first optical sheet. The second optical sheet may emit light by secondarily scattering or diffusing light incident from the first optical sheet.

The third optical sheet may be a prism sheet having a plurality of prism patterns, and may be attached to the front surface of the second optical sheet. The third optical sheet may emit light by condensing light incident from the second optical sheet through the plurality of prism patterns.

The second optical sheet may be replaced by a lower prism sheet. The lower prism sheet may include a plurality of lower prism patterns extending longitudinally along a horizontal axis and adjoining one another along a vertical axis. For example, the third optical sheet may be an upper prism sheet. The upper prism sheet may include a plurality of upper prism patterns extending longitudinally along a vertical axis and adjoining one another along a horizontal axis. Therefore, the lower prism pattern and the upper prism pattern may cross each other.

As an example, the third optical sheet may be attached to the rear surface of the display panel 100 through the connection member. The second optical sheet may be attached to the entire rear surface of the third optical sheet through a first sheet connection member. The first optical sheet may be attached to the entire rear surface of the second optical sheet through a second sheet connection member. Each of the first and second sheet connection members may be, but is not limited to, an optical adhesive and/or an optical adhesive film. For example, each of the first and second sheet connection members may be, but is not limited to, an optically clear adhesive (OCA) and/or an optically clear resin (OCR).

The supporting member 300 may include a rear cover 301 and the side supporting member 302. The rear cover 301 and the light guide member 210 may be fixed by the connection member 500. The connection member 500 may be, but is not limited to, a double-sided tape, a single-sided tape, an adhesive, and/or a bond. For example, the double-sided tape may be, but is not limited to, an acrylic based material. As another example, the double-sided tape may be a urethane based foam pad or an elastic resin. The first connection member 500 may include material having elasticity that may be compressed to some extent, and may be formed of, but is not limited to, a polyurethane, a polyolefin, and/or a polyethylene material.

In the display apparatus including an optical module according to an example embodiment of the present disclosure, when an air gap that may be generated between the light guide member 210 and the optical sheet portion 250 is removed, vibration may be transferred to the display panel 100 through the optical sheet portion 250 without decreasing the vibration of the light guide member 210. Therefore, the display apparatus may output a sound by vibrating the display panel 100 without decreasing the sound pressure level generated by a multi-layered structure between the light guide member 210 and the display panel 100 during a vibration transfer process.

One first sound generator is shown in FIG. 18 as an example, but two first sound generators may be provided, as shown in the examples of FIGS. 3A and 3B. Furthermore, two sound generators and a pair of sound generators or an oval type sound generator may be provided, as shown in the examples of FIGS. 20 and 21.

The first sound generator may generate sounds of middle and high-pitched sound ranges, and the second sound generator may further be in the non-display area NDA to further generate sound of a high-pitched sound range. For example, the second sound generator 800 may be in the non-display area NDA, and may be on the rear surface of the first substrate 110, e.g., using an adhesive member 801. Therefore, when the first sound generator is in the display area and the second sound generator is in the non-display area, the display apparatus may improve the sound pressure level in the frequency domain of a high-pithed sound range and output a sound of a low-pitched range to high-pitched range.

Figure 19:
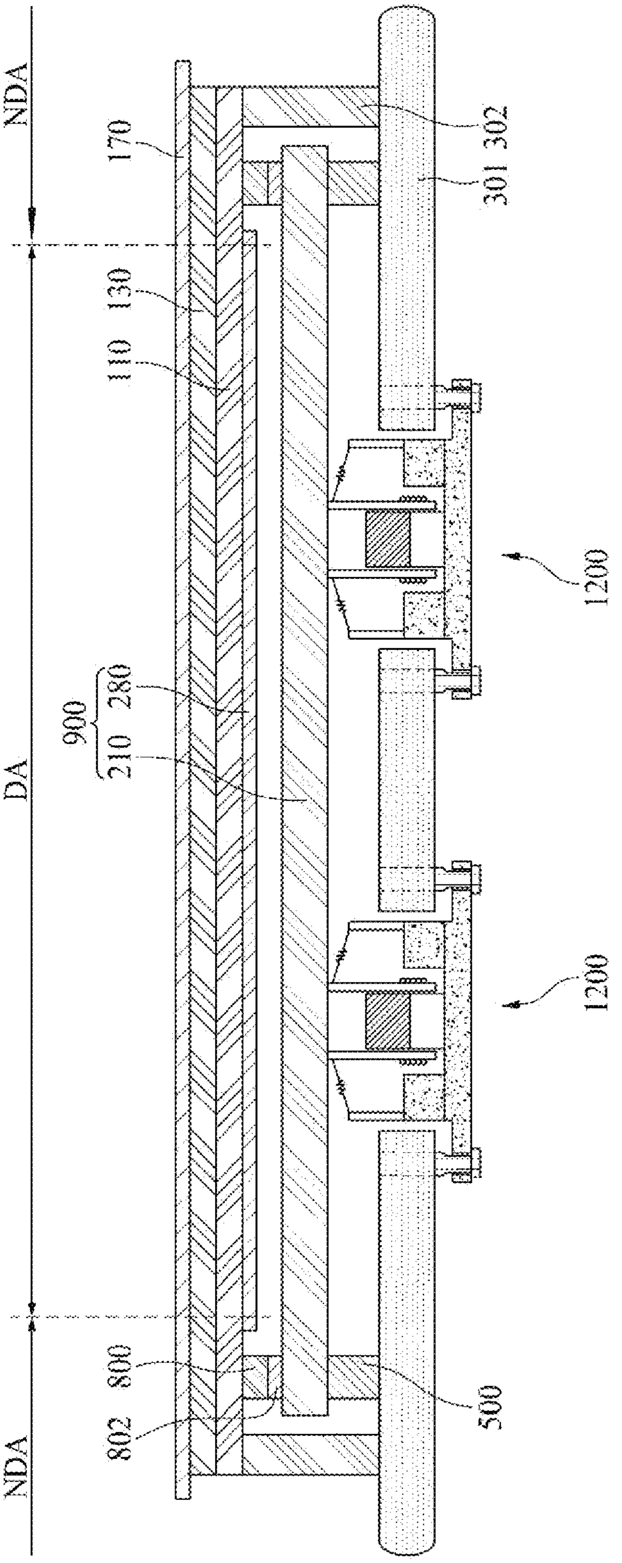
FIG. 19 illustrates a display apparatus according to another example embodiment of the present disclosure.

FIG. 19 illustrates a display apparatus according to another example embodiment of the present disclosure.

With reference to FIG. 19, the display apparatus according to an example embodiment of the present disclosure may include a display panel 100, a first sound generator 1200, and a second sound generator 800. The first sound generator 1200 may be in the display area DA, and the second sound generator 800 may be in the non-display area NDA. For example, the first sound generator 1200 may be between the rear cover 301, which may be the supporting member and the light guide member 210. The rear cover 301 and the light guide member 210 may be fixed by the connection member 500. The connection member 500 may be a double-sided tape, a single-sided tape, an adhesive, and/or a bond, but embodiments are not limited thereto. For example, the double-sided tape may be an acrylic based tape, but embodiments are not limited thereto. As another example, the double-sided tape may be a urethane based foam pad or an elastic resin. The connection member 500 may include a material having elasticity that may be compressed to some extent, and may be formed of a polyurethane, a polyolefin, and/or a polyethylene material, but embodiments are not limited thereto.

The second sound generator 800 may be between the display panel 100 and the light guide member 210. A first pad 802 may be between the second sound generator 800 and the light guide member 210. A reflective plate, such as that described in the FIG. 4 example, may further be on the rear surface of the light guide member 210.

Examples of the supporting member 300 and the first sound generator 1200 are shown in the connection structure described in FIG. 12. Alternatively, the connection structure of the supporting member 300 and the first sound generator 1200, which is described with reference to the examples of FIGS. 9 to 11, may be applied to the connection structure. The sound generator of FIG. 7 will be described below as an example of as the first sound generator 1200, but the structure of the sound generator of FIG. 6 may also be applied to the first sound generator 1200.

The display panel 100 may include a first polarizing member 150. The first polarizing member 150 may be attached to the rear surface of the first substrate 110, and may polarize light, which may be irradiated from the light guide member 210 to the first substrate 110, toward a first polarizing axis.

The optical module 900 may include the sheet portion 280 and the light guide member 210. The sheet portion 280 may include a second polarizing member integrated with the optical sheet portion. The second polarizing member may polarize light, which may be emitted to the outside by transmitting the second substrate 130, toward a second polarizing axis different from the first polarizing axis. The description of the optical sheet portion in the examples of FIGS. 4 and 18 may equally be applied to the optical sheet portion The light guide member 210 may be on the rear surface of the display panel 100. The description of the light guide member in the examples of FIGS. 4 and 18 may equally be applied to the light guide member.

Therefore, the display panel may be vibrated by driving of the first sound generator and the non-display area may be vibrated by driving of the second sound generator, and the sound may be output to a front direction of the display panel 100. When the first sound generator is in the display area and the second sound generator is in the non-display area, the display apparatus may improve the sound pressure level in the frequency domain of a high-pitched sound range, may output a sound of a low-pitched range to high-pitched range, and may uniformly generate sound quality in the frequency domain from a low-pitched sound range to a high-pitched sound range.

Figure 20A:
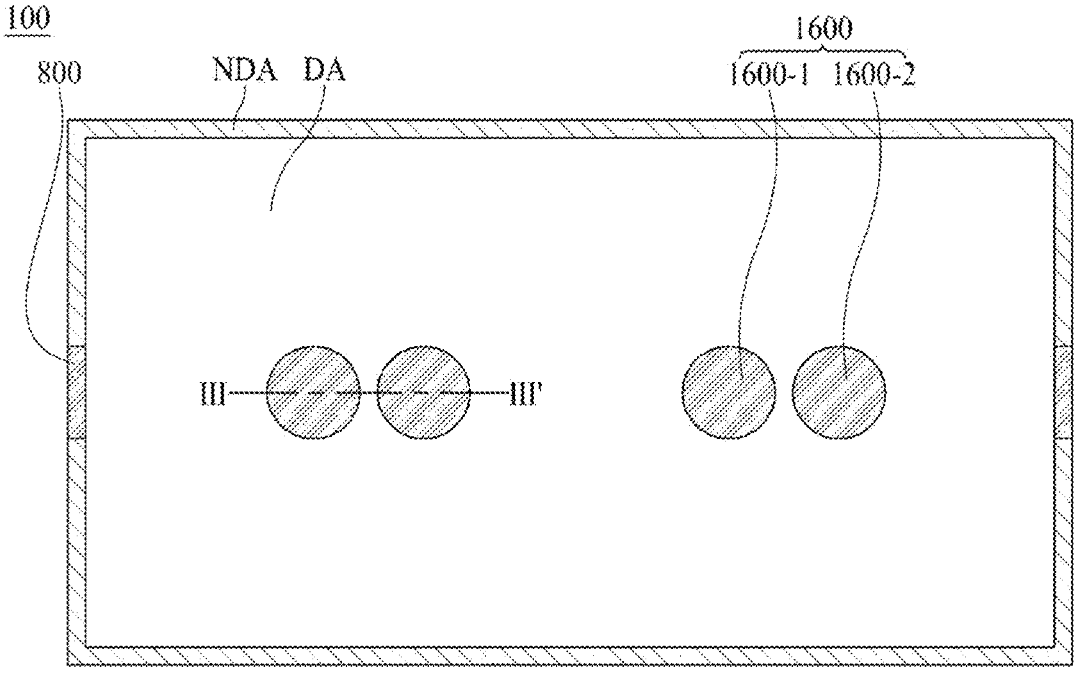
FIGS. 20A and 20B illustrate a display apparatus according to another example embodiment of the present disclosure.
Figure 20B:
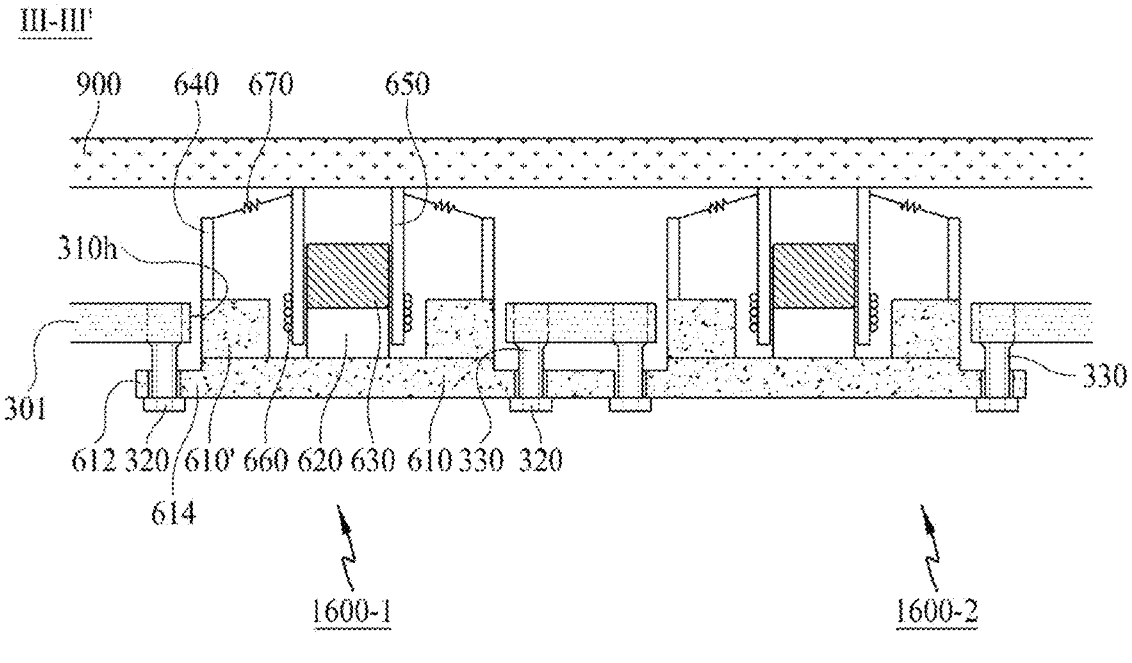

FIGS. 20A and 20B illustrate a display apparatus according to another example embodiment of the present disclosure.

The display area DA may include at least two areas, each of which may include two coil-type sound generators. The two areas may include a first area and a second area. The first area may be a left area of the display area, and the second area may be a right area of the display area.

With reference to FIG. 20A, a coil-type sound generator, which may be the first sound generator 1600, may be in the display area DA. Each of the first and second areas of the display area DA may include a 1-1$^{st}$ sound generator 1600-1 and a 1-2$^{nd}$ sound generator 1600-2. A piezoelectric sound generator, which may be the second sound generator 800, may be in the non-display area NDA.

FIG. 20B is a cross-sectional view taken along line of FIG. 20A. A connection structure of the first sound generator 1600 and the supporting member 300 is shown in FIG. 20B. Alternatively, the connection structure described above with reference to FIGS. 9 to 11 may be applied to the connection structure. The sound generator of the FIG. 7 example will be described below as the first sound generator 1600, but the structure of the sound generator of the FIG. 6 example may also be applied to the first sound generator 1600.

With reference to FIG. 20B, the 1-1$^{st}$ sound generator 1600-1 and the 1-2$^{nd}$ sound generator 1600-2, which constitute the first sound generator 1600, may include a magnet 620 on a first plate 610, a center pole 630 on the magnet 620, a bobbin 650 around the magnet 620 and the center pole 630, and a coil 660 wound outside the bobbin 650. The second plate 610' may be near the outside of the first plate 610, and a frame 640 may be at an outer side of the second plate 610'. A damper 670 may be between the frame 640 and the bobbin 650. Because the sound generator is substantially similar to the description in the examples of FIGS. 6 and 7, a detailed description thereof will be omitted.

An enlarged diameter portion 614 may be formed in a single body with the first plate 610 of the 1-1$^{st}$ sound generator 1600-1 and the 1-2$^{nd}$ sound generator 1600-2. The first plate 610 of the first sound generator 1600 may have a cylindrical shape, and a protrusion having a diameter greater than a diameter of the other portion of the first plate 610 may be formed at a lower side of the first plate 610. A protrusion area having an increased diameter may be referred to as the enlarged diameter portion 614. The enlarged diameter portion 614 may be formed in a ring shape. The extension portion 612 for fixation of the 1-1$^{st}$ sound generator 1600-1 and the 1-2$^{nd}$ sound generator 1600-2 may be formed at a part of the enlarged diameter portion 614.

The extension portion 612 may include a screw 320 and a nut 330. In one example, the nut 330 may be a self-clinching nut. An example of the self-clinching nut may be a PEM® nut, although embodiments are not limited thereto. The 1-1$^{st}$ sound generator 1600-1 and the 1-2$^{nd}$ sound generator 1600-2 may be fixed to the supporting member 300 by the nut 330 and the screw 320. If the self-clinching nut is used to connect the supporting member 300 with the first sound generator 1600, some of vibration generated by the first sound generator 1600 may be absorbed by the nut 330. Thus, the vibration transferred to the supporting member 300 may be reduced.

If the supporting member 300 is directly connected with the first sound generator 1600 without the self-clinching nut, the vibration generated during operation of the first sound generator 1600 may be transferred to the supporting member 300 over long-term operation, and a problem may occur in that the supporting member 300 may be bent or deformed when the supporting member 300 is thin. If the supporting member 300 is thin, the supporting member 300 may be directly connected to the screw 320, and a problem may occur in that a fixing force of the supporting member 300 and the first sound generator 1600 may not be sufficient.

Therefore, if the nut fixes the supporting member to the sound generator, the supporting member may have to be thick to prevent bending or deformation of the supporting member from occurring, and to improve a fixing force of the supporting member and the sound generator. When the supporting member is thick, a problem may occur in that the display apparatus becomes thick. If the supporting member is formed of glass or stainless steel, e.g., to improve external design of the display apparatus, a problem may occur in that the nut cannot be inserted into the supporting member.

Therefore, a second supporting member may further be provided on the supporting member 300 to insert the nut 330 into the supporting member 300. The second supporting member may be on a side of the supporting member 300 adjacent to the optical module 900.

The second supporting member may be formed of aluminum (Al), into which the nut 330 may be inserted. The first sound generator 1600 may be connected to the supporting member 300 and the second supporting member by the screw 320 using the nut 330 fixed to the supporting member 300. The supporting member 300 and the second supporting member may be fixed by an adhesive member. The adhesive member may be, but embodiments are not limited to, a double-sided tape, a single-sided tape, an adhesive, and/or a bond. If the supporting member 300 and the second supporting member are fixed by the bond, the supporting member 300 and the second supporting member may be fixed to each other more tightly.

When the supporting member 300 may be formed of glass or stainless steel, external design of the display apparatus may be improved. The second supporting member may further be formed to tightly attach the first sound generator 1600 to the front surface of the optical module 900 as much as the thickness of the supporting member 300, and the thickness of the display apparatus may be reduced. Therefore, the second supporting member may further be formed such that the sound generator may be thinner, and the thickness of the display apparatus may be reduced. The optical module 900 may be the light guide member and the sheet portion, or may be the light guide member and the optical sheet portion.

An adhesive member may be provided for adhering the optical module 900 to the first sound generator 1600. The adhesive member may be, but embodiments are not limited to, a double-sided tape, a single-sided tape, an adhesive, and/or a bond. If the optical module 900 and the first sound generator 1600 are fixed by the bond, the optical module 900 and the first sound generator 1600 may be attached to each other more tightly.

Figure 21A:
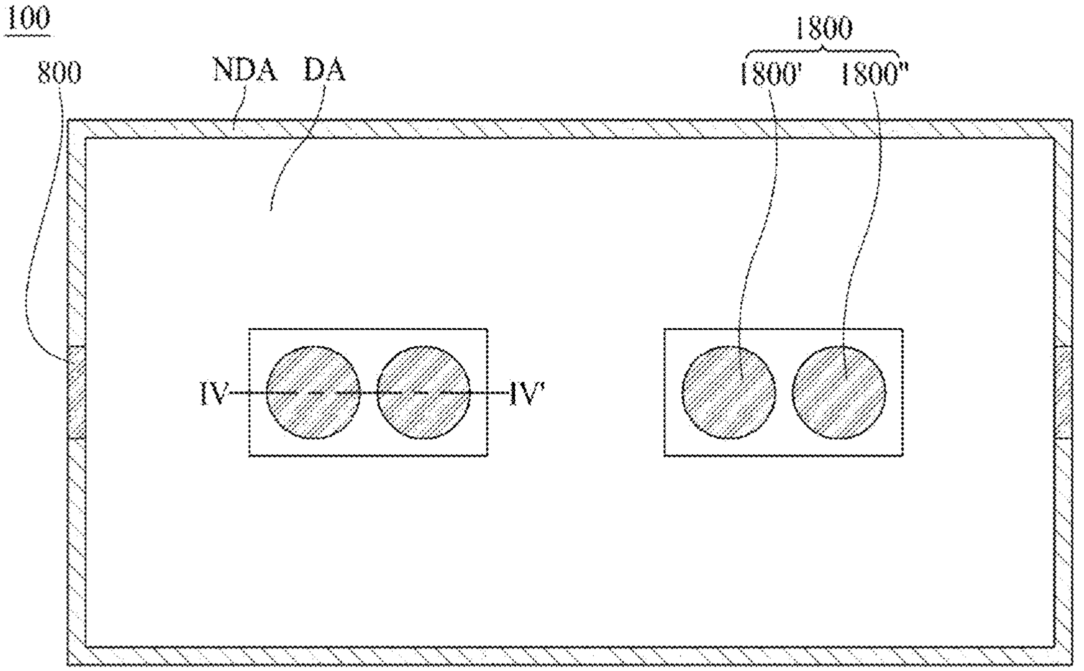
FIGS. 21A to 21C illustrate a display apparatus according to another example embodiment of the present disclosure.
Figure 21B:
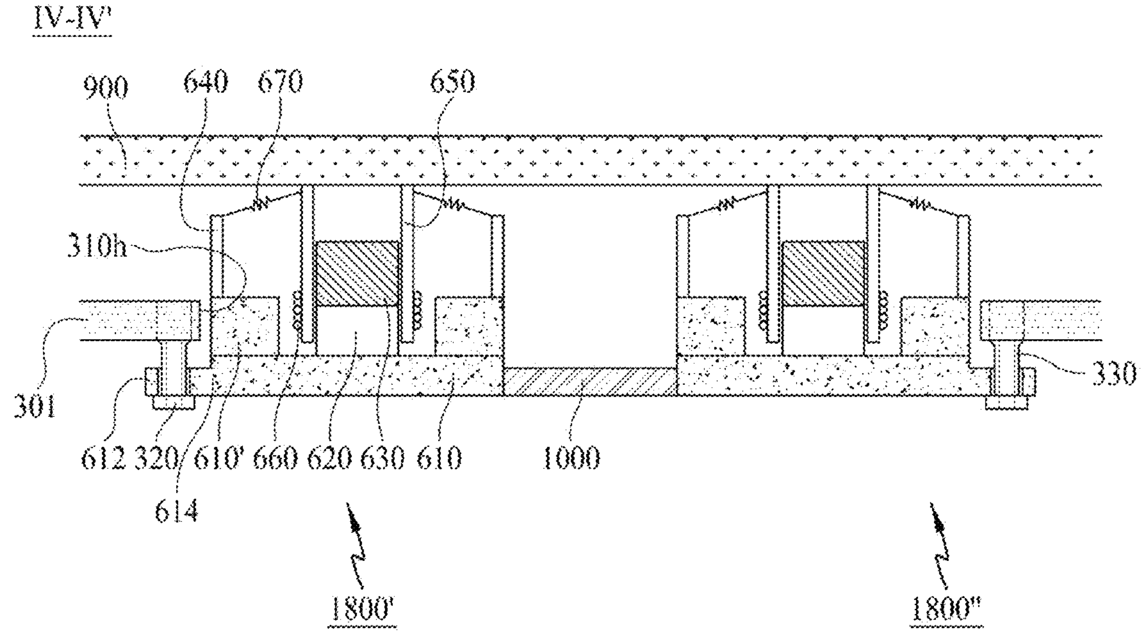
Figure 21C:
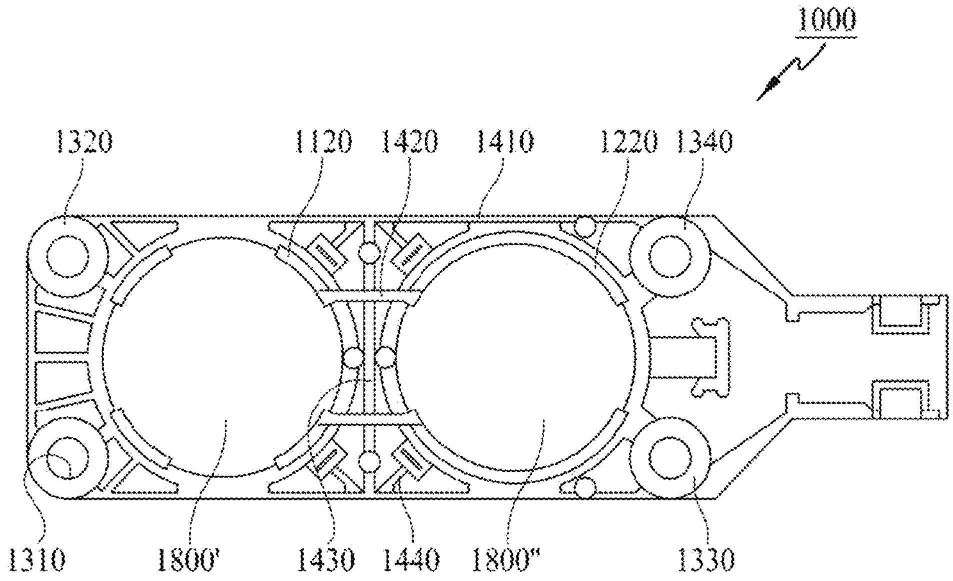

FIGS. 21A to 21C illustrate a sound generator according to another example embodiment of the present disclosure.

The display area DA may include at least two areas, each of which may include a pair of coil-type sound generators as an example. Without limitation to this example, at least one or more first sound generator may include one shape of a circular shape and an oval shape. The sound generator described in the examples of FIGS. 6 and 7 may be applied to the oval type sound generator, and a bobbin may have an oval shape. If the oval type sound generator is used, a sound output characteristic of middle and high-pitches sound ranges may be improved.

The two areas may include a first area and a second area. The first area may be a left area of the display area, and the second area may be a right area of the display area.

With reference to FIG. 21A, a coil-type sound generator, which may be the first sound generator 1800, may be in the display area DA. Each of the first and second areas of the display area DA may include a 1-1$^{st}$ sound generator 1800' and a 1-2$^{nd}$ sound generator 1800". A piezoelectric sound generator, which may be the second sound generator 800, may be in the non-display area NDA.

FIG. 21B is a cross-sectional view taken along line IV-IV' of FIG. 21A. A connection structure of the first sound generator 1800 and the supporting member 300 is shown in FIG. 21B. Alternatively, the connection structure described above with reference to FIGS. 9 to 11 may be applied to the connection structure. The sound generator of the FIG. 7 example will be described below as the first sound generator 1800, but the structure of the sound generator of the FIG. 6 example may also be applied to the first sound generator 1800.

With reference to FIG. 21B, the 1-1$^{st}$ sound generator 1800' and the 1-2$^{nd}$ sound generator 1800" may include a magnet 620 on a first plate 610, a center pole 630 on the magnet 620, a bobbin 650 around the magnet 620 and the center pole 630, and a coil 660 wound outside the bobbin 650. The second plate 610' may be near the outside of the first plate 610, and a frame 640 may be at an outer side of the second plate 610'. A damper 670 may be between the frame 640 and the bobbin 650. Because the sound generator is substantially similar to the description in the examples of FIGS. 6 and 7, a detailed description thereof will be omitted.

With reference to FIG. 21B, the 1-1$^{st}$ sound generator 1800' and the 1-2$^{nd}$ sound generator 1800", which constitute the first sound generator 1800, may include a magnet 620 on a first plate 610, a center pole 630 on the magnet 620, a bobbin 650 around the magnet 620 and the center pole 630, and a coil 660 wound outside the bobbin 650. The second plate 610' may be near the outside of the first plate 610, and a frame 640 may be at an outer side of the second plate 610'. A damper 670 may be between the frame 640 and the bobbin 650.

An enlarged diameter portion 614 may be formed in a single body with the first plate 610 of the 1-1$^{st}$ sound generator 1800' and the 1-2$^{nd}$ sound generator 1800". The first plate 610 of the first sound generator 1800 may have a cylindrical shape, and a protrusion having a diameter greater than a diameter of the other portion of the first plate 610 may be formed at one side of the first plate 610. A protrusion area having an increased diameter may be referred to as the enlarged diameter portion 614. The enlarged diameter portion 614 may be formed in a ring shape. The extension portion 612 for fixation of the 1-1$^{st}$ sound generator 1800' and the 1-2$^{nd}$ sound generator 1800" may be formed at a part of the enlarged diameter portion 614.

The extension portion 612 may include a screw 320 and a nut 330. In one example, the nut 330 may be a self-clinching nut. An example of the self-clinching nut may be a PEM® nut, although embodiments are not limited thereto. The 1-1$^{st}$ sound generator 1800' and the 1-2$^{nd}$ sound generator 1800" may be fixed to the supporting member 300 by the nut 330 and the screw 320. If the self-clinching nut is used to connect the supporting member 300 with the first sound generator 1800, some of the vibration generated by the first sound generator 1800 may be partially absorbed by the nut 330. Thus, the vibration transferred to the supporting member 300 may be reduced.

If the supporting member 300 is directly connected with the first sound generator 1800 without the self-clinching nut, the vibration generated during operation of the first sound generator 1800 may be transferred to the supporting member 300 over long-term operation, and a problem may occur in that the supporting member 300 may be bent or deformed when the supporting member 300 is thin. If the supporting member 300 is thin, the supporting member 300 may be directly connected to the screw 320, and a problem may occur in that a fixing force of the supporting member 300 and the first sound generator 1600 may be not sufficient.

Therefore, if the nut fixes the supporting member to the sound generator, the supporting member may become thick to prevent bending or deformation of the supporting member from occurring, and to improve a fixing force of the supporting member and the sound generator. When the supporting member becomes thick, a problem may occur in that the display apparatus becomes thick. If the supporting member is formed of glass or stainless steel, e.g., to improve external design of the display apparatus, a problem may occur in that the nut cannot be inserted into the supporting member.

Therefore, a second supporting member may further be provided on the supporting member 300 to insert the nut 330 into the supporting member 300. The second supporting member may be on a side of the supporting member 300 adjacent to the optical module 900. The optical module 900 may be the light guide member and the sheet portion, or may be the light guide member and the optical sheet portion.

The second supporting member may include aluminum (Al), into which the nut 330 may be inserted. The first sound generator 1800 may be connected to the supporting member 300 and the second supporting member by the screw 320 using the nut 330 fixed to the supporting member 300. The supporting member 300 and the second supporting member may be fixed by an adhesive member. The adhesive member may be, but embodiments are not limited to, a double-sided tape, a single-sided tape, an adhesive, and/or a bond.

When the supporting member 300 is formed of glass or stainless steel, external design of the display apparatus may be improved. The second supporting member may further be formed to tightly attach the first sound generator 1800 to the front surface of the optical module 900 as much as the thickness of the supporting member 300, and the thickness of the display apparatus may be reduced. Therefore, the second supporting member may further be formed such that the sound generator may be thinner, and the thickness of the display apparatus may be reduced.

An adhesive member may be provided for adhering the optical module 900 to the first sound generator 1800. The adhesive member may be a double-sided tape, a single-sided tape, an adhesive, and/or a bond, but embodiments are not limited thereto.

A pair of sound generators 1800 may be fixed by a fixing device 1000. The fixing device for fixing the pair of sound generators will be described in detail below with reference to FIG. 21C.

With reference to FIG. 21C, the fixing device 1000 of the first sound generator 1800 may be an integrated fixing device for fixing and supporting the 1-1$^{st}$ sound generator 1800' and the 1-2$^{nd}$ sound generator 1800" to adjoin each other. Therefore, the 1-1$^{st}$ sound generator 1800' and the 1-2$^{nd}$ sound generator 1800" fixed by the fixing device 100 may be a pair of sound generators.

The fixing device 1000 of the first sound generator 1800 may include a supporting portion for supporting the sound generator, a plurality of rib portions near the sound generator, and a plurality of mounting holes for fixing the fixing device and the supporting member. For example, the supporting portion may include a first supporting portion 1120 for supporting the 1-1$^{st}$ sound generator 1800' and a second supporting portion 1220 for supporting the 1-2$^{nd}$ sound generator 1800". The first supporting portion 1120 may be a structure for supporting a portion of a side and a rear surface of the 1-1$^{st}$ sound generator 1800', and may have a cylindrical shape. The second supporting portion 1220 may be a structure for supporting a portion of a side and a rear surface of the 1-2$^{nd}$ sound generator 1800", and may have a cylindrical shape.

The first supporting portion 1120 and the second supporting portion 1220 may further include two or four arc-shaped protrusions. When one surface of each protrusion is bent toward an inner side of each of the sound generators 1800' and 1800" to support a portion of the rear surface of each of the sound generators 1800' and 1800", it may reduce or prevent each sound generator from being separated from the outside of the fixing device 1000 of the sound generator.

The plurality of rib portions may be near the first supporting portion 1120 and the second supporting portion 1220, e.g., to maintain rigidity of the fixing device 1000 of the first sound generator 1800. The plurality of rib portions may reduce or prevent the fixing device 1000 of the first sound generator 1800 from being deformed, even when the fixing device is used for a long time.

For example, the rib portions may include a first rib portion 1410 extended from the outer portions of the first supporting portion 1120 and the second supporting portion 1220 to a horizontal direction, a second rib portion 1420 connecting the first supporting portion 1120 with the second supporting portion 1220 in a horizontal direction, and a third rib portion 1430 connected with the first rib portion 1410 in a vertical direction. For example, the horizontal (or widthwise) direction may be a direction of a long side where two sound generators may be provided, and the vertical (or lengthwise) direction may be a direction perpendicular to the horizontal direction.

The first rib portion 1410 may extend longitudinally from the outer portions of the first support portion 1120 and the second support portion 1220, e.g., to form a horizontal outer structure of the fixing device 1000 of the first sound generator. A center area of the first rib portion 1410, that is, a center area between the first supporting portion 1120 and the second supporting portion 1220, may be higher than both areas of the first rib portion 1410, or the first rib portion 1410 may be thicker than the center area between the first supporting portion 1120 and the second supporting portion 1220. Therefore, deformation of the fixing device of the sound generator may be reduced or avoided, even when a pair of sound generators may be vibrated for a long time, and a change of a relative position between the pair of sound generators and the optical module may be reduced.

One or more second rib portions 1420 connected with the first supporting portion 1120 and the second supporting portion 1220 in a single body may be inside the first rib portion 1410. Although two second rib portions 1420 are shown in the FIG. 20C example, embodiments are not limited thereto. For example, one, three, or more second rib portions may be provided. One or more third rib portions 1430 connected with the first rib portion 1410 and the second rib portion 1420 in a single body and extended in a horizontal direction may be provided between the two second rib portions 1420 or between the two first rib portions 1410.

In the example shown in FIG. 21C, one third rib portion 1430 is included, and is longitudinally extended between the two first rib portions 1410. However, embodiments are not limited thereto. For example, the third rib portion 1430 may be extended a shorter length between the two second rib portions 1420.

One or more fourth rib portions 1440, which may extend obliquely, may further be formed between the first supporting portion 1120 or the second supporting portion 1220 and the first rib portion 1410. The fourth rib portions 1440 may reduce or prevent bending and deformation of the fixing device of the sound generator from being generated by heat when used for a long time. Therefore, when the fixing device for fixing a pair of sound generators and the plurality of rib portions near the sound generator may be provided, the display apparatus may maintain rigidity of the sound generator and reduce sound characteristic change due to operation over a long time.

A distance between the first supporting portion 1120 and the second supporting portion 1220 may be greater than a minimum threshold value for forming a rib portion, and may be smaller than a maximum threshold value which may be a diameter of the 1-1$^{st}$ sound generator 1800' and the 1-2$^{nd}$ sound generator 1800". If the distance between the first supporting portion 1120 and the second supporting portion 1220 is greater than the minimum threshold value, sound quality may be deteriorated. Therefore, the distance between the first supporting portion 1120 and the second supporting portion 1220 may be smaller than the diameter of the 1-1$^{st}$ sound generator 1800' and the 1-2$^{nd}$ sound generator 1800", whereby deterioration of sound quality may be reduced. For example, when a size (diameter) of the sound generator is "D", the spacing distance should be greater than about 7 mm, corresponding to the minimum value and smaller than the size D of the sound generator. When the size D of the sound generator is about 28 mm, approximately, a change of sound quality property may not be great in case of 0.85*D (e.g., about 23.6 mm) smaller than the size D (e.g., about 28 mm). Embodiments are not limited to these example sizes.

A plurality of mounting holes for fixing the fixing device 1000 and the supporting member 300 to each other may be provided. When the hole is formed inside the nut 330 shown in FIG. 21B, the fixing device 1000 may be fixed to the supporting member 300 such that the holes 1310, 1320, 1330, and 1340 of the fixing device 1000 may be aligned with the hole of the nut 330, and then a screw 320 may be tightened.

FIGS. 22A to 22E illustrate examples of a sound generator and a partition in a display apparatus according to another example embodiment of the present disclosure.

Figure 22A:
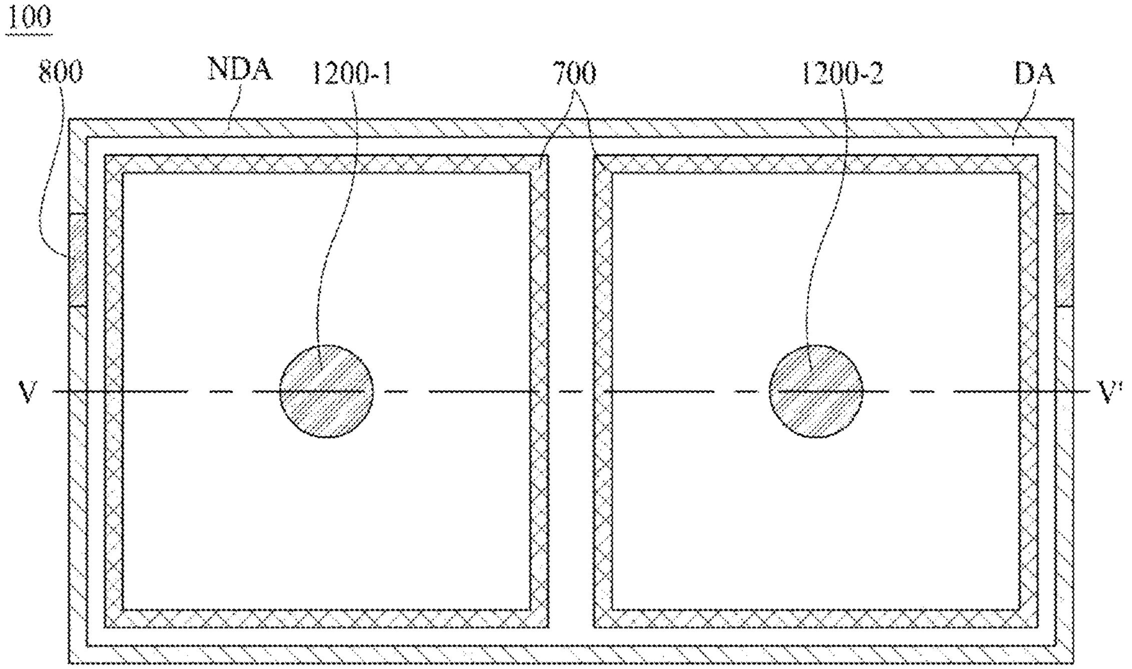
FIGS. 22A to 22E illustrate examples of a sound generator and a partition in a display apparatus according to another example embodiment of the present disclosure.

With reference to FIG. 22A, the display area DA may include at least two areas, each of which may include at least one coil-type sound generators. The two areas may include a first area and a second area. The first area may be a left area of the display area, and the second area may be a right area of the display area.

The first sound generators 1200-1 and 1200-2 may be inclined toward a right side of the first area and a left side of the second area, without being at the center of a first partition 700 based on the first partition 700. For example, each of the first sound generators 1200-1 and 1200-2 may be inclined toward the center of the display panel 100.

The partition 700 may be near the 1-1$^{st}$ sound generator 1200-1 in the first area. The partition 700 may be near the 1-2$^{nd}$ sound generator 1200-2 in the second area. For example, the partition 700 may surround the first sound generators 1200-1 and 1200-2 in the first area and the second area.

The partition 700 may be an air gap or space in which a sound may be generated when the display panel 100 is vibrated. The air gap or space for generating or transferring a sound may be referred to as a partition, or may be referred to as enclosure or baffle. The partition 700 may be referred to as a term, such as a foam pad, but is not limited by such a term.

The partition 700 may split or separate left and right sounds generated from the 1-1$^{st}$ sound generator 1200-1 of the first area and the 1-2$^{nd}$ sound generator 1200-2 of the second area. Because vibration of the display panel in the space or air gap defined by the partition 700 is attenuated or absorbed by the center of the display area DA, the sound in the left area may be reduced or prevented from being transferred to the space of the right area. Therefore, because the left sound and the right sound may be separated by the partition 700, a sound output characteristic may be improved, and a stereo property of the sound may be improved.

The first sound generators 1200-1 and 1200-2, respectively in the first area and the second area, may generate sound of middle and high-pitched ranges. In this case, the middle-pitched range may be, but is not limited to, about 200 Hz to 3 kHz, and the high-pitched range may be, but is not limited to, about 3 kHz or more.

The partition 700 may include a material having elasticity that may be compressed to some extent. For example, the partition 700 may include, but embodiments are not limited to, a polyurethane, a polyolefin, and/or a polyethylene material. The partition 700 may be, but embodiments are not limited to, a double-sided tape, a single-sided tape, an adhesive, and/or a bond.

Figure 22B:
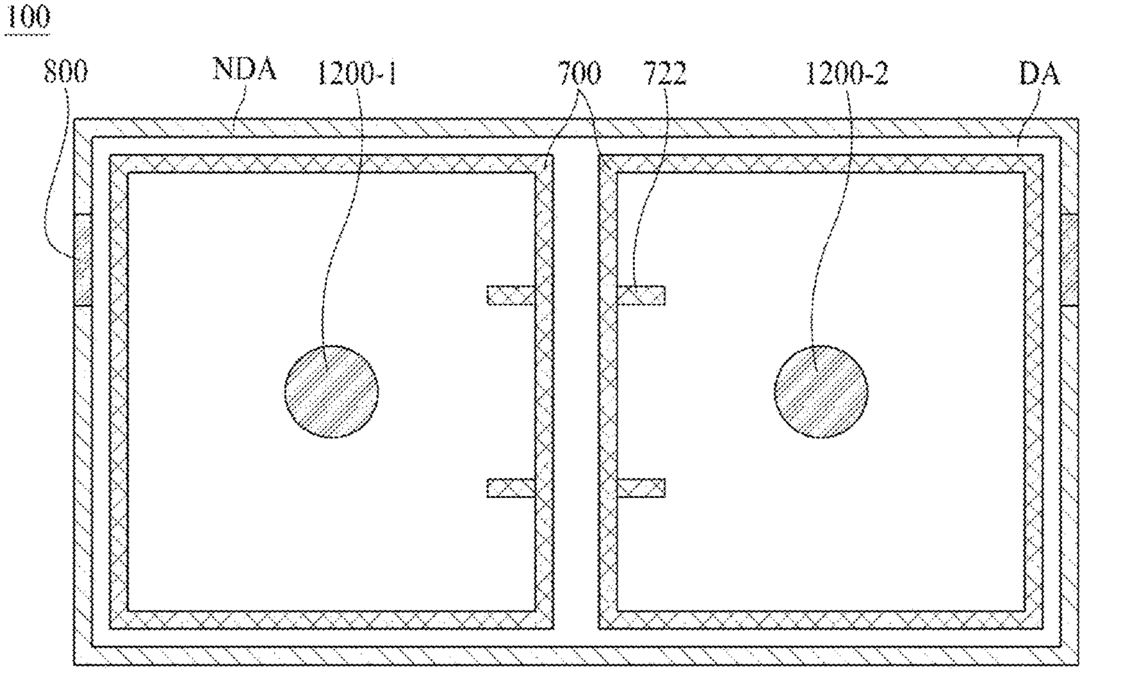

With reference to FIG. 22B, one or more protrusion portions 722 may further be provided on at least one side of the partition 700. For example, the protrusion portion 722 at the left area of the display area DA may extend toward the 1-1$^{st}$ sound generator 1200-1. The protrusion portion 722 at the right area of the display area DA may extend toward the 1-2$^{nd}$ sound generator 1200-2.

Because the protrusion portion 722 may trap a reflective wave, a peak or dip phenomenon caused by a standing wave may be reduced. In this case, the peak is a phenomenon in which a sound pressure is splashed at a particular frequency, and the dip is a phenomenon in which a particular frequency is suppressed. Thus, a low sound pressure may be generated. The sound output characteristic of the display apparatus may be deteriorated by the peak or dip phenomena. One or more protrusion portions 722 may be formed at one or more sides of the partition 700, and may be symmetrically disposed with the sound generator. In the example of FIG. 22B, one or more protrusion portions 722 is formed at one of second sides perpendicular to the first side among four sides of the display area DA. The protrusion portion 722 may be formed at the second side in FIG. 22B, but may also be formed at the fourth side facing the second side. The protrusion portion 722 may be formed respectively at the second side and the fourth side toward the first sound generators 1200-1 and 1200-2. For example, the protrusion portion 722 may be formed at two sides, based on the first sound generators 1200-1 and 1200-2. The partition 700 and the protrusion portion 722 may be, but are not limited to, a double-sided tape, a single-sided tape, an adhesive, and/or a bond.

Figure 22C:
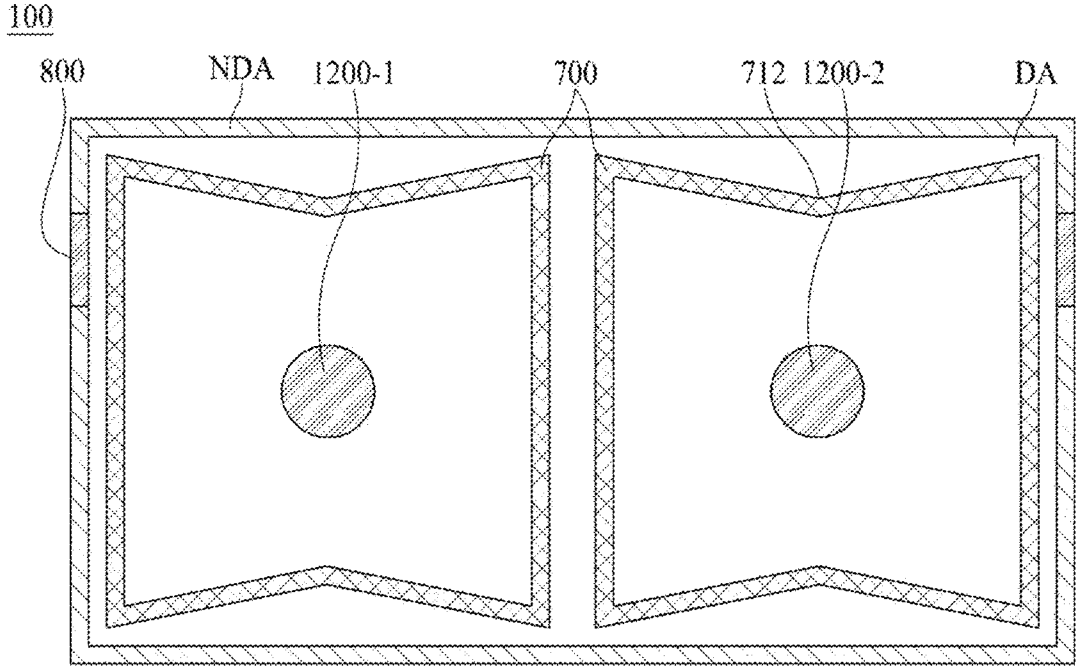

With reference to FIG. 22C, one or more bent portions 712 may further be on at least one or more sides of the partition 700. The bent portion 712 may be formed on at least one or more sides, where the strongest sound wave reaches, among the four sides of the partition, and may extend (or bend) toward the first sound generators 1200-1 and 1200-2. The bent portion 712 may extend (or bend) toward the center of the first sound generators 1200-1 and 1200-2. As such, the peak or dip phenomenon caused by the standing wave may be reduced.

The display area DA may have four sides, and one or more bent portions 712 may be configured on one or more first sides among the four sides. Therefore, the bent portions 712 may be configured such that two upper and lower sides of the four sides surrounding the display area DA may have a particular inclined angle with respect to a horizontal direction of the display panel. The bent portions 712 may include two straight line portions, and may be formed at a point at which two straight line portions meet each other. The bent portions 712 may have, but are not limited to, a straight line shape, a curved shape, and/or a round shape.

An inclined angle of the bent portion 712 may be varied depending on the need in controlling the peak or dip phenomenon caused by the standing wave, and may be set to have an angle in a range, e.g., from about 10° to 30°. For example, if a sound output area is for a low-pitched sound range or the output of the sound generator is great, the inclined angle of the bent portion 712 may become large. Alternatively, if the sound output area is for a high-pitched range or the output of the sound generator is small, the inclined angle of the bent portion 712 may become small. For example, the inclined angle of the bent portion 712 may be an angle of one side of the partition 700 with respect to a horizontal direction of the display area DA. The horizontal direction may correspond to a direction of a long side of the display apparatus, and the vertical direction may correspond to a direction of a short side of the display apparatus. The partition 700 and one or more bent portions 712 may be a double-sided tape, a single-sided tape, an adhesive, and/or a bond, but embodiments are not limited thereto.

Figure 22D:
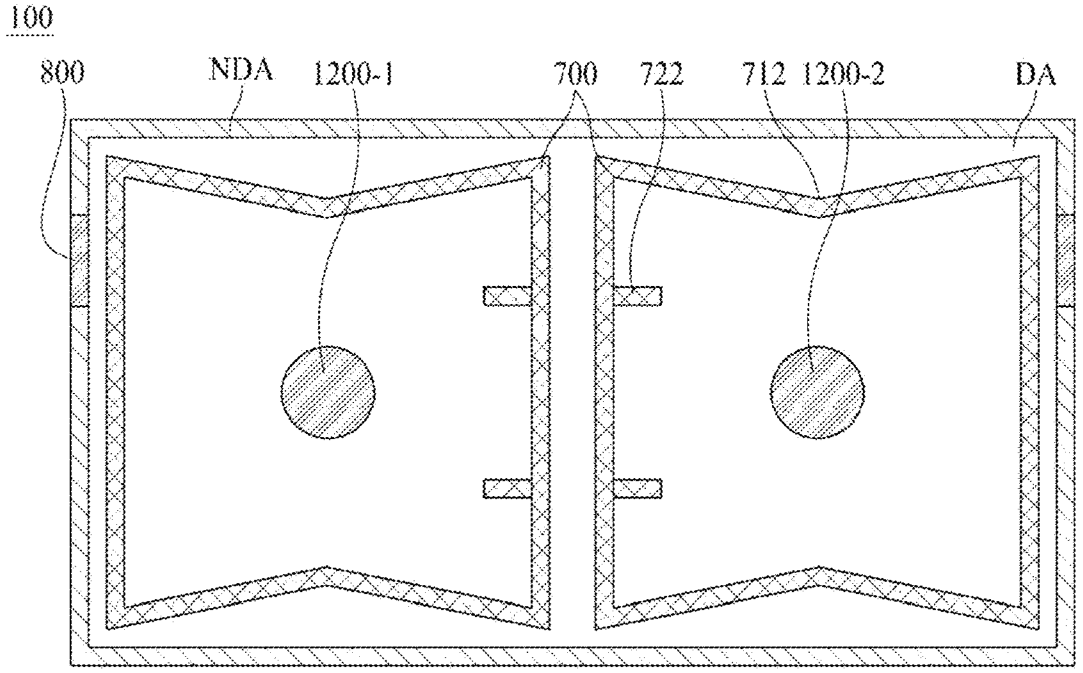

With reference to FIG. 22D, one or more bent portions 712 and one or more protrusion portions 722 may be on at least one or more sides of the partition 700. For example, one or more bent portions 712 may be on at least one or more sides of the partition 700, and one or more protrusion portions 722 may be on a side perpendicular to the side where the bent portions 712 are formed. One or more protrusion portions 722 at the left area of the display area DA may extend toward the 1-1$^{st}$ sound generator 1200-1. One or more protrusion portions 722 at the right area of the display area DA may extend toward the 1-2$^{nd}$ sound generator 1200-2.

Because the protrusion portion 722 may trap a reflective wave, a sound pressure decrease caused by a standing wave may be reduced. One or more protrusion portions 722 may be formed at one or more sides of the partition 700, and may be symmetrically disposed with respect to the sound generator. In FIG. 22D, one or more protrusion portions 722 may be at one of second sides perpendicular to the first side among four sides of the display area 100. The protrusion portion 722 may be at the second side in FIG. 22D, but may be at the fourth side facing the second side. The protrusion portion 722 may be respectively at the second side and the fourth side extending toward the first sound generators 1200-1 and 1200-2. For example, the protrusion portion 722 may be at two sides with respect to the first sound generators 1200-1 and 1200-2. The partition 700, one or more bent portions 712 and one or more protrusion portions 722 may be, but are not limited to, a double-sided tape, a single-sided tape, an adhesive, and/or a bond.

Figure 22E:
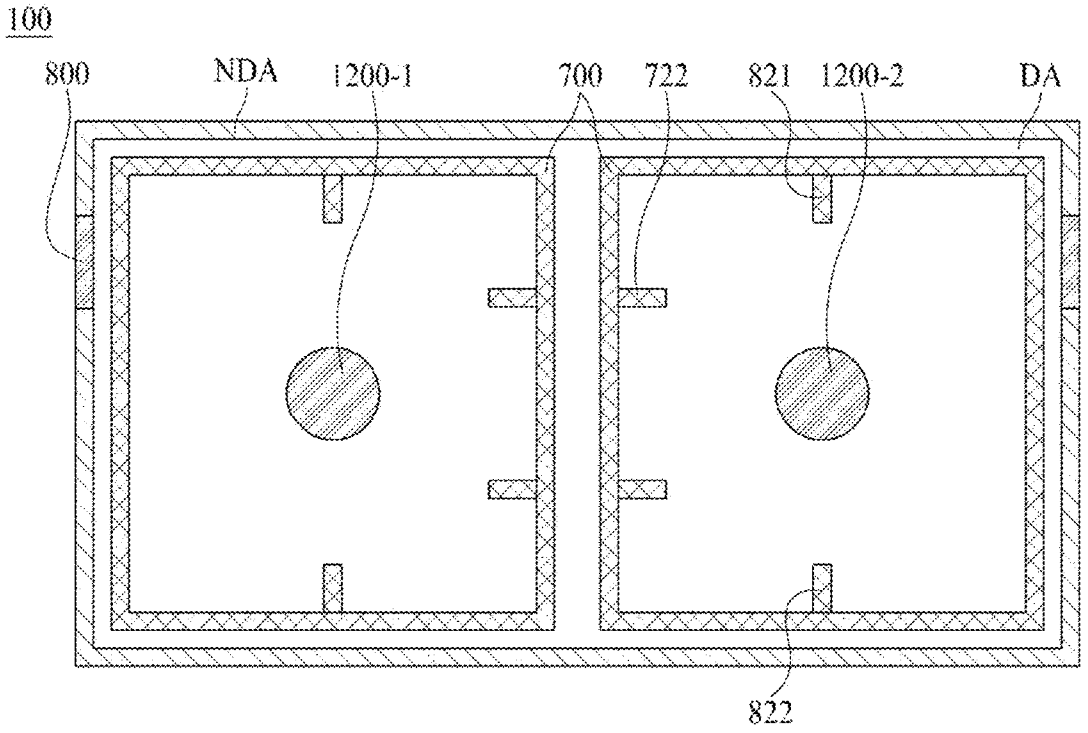

With reference to FIG. 22E, pad portions 821 and 822 may further be on at least one side of the partition 700. For example, the pad portion 821 may be on at least one side of the partition 700 and the second pad portion 822 may be at the side facing the pad portion 821. For example, the pad portions 821 and 822 at the left area of the display area DA may extend toward the 1-1$^{st}$ sound generator 1200-1. The pad portions 821 and 822 at the right area of the display area DA may extend toward the 1-2$^{nd}$ sound generator 1200-2. At least one or more pad portions may solve a defect of the display panel, which may be caused by the protrusion portion generated when the substrate constituting the display panel becomes thin.

Because the pad portions 821 and 822 may trap a reflective wave, a peak or dip phenomenon caused by a standing wave generated in a vertical direction of the first sound generator 1200 may be reduced. One or more pad portions 821 and 822 may be formed at one or more sides of the partition 700, and may be symmetrically disposed with respect to the first sound generators 1200-1 and 1200-2. In the example of FIG. 22E, the pad portion 821 is at the first side of four sides of the display area DA, and the second pad portion 822 is at the second side facing the first side. The pad portions 821 and 822 may be formed respectively at the first side and the third side extending toward the first sound generators 1200-1 and 1200-2. For example, the pad portions 821 and 822 may be at two sides based on the first sound generators 1200-1 and 1200-2. Two or more pad portions 821 and 822 may be provided. The partition 700 and one or more pad portions 821 and 822 may be, but are not limited to, a double-sided tape, a single-sided tape, an adhesive, and/or a bond.

The partition, the bent portion, the protrusion portion and the pad portion in one sound generator of each of two areas have been described with reference to the examples of FIGS. 22A to 22E, and at least one of one or more bent portions, one or more protrusion portions, one or more pad portions, and the partition may equally be applied to two sound generators, a pair of sound generators, or the oval type sound generator of the examples of FIGS. 20 and 21. The description in the examples of FIGS. 3A to 3E may be equally applied to arrangement of the second sound generator 800 in the examples of FIGS. 22A to 22E.

Figure 23:
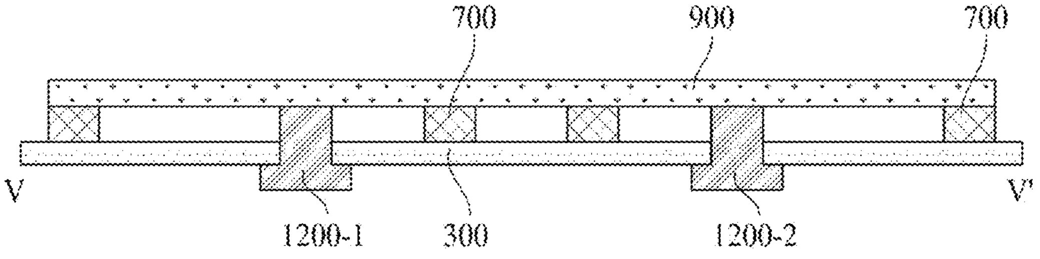
FIG. 23 is a cross-sectional view taken along line V-V' of FIG. 22A.

FIG. 23 is a cross-sectional view taken along line V-V' of FIG. 22A.

With reference to FIG. 23, the display apparatus may include a first sound generator 1200-1 of a left area and another first sound generator 1200-2 of a right area. For example, the 1-1$^{st}$ sound generator 1200-1 of the left area may be at the left area of the rear surface of the optical module 900. The 1-1$^{st}$ sound generator 1200-1 of the left area may be connected to the left area of the rear surface of the optical module 900, and may vibrate the left area of the display panel through the left area of the rear surface of the optical module 900. The optical module may be the light guide member, or may be the light guide member and the reflective plate.

The 1-2$^{nd}$ sound generator 1200-2 of the right area may be at the right area of the rear surface of the optical module 900. The 1-2$^{nd}$ sound generator 1200-2 of the right area may be connected to the right area of the rear surface of the optical module 900, and may vibrate the right area of the display panel through the right area of the rear surface of the optical module 900. Because each of the first sound generators includes the first sound generator 1200 as shown in the examples of FIG. 6 or 7, a detailed description thereof will be omitted.

The partition 700 may split or separate the rear surface of the optical module 900 into the left area and the right area to reduce or prevent interference from occurring between sounds generated in the left area and the right area. For example, the partition 700 may be on the rear surface of the optical module 90 between the first sound generator of the left area and the first sound generator of the right area to split or separate the left area and the right area from each other. The partition 700 may be a connection member. The partition 700 may surround an outer portion of each of the left area and the right area of the rear surface of the optical module 900. The partition 700 may surround an outer portion of each of the first sound generator of the left area and the first sound generator of the right area. Therefore, the left area and the right area of the rear surface of the optical module 900 may be split by the connection member and the partition 700.

The partition 700 may be interposed between the optical module 900 and the rear cover 301, which may be the supporting member. For example, the partition 700 may be formed of a foam pad, a single-sided tape, a double-sided tape, an adhesive, and/or a bond. The partition 700 may be adhered to the front surface of the rear cover 301, whereas it may be adhered to the rear surface of the optical module 900 or may be in contact with the rear surface of the optical module 900, or in a non-contact type. The partition 700 may split or separate sounds between the first sound generator of the left area and the first sound generator of the right area, e.g., to output a sound of 2.0 channel type from the display panel in accordance with vibration of the display panel.

The display apparatus according to an embodiment of the present disclosure may be a flat panel type display. Alternatively, the display apparatus according to an embodiment of the present disclosure may be applied to a curved type display apparatus in which a display panel, an optical module, and a supporting member are bent in a curved shape. In this case, image immersion experience and sound immersion experience of a viewer may be increased.

Figure 24A:
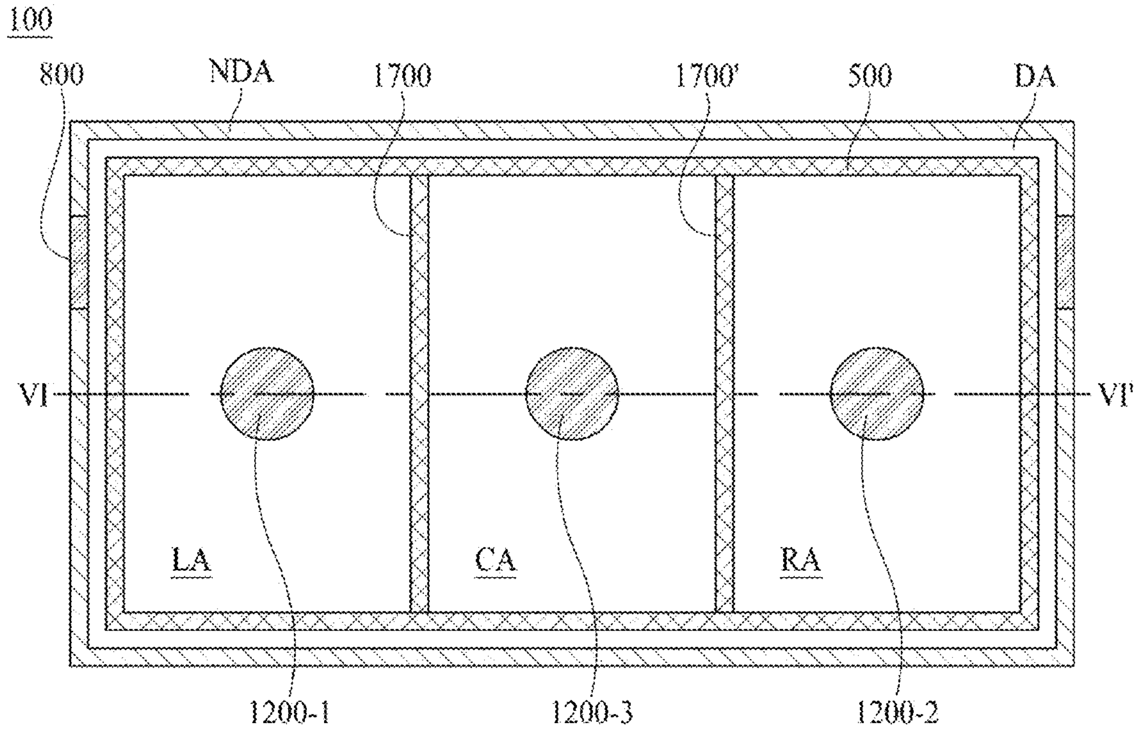
FIGS. 24A to 24C illustrate additional examples of a sound generator and a partition in a display apparatus according to another example embodiment of the present disclosure.
Figure 24B:
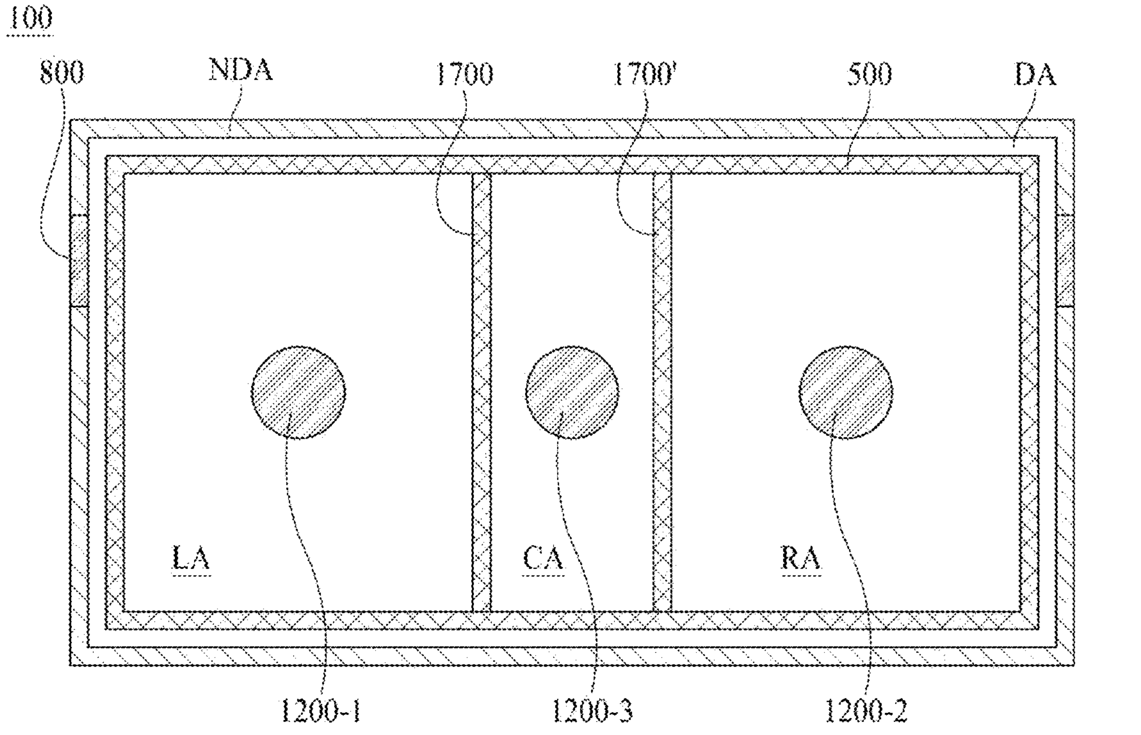
Figure 24C:
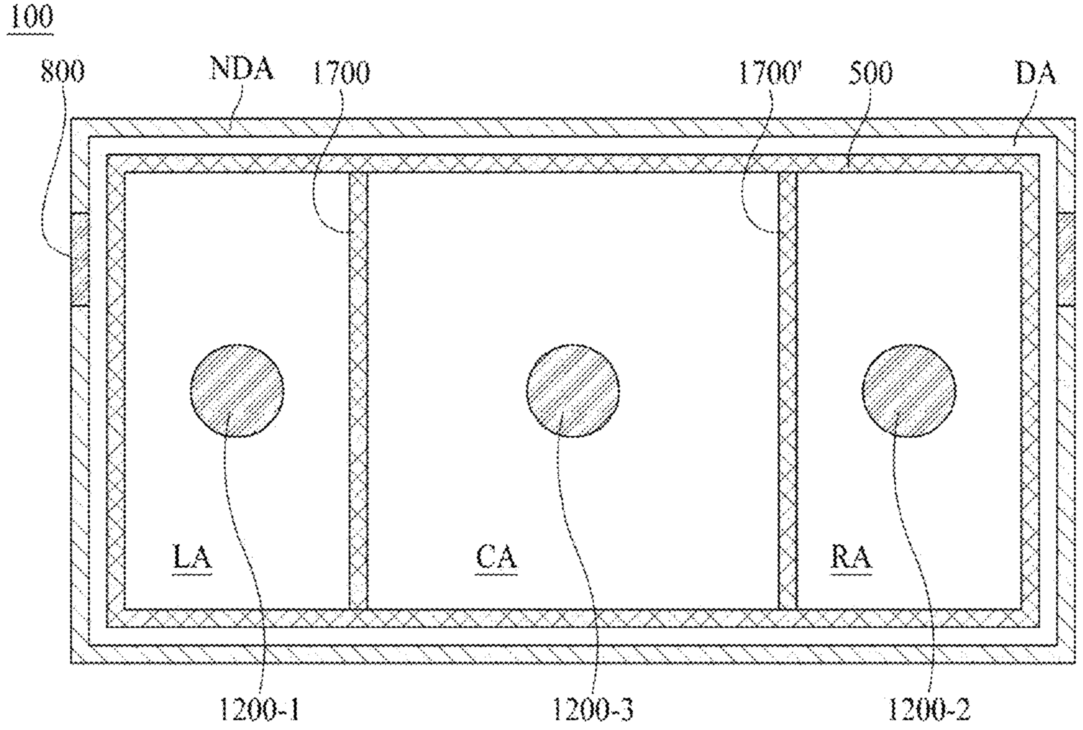
Figure 25:
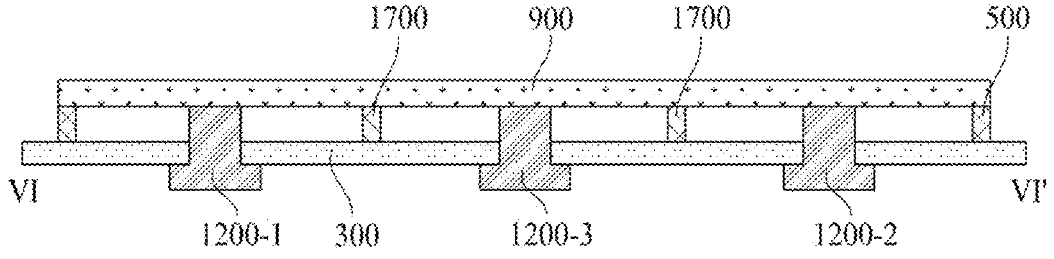
FIG. 25 is a cross-sectional view taken along line VI-VI' of FIG. 24A.

FIGS. 24A to 24C illustrate additional examples of a sound generator and a partition in a display apparatus according to another example embodiment of the present disclosure. FIG. 25 is a cross-sectional view taken along line VI-VI' of FIG. 24A.

With reference to FIGS. 24A to 25, the sound generator may include first to third sound generators 1200-1, 1200-2, and 1200-3. Because each of the first sound generators may include the first sound generator 1200 as shown in the examples of FIG. 6 or 7, a detailed description thereof will be omitted.

The 1-1$^{st}$ sound generator 1200-1 may be at a left area LA on the rear surface of the optical module 900. For example, the 1-1$^{st}$ sound generator 1200-1 may be connected to the left area LA on the rear surface of the optical module 900, and may vibrate the left area of the display panel through the left area on the rear surface of the optical module 900. The 1-1$^{st}$ sound generator 1200-1 may generate sounds of middle and high-pitched ranges by vibrating the left area of the display panel through the left area LA on the rear surface of the optical module 900. The optical module 900 may be the light guide member and the reflective plate, or may be the light guide member.

The 1-2$^{nd}$ sound generator 1200-2 may be at a right area RA on the rear surface of the optical module 900. For example, the 1-2$^{nd}$ sound generator 1200-2 may be connected to the right area RA on the rear surface of the optical module 900, and may vibrate the right area of the display panel through the right area on the rear surface of the optical module 900. The 1-2$^{nd}$ sound generator 1200-2 may generate sounds of middle and high-pitched ranges by vibrating the right area of the display panel through the right area RA on the rear surface of the optical module 900.

The 1-3$^{rd}$ sound generator 1200-3 may be at a center area CA between the left area LA and the right area RA on the rear surface of the optical module 900. For example, the 1-3$^{rd}$ sound generator 1200-3 may be connected to the center area CA on the rear surface of the optical module 900, and may vibrate the center area of the display panel through the center area on the rear surface of the optical module 900. The 1-3$^{rd}$ sound generator 1200-3 may generate sound of a low-pitched range by vibrating the center area of the display panel through the center area CA on the rear surface of the optical module 900.

Because each of the 1-1$^{st}$ to 1-3$^{rd}$ sound generators 1200-1, 1200-2, and 1200-3 may include a module frame 411, a magnetic circuit unit, and a damper 415, as shown in the example of FIG. 6, a detailed description thereof will be omitted. The structure of the FIG. 7 example may equally be applied to each of the first to third sound generators. Each of the 1-1$^{st}$ to 1-3$^{rd}$ generators 1200-1, 1200-2 and 1200-3 may include two or more sound generators in parallel and spaced apart from each other. Each of the 1-1$^{st}$ to 1-3$^{rd}$ sound generators 1200-1, 1200-2, and 12003 may include a pair of sound generators.

The partition may split or separate the rear surface of the optical module 900 into the left area LA, the right area RA, and the center area CA together with a first connection member 500 to reduce or prevent interference from occurring between sounds generated in each of the left area, the right area, and the center area. The partition may be the connection member, and may surround an outer portion of each of the left area and the right area of the rear surface of the optical module 900. The first connection member 500 may surround the outer portion of each of the left area LA, the right area RA, and the center area CA of the optical module 900. Therefore, the left area LA, the right area RA, and the center area CA defined on the rear surface of the optical module 900 may be spatially partitioned by the first connection member 500 and the partitions 1700 and 1700'.

The partition may include a first partition 1700 between the center area CA and the left area LA, and a second partition 1700' between the center area CA and the right area RA. Each of the first and second partitions 1700 and 1700' may be between the optical module 900 and the rear cover 301. The first and second partitions 1700 and 1700' may have the same structure in such a manner that they may be symmetrically with respect to the center area CA. However, the first and second partitions 1700 and 1700' are not limited to this structure. This structure will be described in detail with reference to FIGS. 24B and 24C.

Each of the first and second partitions 1700 and 1700' may include a foam pad, a single-sided tape, a double-sided tape, and/or the like. Each of the first and second partitions 1700 and 1700' may be adhered to the front surface of the rear cover 301, whereas they may be adhered to the rear surface of the optical module 900 or may be in contact with the rear surface of the optical module 900, or in a non-contact type.

With reference to FIG. 24B, the left area and the right area may be larger than the center area. Even in this case, sounds of a low-pitched range to a high-pitched range may be output. The size of the left area and the right area may be the same or may be configured differently from each other. With reference to FIG. 24C, the center area may be larger than the left area and the right area. Even in this case, sounds of a low-pitched range to a high-pitched range may be output. The first and second partitions 1700 and 1700' may split or separate a sound of a low-pitched range generated in the center area CA and sounds of middle and high-pitched ranges generated in the left and right areas LA and RA from each other to output a sound of 2.1 channel type from the display panel in accordance with vibration of the display panel.

Therefore, the display apparatus according to an example embodiment of the present disclosure may use the display panel 100 vibrated through the optical module 900 as a vibration panel of a sound device to output the sound of 2.0 channel type to the front direction, and not to the rear and downward direction, of the display panel 100 The display apparatus according to an example embodiment of the present disclosure may output a sound of 2.1 channel type to the front direction, and not to the rear and downward direction, of the display panel due to woofer output according to vibration of the center area of the display panel and left and right stereo sound output from each of the left and right areas of the display panel. Thus, exact sound transfer may be performed, sound quality may be improved, and a viewer's immersion experience may be improved.

Figure 26:
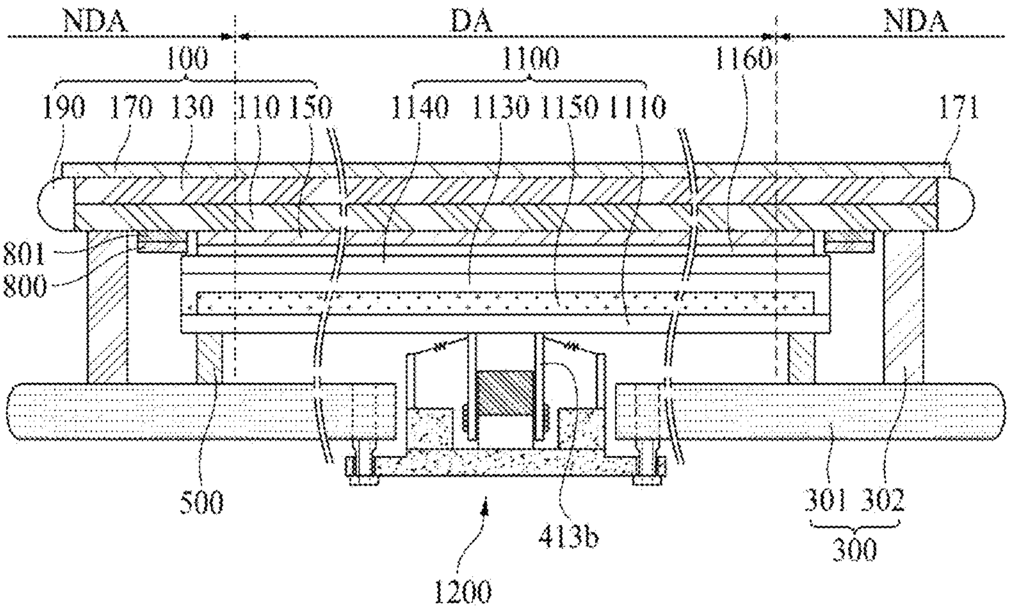
FIG. 26 illustrates a display apparatus according to another example embodiment of the present disclosure.

FIG. 26 illustrates a display apparatus according to another example embodiment of the present disclosure.

FIG. 26 is a cross-sectional view illustrating a display apparatus according to another example embodiment of the present disclosure. The FIG. 26 example is primarily based on the configuration of the optical module in the display apparatus shown in the FIG. 18 example. Therefore, the optical module and its related configuration will be described in detail, and other repeated configuration will be omitted or simply described.

With reference to FIG. 26, the optical module of the display apparatus according to an example embodiment of the present disclosure may include a surface light source panel 1100. The surface light source panel 1100 may be on the rear surface of the display panel 100, and may be connected to the bobbin 413*b* in the first sound generator 1200. The surface light source panel 1100 may be driven by a lamp driving circuit to irradiate light to the rear surface of the display panel 100, and may transfer vibration according to ascension of the bobbin 413*b* in the first sound generator 1200 to the display panel 100. Therefore, the display panel 100 may be vibrated in accordance with vibration of the first sound generator 1200 transferred through the surface light source panel 1100, while displaying an image using the light irradiated from the surface light source panel 1100, thereby outputting the sound to a front direction of the display panel 100.

The surface light source panel 1100 may include a base substrate 1110, a self-light-emitting device layer 1150, a protective layer 1130, and a cover substrate 1140. The base substrate 1110 may include a light-transmissive plastic and/or a glass material. The base substrate 1110 may be connected to the bobbin **413*b* in the first sound generator 1200, and may be vibrated in accordance with ascension of the bobbin 413*b*. The base substrate 1110 may be connected to the rear cover 301 of the supporting member 300, e.g., through the aforementioned connection member 500**.

The self-light-emitting device layer 1150 may include a driving circuit layer provided on the base substrate 1110, and a self-light-emitting device connected to the driving circuit layer. The driving circuit layer may include a driving circuit for allowing the self-light-emitting device to emit light in accordance with a passive matrix driving mode or active matrix driving mode. The driving circuit layer based on the active matrix driving mode may emit the self-light-emitting device based on light source data supplied in accordance with a global dimming system or local dimming system.

The self-light-emitting device may emit light in accordance with a current supplied from the driving circuit layer. The self-light-emitting device may include a self-light-emitting layer that may emit light in accordance with the current supplied form the driving circuit layer. The self-light-emitting layer may include an organic light-emitting layer or a quantum dot light-emitting layer. The self-light-emitting device may include a micro light-emitting diode that may emit light in accordance with the current supplied from the driving circuit layer.

The protective layer 1130 may be provided on the base substrate 1110 to cover the self-light-emitting device layer 1150, thereby protecting the self-light-emitting device layer 1150. The cover substrate 1140 may be attached to the protective layer 1130, and may protect the protective layer 1130 and the self-light-emitting device layer 1150 from external impact. The cover substrate 1140 may include a light-transmissive plastic and/or a glass material.

The surface light source panel 1100 according to an example embodiment of the present disclosure may be on the rear surface of the display panel 100, and may be attached by the adhesive member 1160. The adhesive member may be between the display panel 100 and the cover substrate 1140 of the surface light source panel 1100, and may position the surface light source panel 1100 on the entire rear surface of the second polarizing member 150 constituting the display panel 100.

The adhesive member 1160 may be attached to the entire surface light source panel 1100, such that no air gap may exist between the display panel 100 and the surface light source panel 1100. In this case, vibration of the surface light source panel 1100 due to the first sound generator 1200 may be transferred to the display panel through the adhesive member 1160. If the air gap is between the surface light source panel 1100 and the display panel 100, vibration delivered to the display panel 100 may be reduced due to the air gap. Therefore, the adhesive member 1160 may be between the surface light source panel 1100 and the display panel 100 without an air gap, such that vibration of the surface light source panel 1100 may be transferred to the display panel 100 without decrease of the vibration of the surface light source panel 1100.

The adhesive member 1160 may be, but is not limited to, an optical adhesive and/or an optical adhesive film. For example, the adhesive member 1160 may be, but is not limited to, an optically clear adhesive (OCA) or an optically clear resin (OCR). The adhesive member 1160 may be, but is not limited to, a double-sided tape, a single-sided tape, an adhesive, and/or bond. The display panel 100 may be attached to the surface light source panel 1100 without the adhesive member 1160.

The second sound generator 800 may be on the rear surface of the display panel, and may be attached to the display panel by the adhesive member 801. The description given above for the example of FIG. 19 may equally be applied to the second sound generator 800 in the FIG. 26 example.

The display apparatus according to an example embodiment of the present disclosure may use the display panel 100 vibrated through the optical module as a vibration panel of the first sound generator 1200 to output the sound to the front direction, and not to the rear and downward direction, of the display panel 100, and exact sound transfer may be performed, sound quality may be improved, a viewer's immersion experience may be improved, and a slim sized display apparatus may be provided.

Although one first sound generator is shown in FIG. 26 as an example, two first sound generators may be provided, as shown in the examples of FIGS. 3A and 3B. Also, two sound generators and a pair of sound generators or an oval type sound generator may be provided, as shown in the examples of FIGS. 19 and 20.

The display apparatus according to an example embodiment of the present disclosure may be applied to a curved type display apparatus in which a display panel, an optical module and a supporting member may be bent in a curved shape. The display panel according to an example embodiment of the present disclosure, which may include a sound generator, may be used in all kinds of display panels, such as a liquid crystal display panel, an organic light-emitting diode (OLED) display panel, and an electroluminescent display panel. The display panel according to an example embodiment of the present disclosure may be vibrated by the sound generator to generate sound, but is not limited to a specific display panel. For example, the sound generator according to an example embodiment of the present disclosure may be applied to a display panel that include an organic light-emitting layer, a quantum dot light-emitting layer, and a micro light-emitting diode.

The sound generator according to an example embodiment of the present disclosure may be applied to the sound generator in the display apparatus. The display apparatus according to an example embodiment of the present disclosure may be applied, for example, to a mobile apparatus, a video phone, a smart watch, a watch phone, a wearable apparatus, a foldable apparatus, a rollable apparatus, a bendable apparatus, a flexible apparatus, a curved apparatus, an electronic organizer, an electronic book, a portable multimedia player (PMP), a personal digital assistant (PDA), an MP3 player, a mobile medical apparatus, a desktop personal computer (PC), a laptop PC, a netbook computer, workstation, navigation, vehicle navigation, signage apparatus, a game apparatus, a television, a notebook computer, a monitor, a camera, a camcorder, an automotive display, and a home appliance. The sound generator of the present disclosure may be applied to an organic light-emitting lighting apparatus or an inorganic light-emitting lighting apparatus. If the sound generator is applied to the lighting apparatus, the sound generator may serve as a lamp or lighting and a speaker.

The display apparatus according to an example embodiment of the present disclosure may be described as follows.

According to an embodiment of the present disclosure, a display apparatus may include: a display panel including: a display area configured to display an image, and a non-display area, an optical module on a rear surface of the display panel, at least one first sound generator on a rear surface of the optical module, and at least one second sound generator in the non-display area and between the display panel and the optical module.

For example, in the display apparatus according to an embodiment of the present disclosure, a supporting member may be on the rear surface of the display panel, and the supporting member may include a supporting hole configured to accommodate the at least one first sound generator. For example, the display apparatus according to an embodiment of the present disclosure may further include a module frame in the supporting member, the module frame being partially accommodated in a supporting hole of the supporting member, and the at least one first sound generator may be in the module frame and may be configured to vibrate the optical module.

For example, the display apparatus according to an embodiment of the present disclosure may further include a module securing member configured to secure the at least one first sound generator to a rear surface of the supporting member. For example, in the display apparatus according to an embodiment of the present disclosure, the module securing member may include a securing frame on the rear surface of the supporting member, and a fastener for securing the at least one first sound generator to the securing frame.

For example, in the display apparatus according to an embodiment of the present disclosure, the securing member may include one or more of: a double-sided tape, a single-sided tape, an adhesive, and a bond. For example, the display apparatus according to an embodiment of the present disclosure may further include a nut secured to the supporting member, and the at least one first sound generator may be secured to the nut by a screw.

For example, in the display apparatus according to an embodiment of the present disclosure, the optical module may include a light guide member. For example, in the display apparatus according to an embodiment of the present disclosure, the light guide member may be configured to be vibrated by the at least one first sound generator, and the display panel may be configured to be vibrated based on a vibration transferred from the light guide member.

For example, in the display apparatus according to an embodiment of the present disclosure, the optical module and the supporting member may be adhered to each other by a connection member. For example, in the display apparatus according to an embodiment of the present disclosure, the at least one first sound generator may include a coil type sound generator, and the at least one second sound generator may include a piezoelectric sound generator. For example, in the display apparatus according to an embodiment of the present disclosure, the coil type sound generator may include a magnet and a center pole on a plate, a bobbin around the center pole, and a coil near the bobbin.

For example, in the display apparatus according to an embodiment of the present disclosure, the display area may include a first area and a second area, and the at least one first sound generator may be in each of the first area and the second area. For example, the display apparatus according to an embodiment of the present disclosure may further include a partition near the at least one first sound generator in each of the first area and the second area. For example, the display apparatus according to an embodiment of the present disclosure may further include a partition near the at least one first sound generator in each of the first area and the second area, and a bent portion that may be bent in a direction of the at least one first sound generator in at least one first side of four sides of the partition.

For example, the display apparatus according to an embodiment of the present disclosure may further include a partition near the at least one first sound generator in each of the first area and the second area, a bent portion that may be bent in a direction of the at least one first sound generator in at least one first side of four sides of the partition, and at least one protrusion portion on at least one second side perpendicular to the at least one first side. For example, the display apparatus according to an embodiment of the present disclosure may further include a partition near the at least one first sound generator in each of the first area and the second area, a pad portion in at least one first side of four sides of the partition in a direction of the at least one first sound generator, and at least one protrusion portion on at least one second side perpendicular to the at least one first side.

For example, in the display apparatus according to an embodiment of the present disclosure, the display panel and the at least one second sound generator may be adhered to each other by an adhesive member. For example, the display apparatus according to an embodiment of the present disclosure may further include a first pad between the optical module and at least one second sound generator.

For example, in the display apparatus according to an embodiment of the present disclosure, the non-display area may include four-side peripheries of the display area, and the at least one second sound generator may be on at least one side of the four-side peripheries. For example, in the display apparatus according to an embodiment of the present disclosure, the at least one second sound generator may extend toward the display area or may extend from a side of the display panel. For example, the display apparatus according to an embodiment of the present disclosure may further include a second pad between the at least one second sound generator and the display panel.

For example, in the display apparatus according to an embodiment of the present disclosure, a supporting member may be on the rear surface of the display panel, and the at least one first sound generator may be between the supporting member and the optical module. For example, in the display apparatus according to an embodiment of the present disclosure, the at least one first sound generator may include one or more of: a circular shape, an oval shape, or a pair of sound generators.

For example, in the display apparatus according to an embodiment of the present disclosure, the optical module may include a surface light source panel on the rear surface of the display panel, the surface light source panel may be configured to be vibrated by the at least one first sound generator, and the display panel may be configured to be vibrated based on a vibration transferred from the surface light source panel. For example, in the display apparatus according to an embodiment of the present disclosure, the surface light source panel may include a self-light-emitting device layer including one or more of: an organic light-emitting layer, a quantum dot light-emitting layer, and a micro light-emitting diode.

According to an embodiment of the present disclosure, a display apparatus may include: a display panel including: a display area configured to display an image, and a non-display area, a light guide member on a rear surface of the display panel, at least one first sound generator on a rear surface of the light guide member, a supporting member configured to support the display panel, and at least one second sound generator in the non-display area and between the display panel and the light guide member.

For example, the display apparatus according to an embodiment of the present disclosure may further include a first pad between the light guide member and the at least one second sound generator. For example, the display apparatus according to an embodiment of the present disclosure may further include a structure on the rear surface of the at least one second sound generator, the structure being configured to accommodate the at least one second sound generator, and the at least one second sound generator may extend toward the non-display area.

For example, the display apparatus according to an embodiment of the present disclosure may further include a connection member between the supporting member and the structure. For example, the display apparatus according to an embodiment of the present disclosure may further include a sheet portion on the rear surface of the display panel. For example, the display apparatus according to an embodiment of the present disclosure may further include a second pad between the sheet portion and the at least one second sound generator, and the sheet portion may extend toward the non-display area.

For example, the display apparatus according to an embodiment of the present disclosure may further include a sealing member in sides of the sheet portion and the display panel, or in a side of the display panel. For example, in the display apparatus according to an embodiment of the present disclosure, the sheet portion may be spaced apart from the light guide member. For example, the display apparatus according to an embodiment of the present disclosure may further include a second pad between the display panel and the at least one sound generator.

For example, in the display apparatus according to an embodiment of the present disclosure, a horizontal length of the at least one second sound generator may be greater than or equal to a width of the non-display area with respect to a horizontal direction of the non-display area. For example, in the display apparatus according to an embodiment of the present disclosure, a horizontal length of the at least one second sound generator may be about 5 mm to 40 mm with respect to a horizontal direction of the non-display area.

According to an embodiment of the present disclosure, a display apparatus may include: a display panel including: a display area configured to display an image, and a non-display area, a sheet portion on a rear surface of the display panel, a light guide member spaced apart from the sheet portion, a supporting member configured to support the display panel, at least one first sound generator between the light guide member and the supporting member, and at least one second sound generator between the display panel and the light guide member.

For example, in the display apparatus according to an embodiment of the present disclosure, the at least one second sound generator may be in the non-display area. For example, the display apparatus according to an embodiment of the present disclosure may further include a first pad between the light guide member and the at least one second sound generator. For example, the display apparatus according to an embodiment of the present disclosure may further include a structure on the rear surface of the at least one second sound generator, the structure being configured to accommodate the at least one second sound generator, and the at least one second sound generator may extend toward the non-display area.

For example, the display apparatus according to an embodiment of the present disclosure may further include a connection member between the supporting member and the structure. For example, the display apparatus according to an embodiment of the present disclosure may further include a second pad between the sheet portion and the at least one second sound generator, and the sheet portion may extend toward the non-display area.

For example, the display apparatus according to an embodiment of the present disclosure may further include a sealing member in sides of the sheet portion and the display panel or in a side of the display panel. For example, the display apparatus according to an embodiment of the present disclosure may further include a second pad between the display panel and the at least one sound generator.

For example, in the display apparatus according to an embodiment of the present disclosure, a horizontal length of the at least one second sound generator may be greater than or equal to a width of the non-display area with respect to a horizontal direction of the non-display area. For example, in the display apparatus according to an embodiment of the present disclosure, a horizontal length of the at least one second sound generator may be in a range from 5 mm to 40 mm with respect to a horizontal direction of the non-display area.

As described above, advantages of the display apparatus according to an example embodiment of the present disclosure are as follows.

According to an embodiment of the present disclosure, as the display apparatus may include the sound generators capable of generating a sound in a front direction of the display panel by vibrating the display panel, the display apparatus may improve sound quality and a viewer's immersion experience. According to an embodiment of the present disclosure, the second sound generator that may be a piezoelectric sound generator may be further provided, sound quality in the frequency domain of a high-pitched sound range may be improved, and a display apparatus having improved sound output characteristic of a low-pitched sound range to a high-pitched sound range may be provided.

According to an embodiment of the present disclosure, the piezoelectric sound generator capable of compensating for high sound in the coil-type sound generator may be further provided, the display apparatus may uniformly generate sound quality in the frequency domain from a low-pitched sound range to a high-pitched sound range and may have improved sound output characteristic of a low-pitched sound range to a high-pitched sound range. According to an embodiment of the present disclosure, the coil-type sound generator may be in the display area and the piezoelectric sound generator may be in the non-display area, the display apparatus may not increase the bezel area due to the sound generators and may improve sound output characteristic of a low-pitched sound range to a high-pitched sound range.

According to an embodiment of the present disclosure, the piezoelectric sound generator may use the non-display area or the bezel area as a vibration plate to generate sound. Therefore, because the piezoelectric sound generator may be anywhere in the non-display area, a degree of freedom for arrangement of the piezoelectric sound generator may be improved. According to an embodiment of the present disclosure, the piezoelectric sound generator may be not in the display area having an optical module, a sound path may be not blocked by the optical module, and sound quality may be improved.

According to an embodiment of the present disclosure, because the piezoelectric sound generator may be thin, it may be advantageous in that a small sized speaker may be realized in the display apparatus. According to an embodiment of the present disclosure, the piezoelectric sound generator may be in the non-display area, the distance between the piezoelectric sound generators in the non-display area may be increased, and a stereo effect of the sound may be improved.

According to an embodiment of the present disclosure, because the piezoelectric sound generator may extend to the non-display area, a sound of a high-pitched range may be more improved, and the display apparatus may uniformly generate sound quality in the frequency domain from a low-pitched sound range to a high-pitched sound range and output the sound of the low-pitched range to the high-pitched range. According to an embodiment of the present disclosure, because the coil-type sound generator may be in the display area and the piezoelectric sound generator may be in the non-display area, the display apparatus may improve a sound pressure in a frequency domain of a high-pitched sound range and output a sound of a low-pitched range to a high-pitched range.

It will be apparent to those skilled in the art that various modifications and variations may be made in the present disclosure without departing from the technical idea or scope of the disclosure. Thus, it may be intended that embodiments of the present disclosure cover the modifications and variations of the disclosure provided they come within the scope of the appended claims and their equivalents.

What is claimed is:

1. An apparatus, comprising:

a display panel including a display area;

at least one first sound generator configured to vibrate the display panel and output a first sound;

at least one second sound generator configured to output a second sound in a higher frequency range than the first sound; and at least one partition surrounding each of the at least one first sound generator.

2. The apparatus of claim 1, wherein the at least one partition includes four sides surrounding each of the at least one first sound generator.

3. The apparatus of claim 1, wherein the at least one partition includes:

four sides surrounding the each of the at least one first sound generator; and at least one protrusion portion that protrudes from at least one side of the four sides.

4. The apparatus of claim 1, wherein the at least one partition includes:

four sides surrounding the each of the at least one first sound generator; and a bent portion bent in at least one or more sides of the four sides.

5. The apparatus of claim 1, wherein the at least one partition includes:

four sides surrounding the each of the at least one first sound generator;

a bent portion bent in at least one or more first sides of the four sides; and at least one protrusion portion that protrudes from at least one or more second sides perpendicular to the at least one or more first sides.

6. The apparatus of claim 1, wherein the at least one partition includes:

four sides surrounding the each of the at least one first sound generator;

at least one first protrusion portion that protrudes from at least one or more first sides of the four sides; and at least one second protrusion portion that protrudes from at least one or more second sides perpendicular to the at least one or more first sides.

7. The apparatus of claim 1, wherein the display area includes a first area and a second area, and the at least one first sound generator is in each of the first area and the second area.

8. The apparatus of claim 1, wherein the display area includes a first area corresponding to a left area of the display panel, a second area corresponding to a right area of the display panel, and a third area corresponding to a central area of the display panel, and wherein the at least one first sound generator is in each of the first area, the second area, and the third area.

9. The apparatus of claim 8, wherein the at least one partition includes:

a first partition between the first area and the third area;

a second partition between the second area and the third area; and a third partition having four sides surrounding the first area, the second area, and the third area.

10. The apparatus of claim 9, wherein a size of the third area is same as a size of the first area and a size of the second area.

11. The apparatus of claim 9, wherein a size of the third area is smaller than a size of the first area and a size of the second area.

12. The apparatus of claim 9, wherein a size of the third area is larger than a size of the first area and a size of the second area.

13. The apparatus of claim 1, wherein the first sound includes a middle and a high frequency range.

14. The apparatus of claim 1, wherein the display panel includes a bezel area, and the at least one second sound generator is disposed at the bezel area.

15. The apparatus of claim 1, wherein the at least one first sound generator is configured to vibrate the display panel by generating a magnetic force by a voice coil.

16. The apparatus of claim 1, wherein the at least one second sound generator includes a piezoelectric material layer.

17. The apparatus of claim 1, further comprising a metal plate at a rear surface of the display panel, wherein the at least one first sound generator is connected to the metal plate.

18. The apparatus of claim 15, wherein the at least one first sound generator comprises:

a magnet and a center pole on a plate; and a bobbin around the center pole, wherein the voice coil is near the bobbin.

19. The apparatus of claim 18, wherein the bobbin is connected to the display panel.

20. The apparatus of claim 1, further comprising a rear cover at a rear surface of the display panel and having a hole, wherein the at least one first sound generator is configured to be inserted into the hole and is connected to the rear surface of the display panel.

21. The apparatus of claim 20, further comprising a side supporting member configured to seal a portion between the display panel and the rear cover.

22. The apparatus of claim 21, wherein the at least one partition is disposed between the display panel and the rear cover, and is surrounded by the side supporting member.

* * * * *